(12) United States Patent
Kita et al.

(10) Patent No.: US 12,083,880 B2
(45) Date of Patent: Sep. 10, 2024

(54) ACCELERATOR DEVICE

(71) Applicant: DENSO CORPORATION, Kariya (JP)

(72) Inventors: Takuto Kita, Kariya (JP); Tetsuo Hariu, Kariya (JP); Kiyoshi Kimura, Kariya (JP); Takehiro Saitoh, Kariya (JP); Hideyuki Mori, Kariya (JP); Souichi Kinouchi, Kariya (JP); Yuusuke Yoshida, Kariya (JP)

(73) Assignee: DENSO CORPORATION, Kariya (JP)

( * ) Notice: Subject to any disclaimer, the term of this patent is extended or adjusted under 35 U.S.C. 154(b) by 33 days.

(21) Appl. No.: 17/941,870

(22) Filed: Sep. 9, 2022

(65) Prior Publication Data

US 2023/0001789 A1 Jan. 5, 2023

Related U.S. Application Data

(63) Continuation of application No. PCT/JP2021/009723, filed on Mar. 11, 2021.

(30) Foreign Application Priority Data

Mar. 13, 2020 (JP) .................................. 2020-044241

(51) Int. Cl.
*B60K 26/02* (2006.01)
*B60K 28/10* (2006.01)
(Continued)

(52) U.S. Cl.
CPC ............ *B60K 26/021* (2013.01); *B60K 28/10* (2013.01); *G05G 5/02* (2013.01); *G05G 5/03* (2013.01);
(Continued)

(58) Field of Classification Search
CPC .. G05G 1/30; G05G 1/38; G05G 1/44; G05G 1/46; G05G 5/02; G05G 5/03; G05G 5/06;
(Continued)

(56) References Cited

U.S. PATENT DOCUMENTS 5,233,277 A * 8/1993 Kasig .................... D05B 69/18
388/933
7,770,491 B2 * 8/2010 Ritter ....................... G05G 1/30
74/560
(Continued)

FOREIGN PATENT DOCUMENTS

DE 10121317 A1 * 11/2002 ........... B60K 26/021
DE 10238483 A1 * 3/2004 ........... B60K 26/021
(Continued)

OTHER PUBLICATIONS

Machine translation of JP 2018-165891 A obtained on Feb. 8, 2024.*

(Continued)

*Primary Examiner* — Adam D Rogers
(74) *Attorney, Agent, or Firm* — Nixon & Vanderhye P.C.

(57) ABSTRACT

An accelerator device includes at least one drive source, a pedal lever, and a power transmission mechanism. The pedal lever is configured to move according to a pedal depressing operation. The power transmission mechanism is configured to transmit force both in the pedal lever's closing direction and opening direction to the pedal lever by driving of the drive source.

28 Claims, 63 Drawing Sheets

(51) Int. Cl.
*G05G 1/30* (2008.04)
*G05G 5/02* (2006.01)
*G05G 5/03* (2008.04)
*G05G 5/06* (2006.01)
*G05G 1/38* (2008.04)
*G05G 1/44* (2008.04)

(52) U.S. Cl.
CPC .......... *G05G 5/06* (2013.01); *B60K 2026/023* (2013.01); *G05G 1/38* (2013.01); *G05G 1/44* (2013.01); *G05G 2505/00* (2013.01)

(58) Field of Classification Search
CPC .. G05G 2505/00; B60K 26/02; B60K 26/021; B60K 2026/023; B60K 2026/026
See application file for complete search history.

(56) References Cited

U.S. PATENT DOCUMENTS

| | | | | |
|---|---|---|---|---|
| 8,914,210 | B2* | 12/2014 | Schmitt | B60K 26/021 |
| | | | | 74/513 |
| 9,108,510 | B2* | 8/2015 | Sieber | B60K 26/021 |
| 9,529,367 | B2* | 12/2016 | Sieber | G05D 13/62 |
| 10,082,808 | B2* | 9/2018 | Wagner | B60K 26/021 |
| 10,220,703 | B2* | 3/2019 | Viethen | B60K 26/021 |
| 11,225,226 | B1* | 1/2022 | Kim | G05G 1/44 |
| 11,383,682 | B2* | 7/2022 | Kim | B60T 7/06 |
| 11,617,682 | B2* | 4/2023 | Charles | G06F 3/0334 |
| | | | | 700/301 |
| 11,813,939 | B2* | 11/2023 | Yoshida | G05G 5/28 |
| 11,853,097 | B2* | 12/2023 | Kinouchi | G05G 1/30 |
| 2004/0259687 | A1 | 12/2004 | Ritter et al. | |
| 2013/0047776 | A1* | 2/2013 | Leone | G05G 1/30 |
| | | | | 74/513 |
| 2015/0143944 | A1* | 5/2015 | Zell | G05G 5/03 |
| | | | | 74/514 |
| 2016/0251018 | A1 | 9/2016 | Schnieders et al. | |
| 2020/0039350 | A1 | 2/2020 | Tayama | |
| 2023/0001787 | A1* | 1/2023 | Hariu | G05G 5/02 |
| 2023/0001788 | A1* | 1/2023 | Hariu | B60K 26/021 |
| 2023/0060925 | A1* | 3/2023 | Kinouchi | G05G 1/44 |
| 2023/0061325 | A1* | 3/2023 | Kinouchi | G05G 1/30 |
| 2023/0065672 | A1* | 3/2023 | Yoshida | G05G 5/03 |
| 2023/0065963 | A1* | 3/2023 | Kinouchi | B60K 26/02 |
| 2023/0066123 | A1* | 3/2023 | Yoshida | G05G 1/44 |
| 2023/0066751 | A1* | 3/2023 | Kinouchi | G05G 1/30 |
| 2023/0211659 | A1* | 7/2023 | Hariu | B60K 35/28 |
| | | | | 74/514 |

FOREIGN PATENT DOCUMENTS

| | | | | |
|---|---|---|---|---|
| DE | 102010063409 A1 * | 6/2012 | .......... | B60K 26/021 |
| DE | 102013219347 A1 * | 4/2015 | ............ | B60K 26/02 |
| DE | 10 2014 118 573 | 6/2016 | | |
| EP | 2853432 A1 * | 4/2015 | ............ | B60K 26/02 |
| FR | 2748831 A1 * | 11/1997 | ............... | G05G 1/30 |
| JP | 2006-176001 | 7/2006 | | |
| JP | 2007-137152 | 6/2007 | | |
| JP | 2010-59820 | 3/2010 | | |
| JP | 2018-165891 | 10/2018 | | |
| KR | 20110092098 A * | 8/2011 | | |
| KR | 20160084558 A * | 7/2016 | | |
| WO | WO-2021182560 A1 * | 9/2021 | ............ | B60K 26/02 |
| WO | WO-2021182563 A1 * | 9/2021 | ............ | B60K 26/02 |
| WO | WO-2023276686 A1 * | 1/2023 | | |

OTHER PUBLICATIONS

Machine translation of JP 2006-176001 A obtained on Feb. 8, 2024.*

U.S. Appl. No. 17/940,108, filed Sep. 8, 2022 to Tetsuo Hariu et al. (101 pages).

* cited by examiner

FIG. 71A
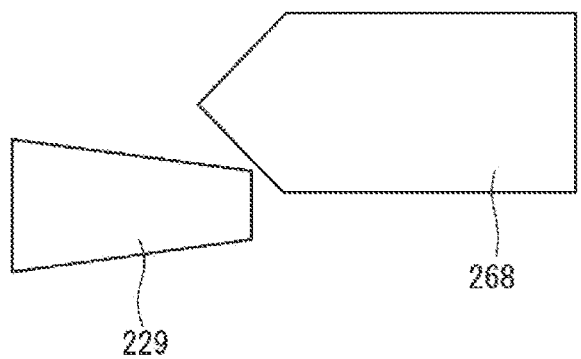
FIG. 71B
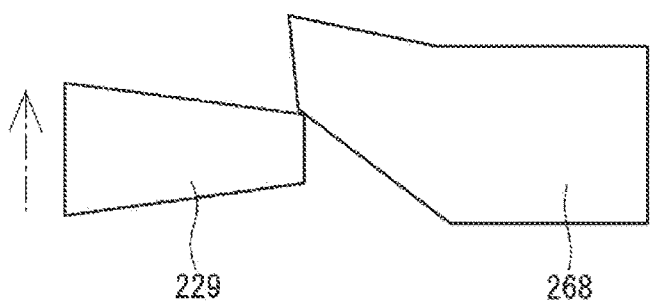
FIG. 71C
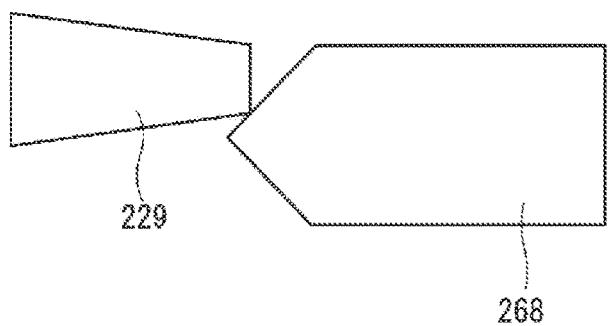

FIG. 72A
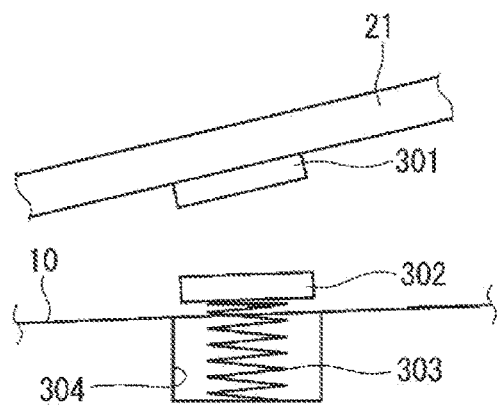
FIG. 72B
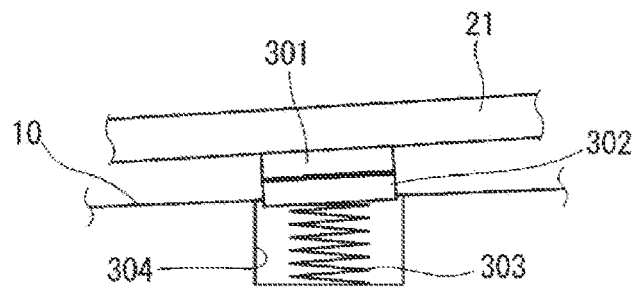
FIG. 72C
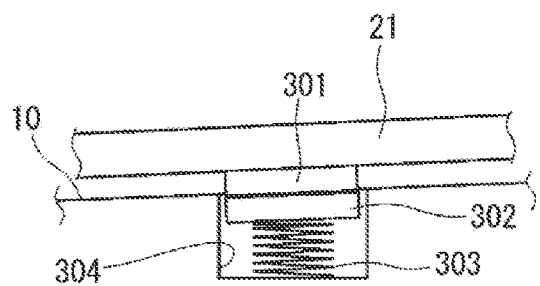

ACCELERATOR DEVICE

CROSS REFERENCE TO RELATED APPLICATION

The present application is a continuation application of International Patent Application No. PCT/JP2021/009723 filed on Mar. 11, 2021, which designated the U.S. and claims the benefit of priority from Japanese Patent Application No. 2020-044241 filed on Mar. 13, 2020. The entire disclosures of all of the above applications are incorporated herein by reference.

TECHNICAL FIELD

The present disclosure relates to an accelerator device.

BACKGROUND

An accelerator pedal module provided with an actuator is conventionally known.

SUMMARY

According to a first aspect of the present disclosure, an accelerator device includes at least one drive source, a pedal lever, and a power transmission mechanism.

BRIEF DESCRIPTION OF THE DRAWINGS

The above and other objects, features and advantages of the present disclosure will become more apparent from the following detailed description made with reference to the accompanying drawings. In the drawings:

FIG. 71A is a schematic diagram of a locking mechanism according to a ninth embodiment as is before locking;

FIG. 71B is a schematic diagram of a locking mechanism according to the ninth embodiment in which locking is in process;

FIG. 71C is a schematic diagram of a locking mechanism according to the ninth embodiment as is in a locking state;

FIG. 72A is a schematic diagram of a locking mechanism according to a tenth embodiment as is before locking;

FIG. 72B is a schematic diagram of a locking mechanism according to the tenth embodiment as is in a locking state;

FIG. 72C is a schematic diagram of a locking mechanism according to the tenth embodiment as is in an unlocking state;

DETAILED DESCRIPTION

Figure 1:
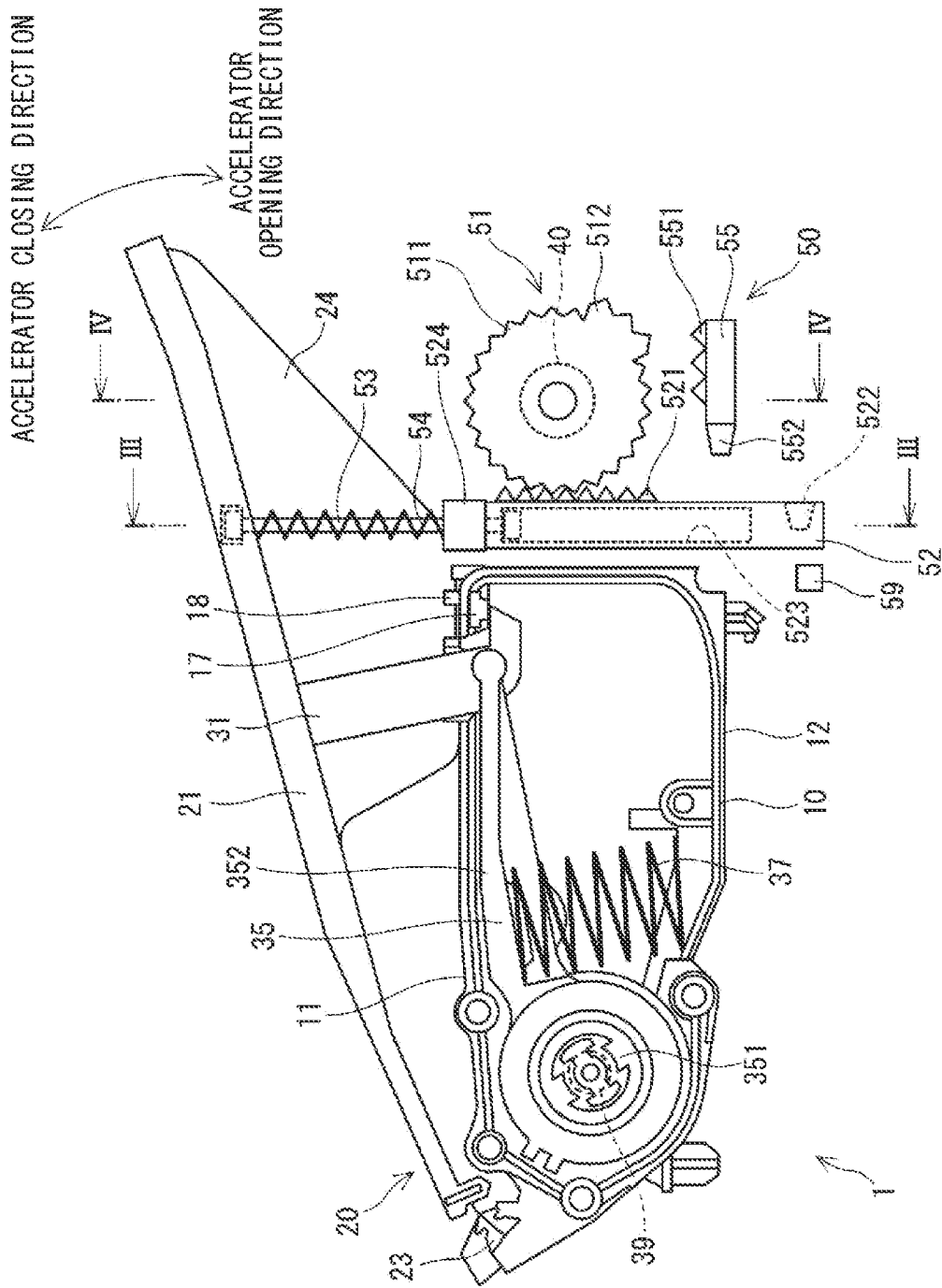
FIG. 1 is a side view of an accelerator device according to a first embodiment.

Hereinafter, examples of the present disclosure will be described.

According to an example of the present disclosure, an accelerator pedal module is provided with an actuator driven by a solenoid. The actuator is engaged with a rotating member and applies force in a return direction.

The actuator does not have any other function than a function of exerting force in a return direction.

An accelerator device according to a first example includes at least one drive source, a pedal lever, and a power transmission mechanism. The pedal lever is moved according to a pedal depressing operation. Using driving of the drive source, the power transmission mechanism is configured to transmit force both in a pedal lever closing direction and opening direction to the pedal lever. As a result, expansion of the functionality of the accelerator device can be implemented based on the actuator.

An accelerator device according to a second example or a third example includes a drive source, a pedal lever, a power transmission mechanism, a locking mechanism, and a control unit. The pedal lever is moved according to a depressing operation. The power transmission mechanism is configured to transmit driving force form the drive source to the pedal lever. The locking mechanism drives a locking member to a lock position by the drive source and locks the pedal lever there.

According to the second example, the control unit includes a drive control unit that controls driving of the drive source and an erroneous depression determination unit that determines an erroneous depression of the pedal lever. When an erroneous depression of the pedal lever is determined, the drive control unit drives the drive source to lock the pedal lever.

According to the third example, the control unit includes a drive control unit that controls driving of the drive source and a range determination unit that determines a shift range. When a shift lever is determined to be in a reverse range, the drive control unit drives the drive source to lock the pedal lever.

A fourth example to a sixth example are provided with a drive source, a pedal lever, a power transmission mechanism, and a control unit. The pedal lever is moved according to a depressing operation. The power transmission mechanism is configured to transmit force in a pedal lever closing direction to the pedal lever by driving of the drive source.

According to the fourth example, the control unit includes a drive control unit that controls driving of the drive source and an erroneous depression determination unit that determines an erroneous depression of the pedal lever. When erroneous depression of the pedal lever is determined, the drive control unit drives the drive source to exert reaction force in a return direction of the pedal lever.

According to a fifth example and a sixth example, the control unit includes a drive control unit that controls driving of the drive source. According to the fifth example, the drive control unit controls driving of the drive source so as to exert driver-sensible pulsed reaction force at least once. According to the sixth example, constant reaction force is exerted in a return direction of the pedal lever for a predetermined time or longer.

Hereafter, a description will be given to an accelerator device according to the present disclosure with reference to the drawings. In the following description of a plurality of embodiments, substantially identical configuration elements will be marked with identical reference numerals and symbols and a description thereof will be omitted.

First Embodiment

Figure 2:
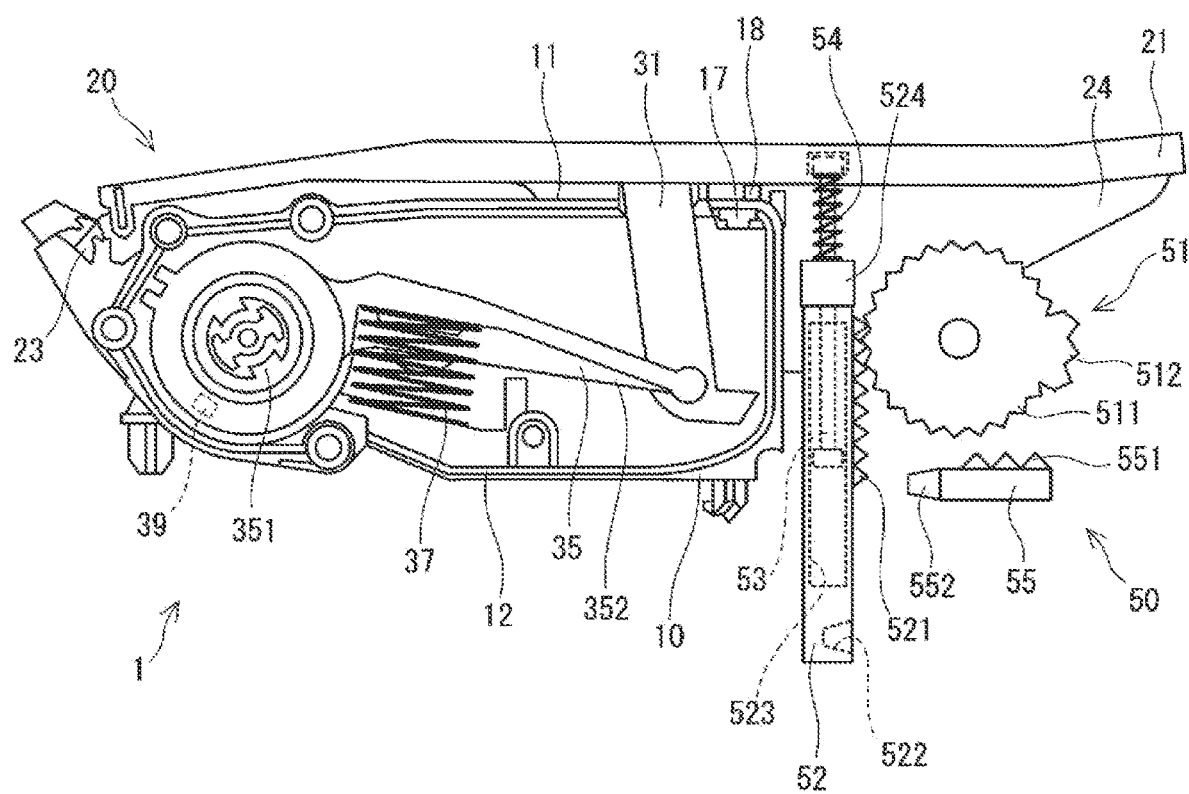
FIG. 2 is a side view of an accelerator device according to the first embodiment as is in a fully opened state.
Figure 3:
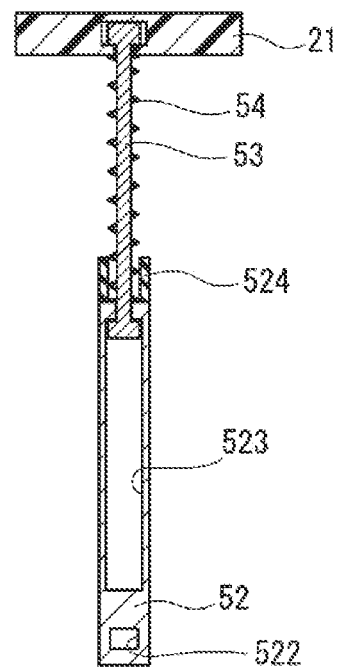
FIG. 3 is a cross-sectional view taken along line III-III of FIG. 1.
Figure 4:
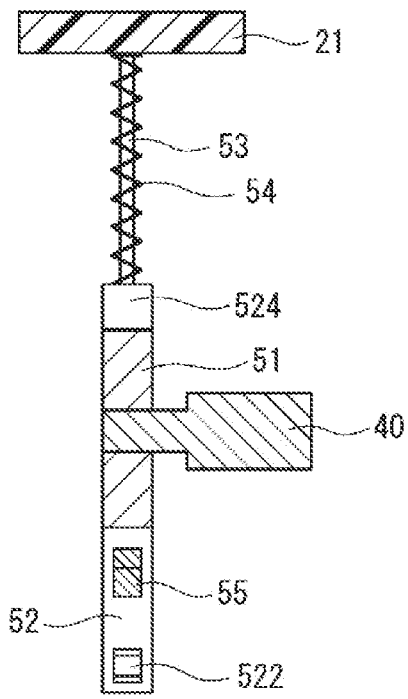
FIG. 4 is a cross-sectional view taken along line IV-IV of FIG. 1.
Figure 5:
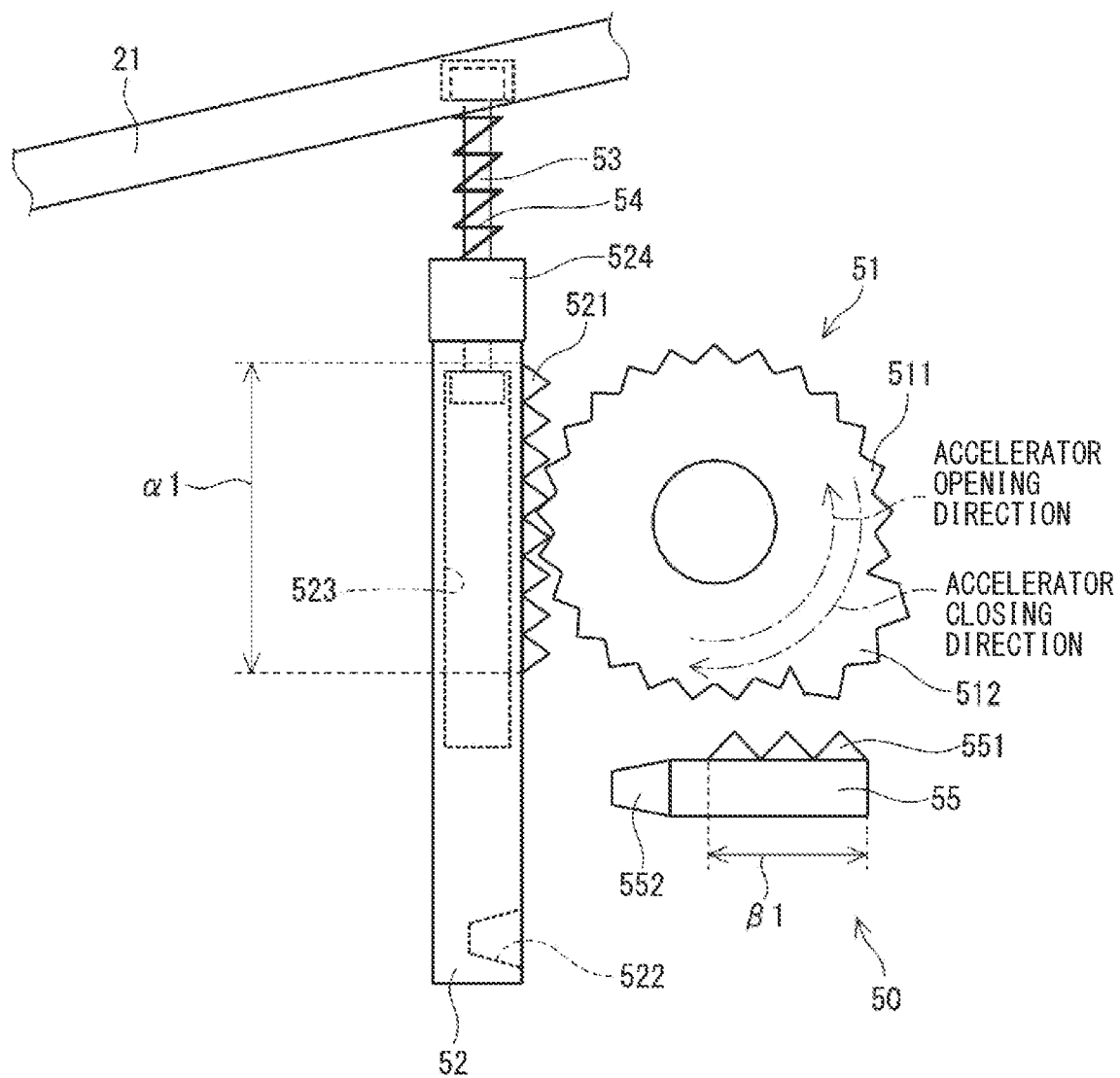
FIG. 5 is a schematic diagram of a power transmission mechanism according to the first embodiment.

FIG. 1 to FIG. 11 illustrate the first embodiment. An accelerator device 1 is so configured that the accelerator device can be mounted on a floor panel, not shown, constituting a part of a vehicle body of a vehicle. As shown in FIG. 1 and FIG. 2, the accelerator device 1 includes a case 10, a pedal lever 20, a motor 40 (refer to FIG. 4 and the like) as a drive source, a power transmission mechanism 50, and the like.

The case 10 can be mounted on the vehicle body and houses therein such internal movable mechanisms as a pedal 35. FIG. 1 and the like show the case 10 with a cover, not shown, provided on this side of each page, removed. Also, in the drawings in connection with the following embodiments, the cover and the like are appropriately removed. FIG. 1 shows an accelerator fully closed state in which the pedal lever 20 is not depressed and FIG. 2 shows an accelerator fully opened state in which the pedal lever 20 is depressed to the limit.

The pedal lever 20 includes a pad 21, an arm 31, and the pedal 35 and these elements are integrally driven by a driver's depressing operation or the like. The pad 21 is so provided that the pad can be depressed by a driver. The pad 21 is rotatably supported in the case 10 by a fulcrum member 23 provided on the case 10. The pedal lever 20 in the present embodiment is of a so-called "floorstanding type" and is so provided that the pad 21 is extended in a direction along one face of the case 10. A wall portion of the case 10 on the side opposed to the pad 21 is taken as a top wall portion 11 and a wall portion opposed to the top wall portion 11 is taken as a bottom wall portion 12. A side guard 24 is a member that guards a gap between the pad 21 and the case 10 to prevent a driver's foot from getting clamped between the pad 21 and the case 10.

The arm 31 couples the pad 21 and the pedal 35 with each other. An opening into which the arm 31 is inserted is formed in the top wall portion 11 of the case 10. The opening into which the arm 31 is inserted is so formed that the opening will not interfere with the arm 31 throughout the range of pedal operation.

The pedal 35 is housed in an internal space in the case 10 and includes a shaft portion 351 and a coupling portion 352. The shaft portion 351 is rotatably supported in the case 10. The coupling portion 352 is so formed as to extend from the shaft portion 351 substantially along the top wall portion 11. An end portion of the coupling portion 352 on the side opposed to the shaft portion 351 is engaged with the arm 31. As a result, the pad 21, the arm 31, and the pedal 35 are integrally driven by a driver's operation on the pad 21.

A pedal biasing member 37 is a compression spring. With one end thereof fixed on the pedal 35 and the other end fixed on the bottom wall portion 12, the pedal biasing member biases the pedal 35 in a closing direction. When the pad 21 is not depressed by a driver, the arm 31 is abutted against a fully closed stopper 17 formed inside the top wall portion 11. When the pad 21 is depressed, the pad 21 is abutted against a fully opened stopper 18 formed outside the top wall portion 11. Hereafter, a state in which the arm 31 is abutted against the fully closed stopper 17 will be referred to as "accelerator fully closed state" and a state in which the pad 21 is abutted against the fully opened stopper 18 will be referred to as "accelerator fully opened state."

An accelerator opening sensor 39 generates an accelerator opening signal corresponding to a rotation angle of the shaft portion 351. The accelerator opening sensor 39 has a detection circuit including, for example, a Hall element detecting an orientation of a permanent magnet embedded in the shaft portion 351. Any other element than a Hall element may be adopted as long as the accelerator opening sensor 39 is configured to detect an accelerator opening. An accelerator opening signal is outputted to such ECU as an engine ECU by way of a connector, not shown.

The motor 40 (refer to FIG. 4) is, for example, a DC motor and is provided between the arm 31 and the tip side of the pad 21. Driving force of the motor 40 is transmitted to the pedal lever 20 by way of the power transmission mechanism 50. As a result, the pedal lever 20 is driven by the driving force of the motor 40. By providing the power transmission mechanism 50, the accelerator device 1 in the present embodiment is so configured that the accelerator device is configured to actively drive the pedal lever 20 both in an accelerator closing direction (hereafter, also referred to as "return direction" as appropriate) and in an accelerator opening direction (hereafter, also referred to as "depressing direction" as appropriated) by driving force of the motor 40.

Figure 81A:
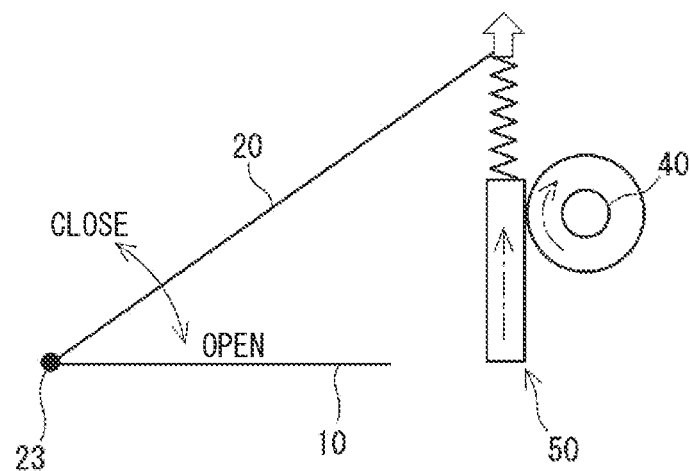
FIG. 81A is a schematic diagram illustrating driving of a pedal lever in a return direction.

Prior to a detailed description of the power transmission mechanism 50, a conceptional description will be given to bidirectional driving of the pedal lever 20 by an actuator. A series of configuration elements that transmits power from the drive source to the pedal lever 20 by way of the power transmission mechanism will be designated as "actuator." When the power transmission mechanism 50 is formed of such a linear-motion member as a rack gear and a compression spring as shown in FIG. 81A, the pedal lever 20 can be driven in an accelerator closing direction by the linear-motion member being moved by driving of the motor 40.

Figure 81B:
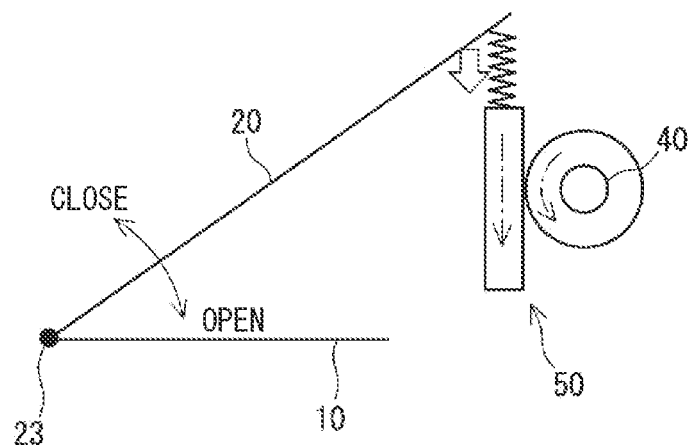
FIG. 81B is a schematic diagram illustrating driving of a pedal lever in a depressing direction.
Figure 82A:
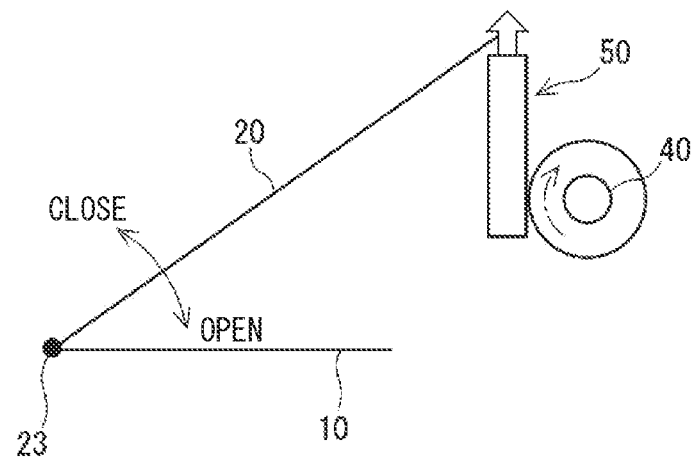
FIG. 82A is a schematic diagram illustrating driving of a pedal lever in a return direction.
Figure 82B:
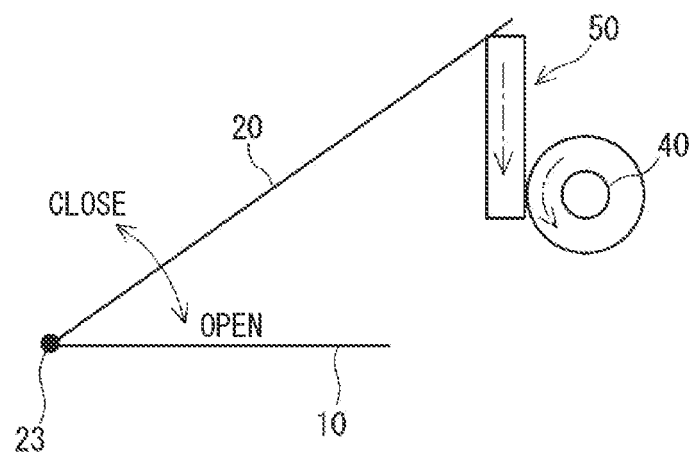
FIG. 82B is a schematic diagram illustrating driving of a pedal lever in a depressing direction.

When the power transmission mechanism 50 is formed of a linear-motion member and a tension spring as shown in FIG. 81B, the pedal lever 20 can be driven in an accelerator opening direction by the linear-motion member being moved by driving of the motor 40. As shown FIG. 82A and FIG. 82B, the linear-motion member may directly drive the pedal lever 20 without the intervention of a spring. As a result, reaction force is adjustable. In the description here, a mechanism in which the power transmission mechanism 50 is caused to make a linear motion by the motor 40 is taken as an example. Instead, a rotating mechanism may be adopted to configure the accelerator device.

Figure 83A:
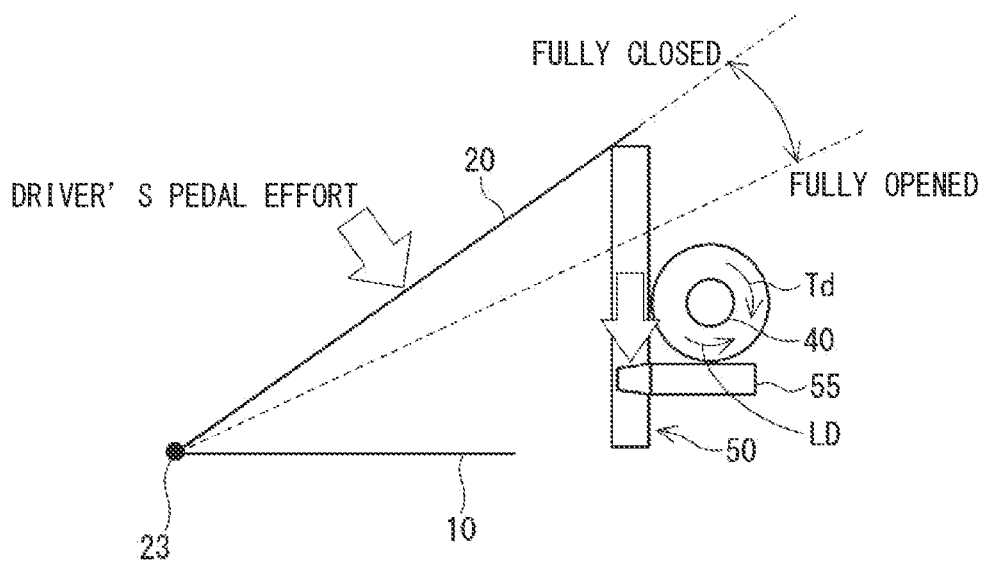
FIG. 83A is a schematic diagram illustrating a locking mechanism that locks a pedal lever as is in a fully closed state.
Figure 83B:
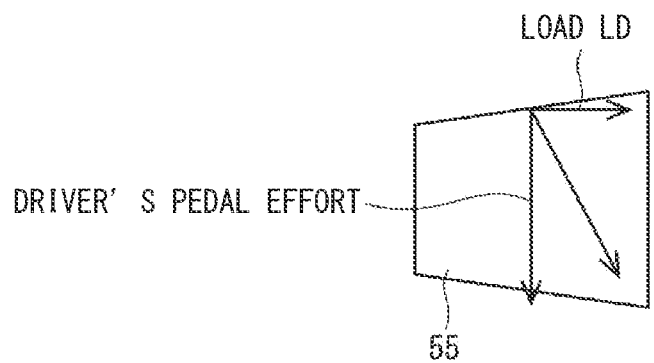
FIG. 83B is an explanatory drawing illustrating force exerted when a pedal is locked.
Figure 84:
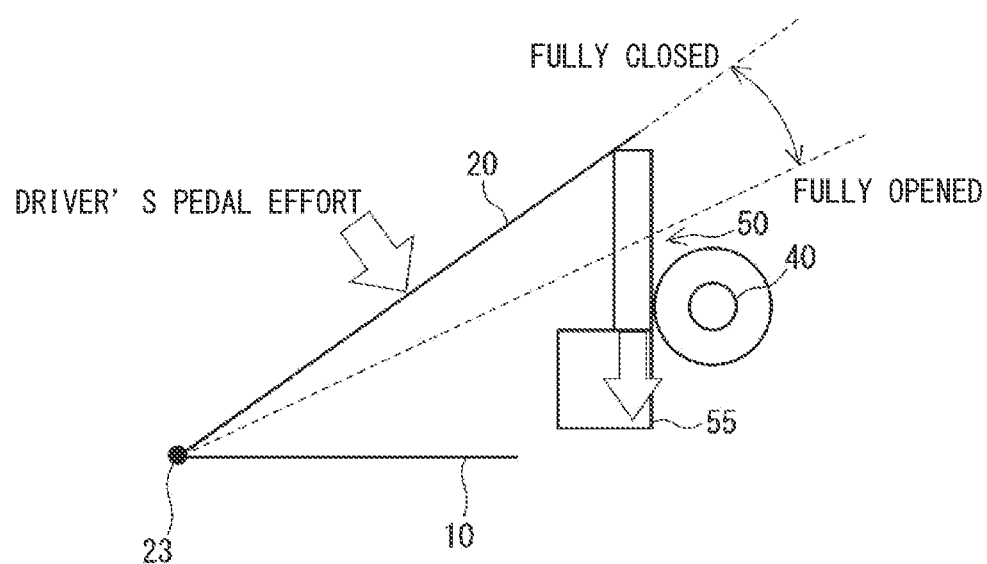
FIG. 84 is a schematic diagram illustrating a locking mechanism that locks a pedal lever as is in a fully closed state.

When a locking member 55 that locks the pedal lever 20 in a fully closed state is provided as shown FIG. 83A and FIG. 84, the pedal lever can be caused to function as a footrest, for example, by fixing the pad 21 during an automatic operation. At this time, as shown in FIG. 83A and FIG. 83B, the accelerator device is preferably so configured that a driver's pedal effort is divided by a slope to reduce a load applied to the motor 40 side when the pedal is locked. When a load LD applied to the motor 40 side can be kept smaller than a detent torque Td produced when energization of the motor 40 is cut, a locking state can be maintained even when energization of the motor 40 is turned off. This is also the case with locking in a fully opened state. The accelerator device may be so configured that a driver's pedal effort is not exerted on the motor 40 side when the pedal is locked as shown in FIG. 84.

Figure 85A:
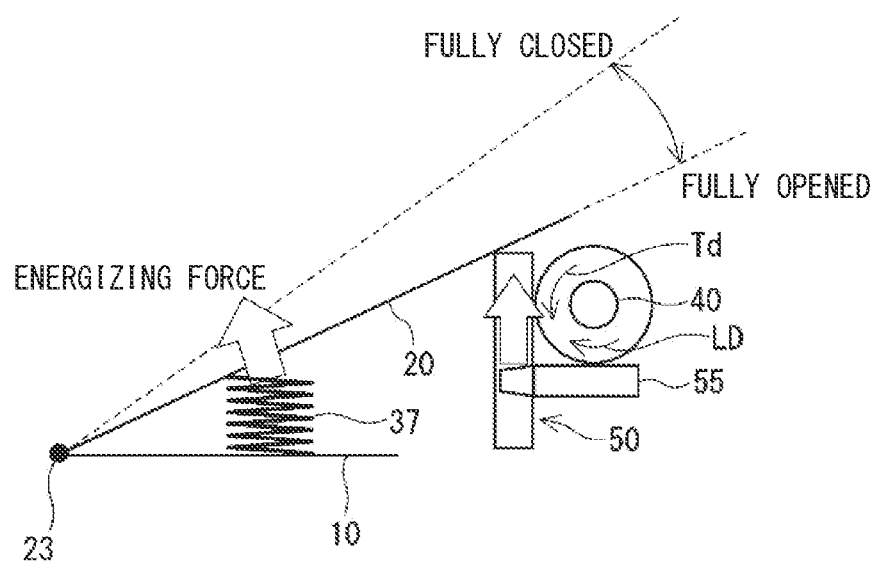
FIG. 85A is a schematic diagram illustrating a locking mechanism that lock a pedal lever as is in a fully opened state.
Figure 85B:
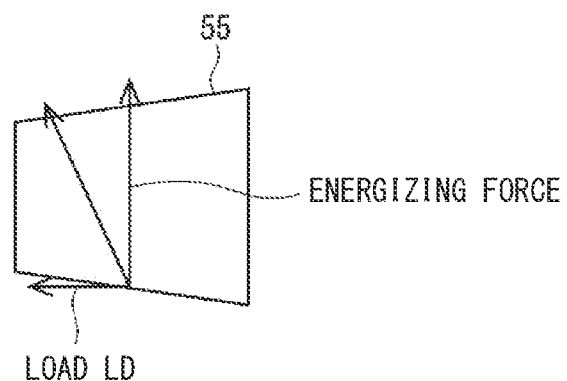
FIG. 85B is an explanatory drawing illustrating force exerted when a pedal is locked.
Figure 86:
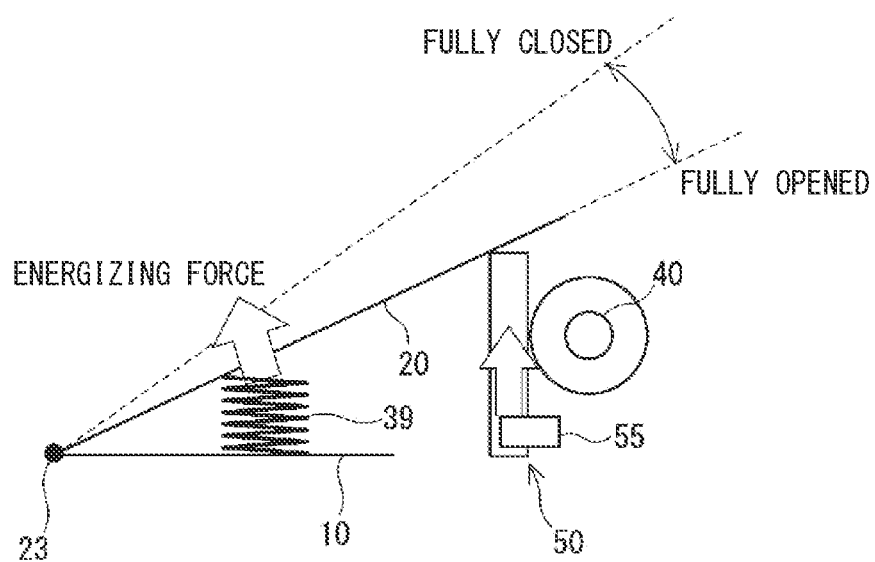
FIG. 86 is a schematic diagram illustrating a locking mechanism that locks a pedal lever as is in a fully opened state.

As shown in FIG. 85A, FIG. 85B, and FIG. 86, the accelerator device may be so configured that the pedal lever 20 is locked in a fully opened state by the locking member 55. In this case, vehicle control according to an accelerator opening is cut on the system side, for example, by stopping an output of an accelerator opening signal or taking like measures. As shown in FIG. 85A and FIG. 85B, the accelerator device is preferably so configured that biasing force of the pedal biasing member 37 is divided by a slop to reduce a load exerted on the motor 40 side when the pedal is locked. As shown in FIG. 86, the accelerator device may be so configured that biasing force of the pedal biasing member 37 is not exerted on the motor 40 side when the pedal is locked.

FIG. 81A to FIG. 86 illustrate an overview of the power transmission mechanism according to the present specification and a description of concepts of the following embodiments is also included. Though all the concepts do not correspond to the present embodiment, reference numerals and symbols corresponding to the present embodiment are given for convenience's sake.

The pedal lever 20 is actively driven in a return direction by the motor 40 as a drive source. As a result, when it is determined, for example, based on a driving situation that depression of the pad 21 will degrade fuel efficiency, reaction force is exerted to produce a wall-like feeling and suppress a driver from depressing the pad 21. As a result, fuel efficiency can be enhanced. Further, that the pedal lever 20 is pulse-driven in a return direction can be utilized as a means for transmitting information about switching from automatic operation to manual operation or the like.

By driving the pedal lever 20 in a depressing direction, a pedal footing face position can be adjusted, for example, from a fully closed locking state to a pedal position corresponding to the vehicle's movement during transition from automatic operation to manual operation. Further, comfortability can be ensured during automatic operation or on other like occasions by locking the pedal lever 20 to cause the pad 21 to function as a footrest. It can be said that the accelerator device 1 has three functions, "active operation in a return direction," "active operation in a depressing direction," and "pedal lock." If structures for implanting these functions are separately provided, increase in the physical size of the accelerator device and complication thereof will result. To cope with this, in the accelerator device 1, the above three functions are implemented by the one motor 40 and one power transmission mechanism 50.

A description will be back to FIG. 1 to FIG. 5 and given to the details of the power transmission mechanism 50 in the present embodiment. In FIG. 1 and the like, hidden lines related to a connecting pin 53 and a reaction force adjusting biasing member 54 inside a spring receiving portion 524 described later are omitted for the avoidance of complication. The power transmission mechanism 50 is a spur gear and includes a linear-motion member 52, the connecting pin 53, the reaction force adjusting biasing member 54, the locking member 55, and the like. A gear 51 includes a first gear portion 511 and a second gear portion 512 and is rotationally driven by the motor 40. The first gear portion 511 is so configured that the first gear portion is enabled to engage with a driving rack gear portion 521 of the linear-motion member 52. The second gear portion 512 is so formed as to radially protrude outward from a part of the first gear portion 511 in a circumferential direction. The second gear portion 512 is so formed that the second gear portion is enabled to engage with a locking rack gear portion 551 of the locking member 55.

Figure 6:
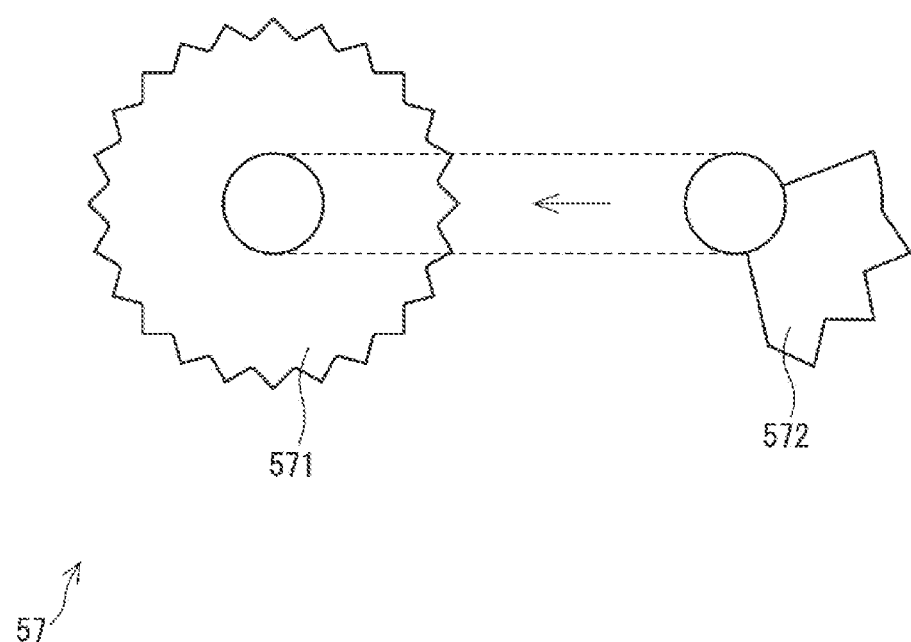
FIG. 6 is a schematic diagram illustrating a modification of a gear.

The first gear portion 511 and the second gear portion 512 may be formed as one spur gear as shown in FIG. 1 and the like or the first gear portion 571 and the second gear portion 572 may be formed as different members and be overlaid together to form a gear 57 as shown in FIG. 6.

The linear-motion member 52 includes the driving rack gear portion 521, an engagement hole portion 522, a housing chamber 523, and the spring receiving portion 524 and is formed, for example, in a cylindrical shape. The driving rack gear portion 521 is formed in a side face opposed to the gear 51 and is so formed that the driving rack gear portion is enabled to engage with the first gear portion 511 of the gear 51. The engagement hole portion 522 is so formed that, when the pedal lever 20 is locked, the engagement hole portion is enabled to engage with an engagement portion 552 of the locking member 55.

One end side of the connecting pin 53 is housed in the housing chamber 523. The housing chamber 523 is so formed that the housing chamber does not interfere with driving of the connecting pin 53 throughout the range of the pedal lever 20 from fully closed to fully opened. The spring receiving portion 524 is provided an end face of the linear-motion member 52 on the side opposed to the pad 21 and has one end of the reaction force adjusting biasing member 54 abutted thereagainst and fixed there.

One end of the connecting pin 53 is housed in the housing chamber 523 of the linear-motion member 52 and the other end is fixed in the pad 21 by clearance fit. An opening in which the connecting pin 53 is inserted is formed in an end portion of the linear-motion member 52 on the pad 21 side. The reaction force adjusting biasing member 54 is a compression spring provided outside a shank portion of the connecting pin 53 in the radial direction; and one end thereof is hooked to the spring receiving portion 524 of the linear-motion member 52 and the other end is abutted against the pad 21 and fixed there. A position sensor 59 is provided for detecting a position of the linear-motion member 52.

The locking member 55 includes the locking rack gear portion 551 and the engagement portion 552. The locking rack gear portion 551 is so formed that the locking rack gear portion is enabled to engage with the second gear portion 512 of the gear 51. The engagement portion 552 is so formed that the tip side thereof is reduced in diameter and is fit into the engagement hole portion 522 of the linear-motion member 52 when the pedal lever 20 is locked. In the present embodiment, the locking member 55 and the engagement hole portion 522 are provided closer to the depressing direction side than the gear 51 is. In other words, the operation surface of the pad 21, the gear 51, and the locking member 55 are arranged in this order.

A description will be given to an operation of the accelerator device 1 with reference to FIG. 7 to FIG. 9. In the present specification, a direction of rotation is described as clockwise direction or counterclockwise direction relative to the page surface for the sake of simplification but a member only has to be drivable in a relevant direction. It is added that a direction of rotation is not limited to clockwise direction or counterclockwise direction. In the drawings, the directions of movement of the pedal lever 20 and the linear-motion member 52, the direction of rotation of the gear 51, and the directions of movement of such members as the linear-motion member 52 will be indicated by an arrow of an alternate long and short dashed line. This is the same also with the following embodiments.

Figure 7:
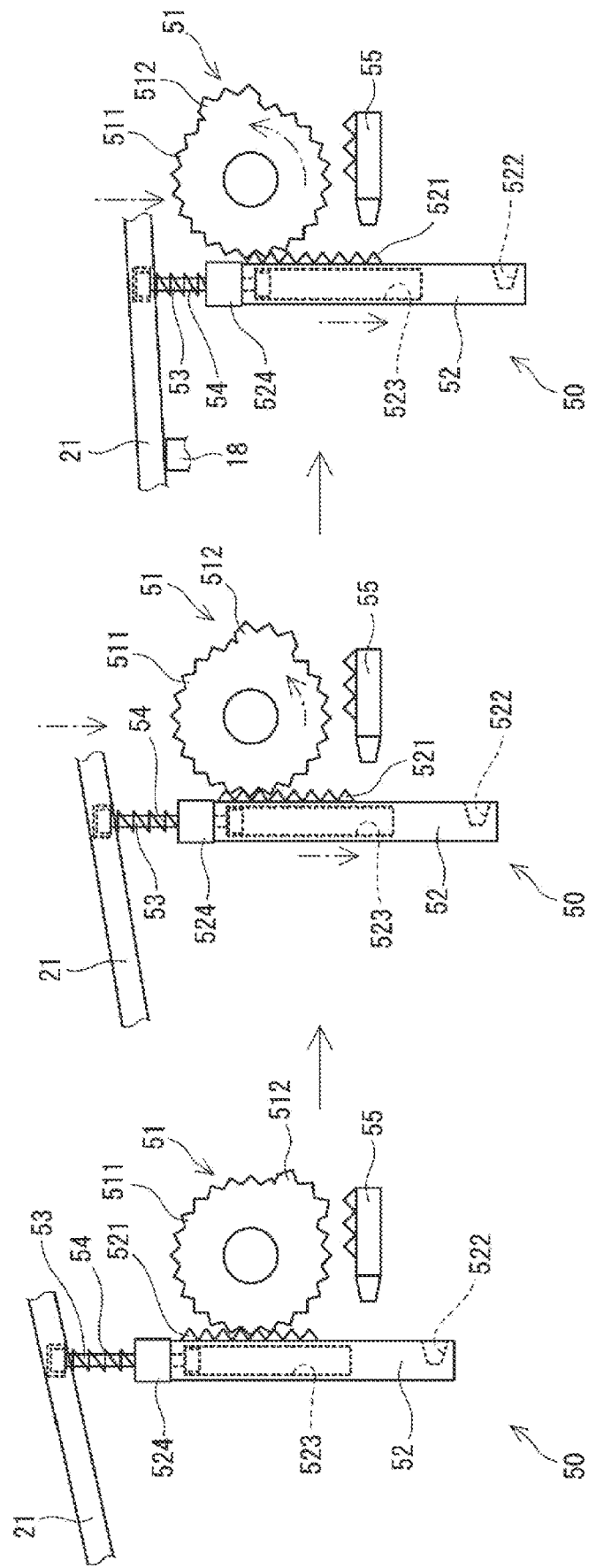
FIG. 7 is an explanatory drawing illustrating an operation of a power transmission mechanism according to the first embodiment with a motor not driven.

FIG. 7 illustrates a normal operation with the motor 40 not driven. In FIG. 7, the left side of the page surface shows an accelerator fully closed state, the central part shows an intermediate opening, and the right side of the page surface shows an accelerator fully opened state. In the accelerator fully opened state, the first gear portion 511 of the gear 51 and the driving rack gear portion 521 of the linear-motion member 52 are engaged with each other. When the pad 21 is depressed by a driver, the linear-motion member 52 is moved in the driver's depressing direction (that is, downward direction in the page surface) by tensile force of the reaction force adjusting biasing member 54. As a result, the gear 51 is rotated and the motor 40 is corotated. Even after the linear-motion member 52 is moved downward in the page surface to an accelerator fully opened state, the gear 51 and the locking member 55 are away from each other. That is, the gear 51, the linear-motion member 52, and the locking member 55 are so configured that the following takes place within a normal operation range: the first gear portion 511 and the driving rack gear portion 521 of the linear-motion member 52 are engaged with each other and the second gear portion 512 and the locking rack gear portion 551 of the locking member 55 are not engaged with each other. As a result, within a normal operation range, the locking member 55 does not regulate movement of the linear-motion member 52.

Figure 8:
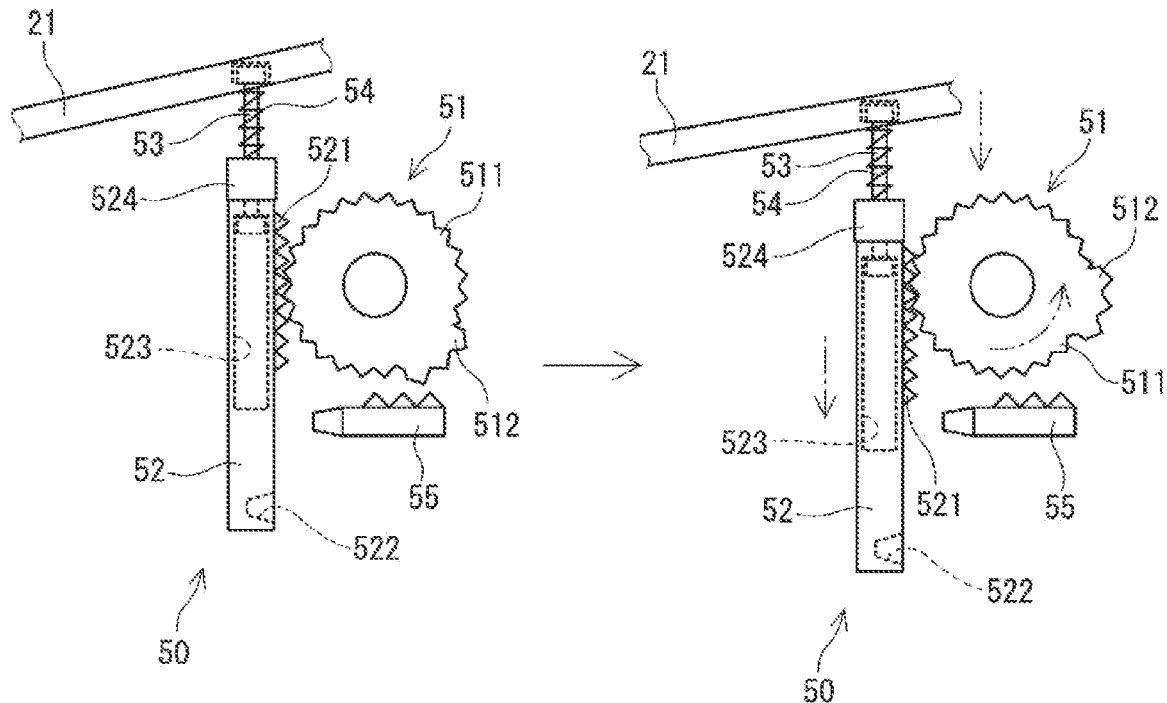
FIG. 8 is an explanatory drawing illustrating an operation of a power transmission mechanism according to the first embodiment observed when a pedal lever is actively driven in a depressing direction by driving of a motor.

FIG. 8 shows a state in which the pedal lever 20 is actively driven in a depressing direction by driving of the motor 40. In the accelerator fully closed state shown on the left side of the page surface, the first gear portion 511 of the gear 51 and the driving rack gear portion 521 of the linear-motion member 52 are engaged with each other. When the motor 40 is driven in a such a direction that the linear-motion member 52 is pulled toward a depressing direction (in FIG. 8, counterclockwise direction in the page surface) by way of the gear 51 as shown on the right side of the page surface, the pedal lever 20 is pulled toward a depressing direction by the connecting pin 53. Thus, the pedal lever 20 can be driven in a depressing direction by driving of the motor 40. In relation to FIG. 8, a description is given to driving from an accelerator fully closed state but also with an intermediate opening, the pedal lever 20 can be driven in a depressing direction by taking the similar measures.

Figure 9:
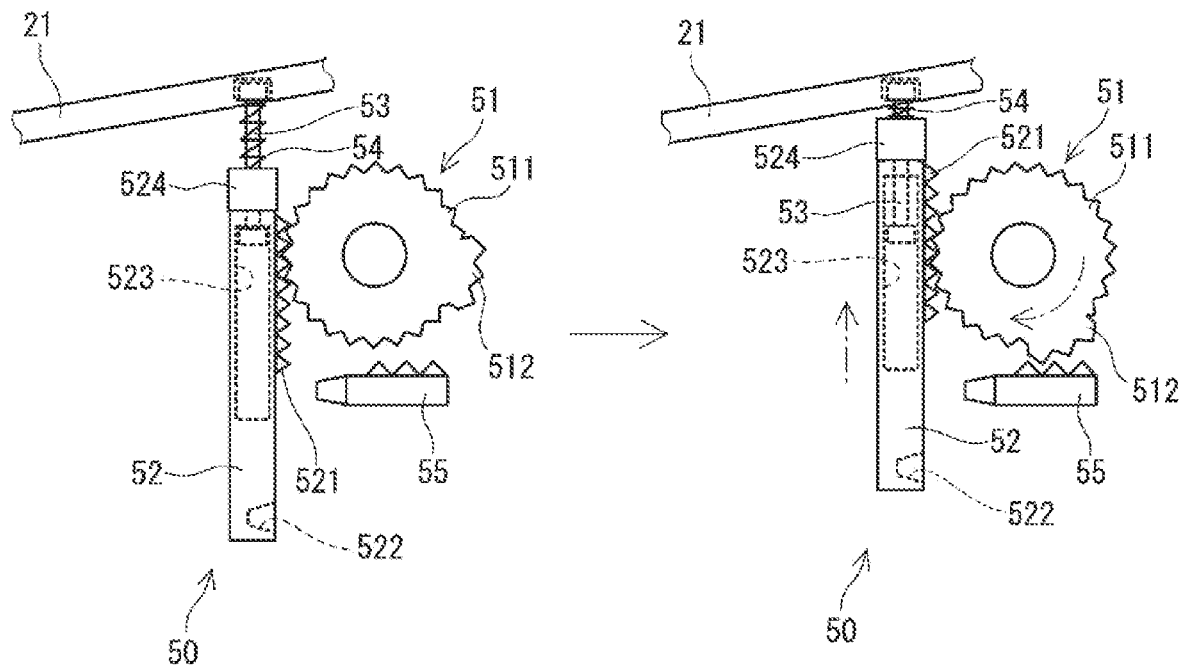
FIG. 9 is an explanatory drawing illustrating an operation of a power transmission mechanism according to the first embodiment observed when a pedal lever is actively driven in a return direction by driving of a motor.

FIG. 9 shows a state in which the pedal lever 20 is actively driven in a return direction by driving of the motor 40. With an intermediate opening shown on the left side of the page surface, the first gear portion 511 of the gear 51 and the driving rack gear portion 521 of the linear-motion member 52 are engaged with each other. When the motor 40 is driven in such a direction that the linear-motion member 52 is pushed up toward a return direction (in FIG. 9, clockwise direction in the page surface) by way of the gear 51 as shown on the right side of the page surface, the reaction force adjusting biasing member 54 is squeezed; as a result, reaction force can be enhanced. That is, in the present embodiment, reaction force is indirectly given to the pedal lever 20 by way of the reaction force adjusting biasing member 54; and the pedal lever 20 is directly pulled toward a depressing direction by the connecting pin 53. Further, a position and reaction force of the pedal lever 20 can be appropriately controlled by controlling driving of the motor 40 based on a detection value of the position sensor 59. Illustration of the position sensor 59 is omitted in the other drawings than FIG. 1, including the drawings related to the following embodiments.

Figure 10:
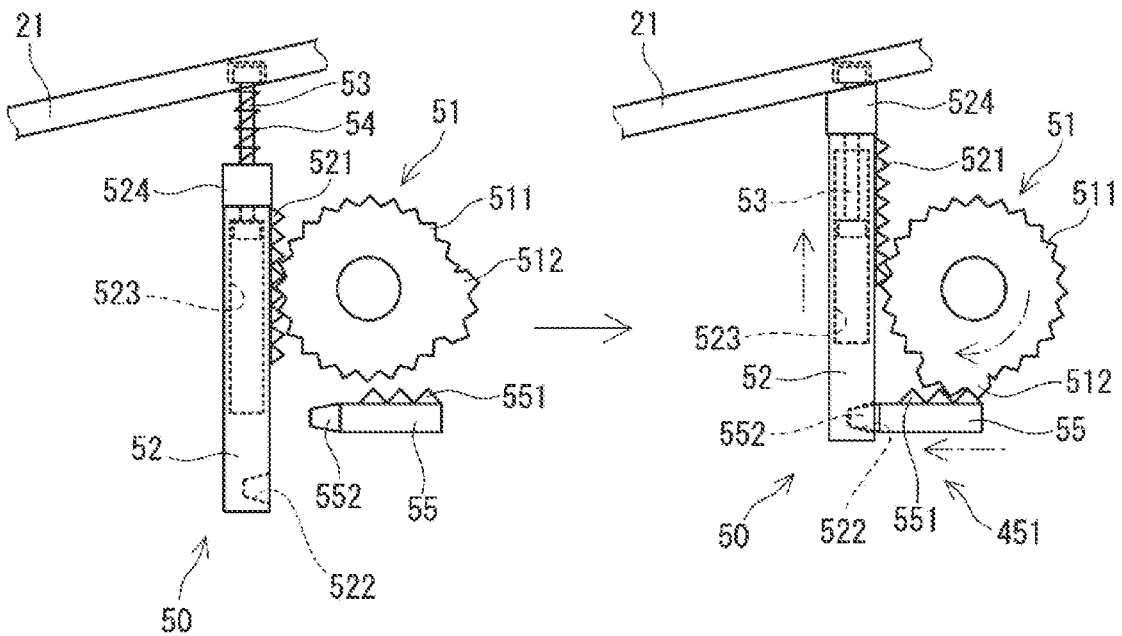
FIG. 10 is an explanatory drawing illustrating an operation of a locking mechanism according to the first embodiment.

The accelerator device 1 in the present embodiment includes a locking mechanism 451 and the pedal lever 20 can be caused to function as a footrest by locking the pedal lever, for example, during an automatic operation. FIG. 10 illustrates a locking operation in the present embodiment. In an accelerator fully closed state during a normal operation shown on the left side of the page surface in FIG. 10, the first gear portion 511 of the gear 51 and the driving rack gear portion 521 of the linear-motion member 52 are engaged with each other; and the second gear portion 512 and the locking rack gear portion 551 of the locking member 55 are away from each other.

When the motor 40 is driven in a clockwise direction in the page surface as shown on the right side of the page surface in FIG. 10, the linear-motion member 52 is pushed up toward the pad 21 side and the linear-motion member 52 and the pad 21 are abutted against each other and as a result, the pad 21 is fixed. When the motor 40 is further driven in the same direction with the linear-motion member 52 and the pad 21 abutted against each other, the second gear portion 512 of the gear 51 and the locking rack gear portion 551 of the locking member 55 are engaged with each other. The locking member 55 is driven toward the linear-motion member 52 by rotation of the motor 40 and the engagement portion 552 is fit into the engagement hole portion 522. As a result, the pedal lever 20 is locked.

When α1 is taken as a range within which the driving rack gear portion 521 of the linear-motion member 52 and the first gear portion 511 are engaged with each other and β1 is taken as a range within which the locking rack gear portion 551 of the locking member 55 and the second gear portion 512 are engaged with each other, setting is made so that α1>β1. Space saving can be implemented by limiting a range of engagement between the locking rack gear portion 551 and the second gear portion 512 to a predetermined range including a lock position.

The engagement portion 552 is formed in a taper shape and the tip side thereof is reduced in diameter. In other words, the engagement portion 552 has a slope relative to a direction in which a driver's pedal effort is exerted. When the pad 21 is depressed by a driver in a pedal locking state, the driver's pedal effort is exerted on the engagement portion 552. As the result of the engagement portion 552 being formed in a taper shape and the driver's pedal effort being received by the slope, the driver's pedal effort is divided and thus, a load LD on the motor 40 side can be reduced (refer to FIG. 83B). Even when energization of the motor 40 is turned off, a locking state can be maintained by so designing such a shape of the engagement portion 552 as a taper angle that a load LD exerted on the motor 40 side is smaller than a detent torque Td produced when energization of the motor 40 is cut. As a result, power consumption and heat generation can be reduced as compared with cases where energization is constantly performed during locking.

Figure 11:
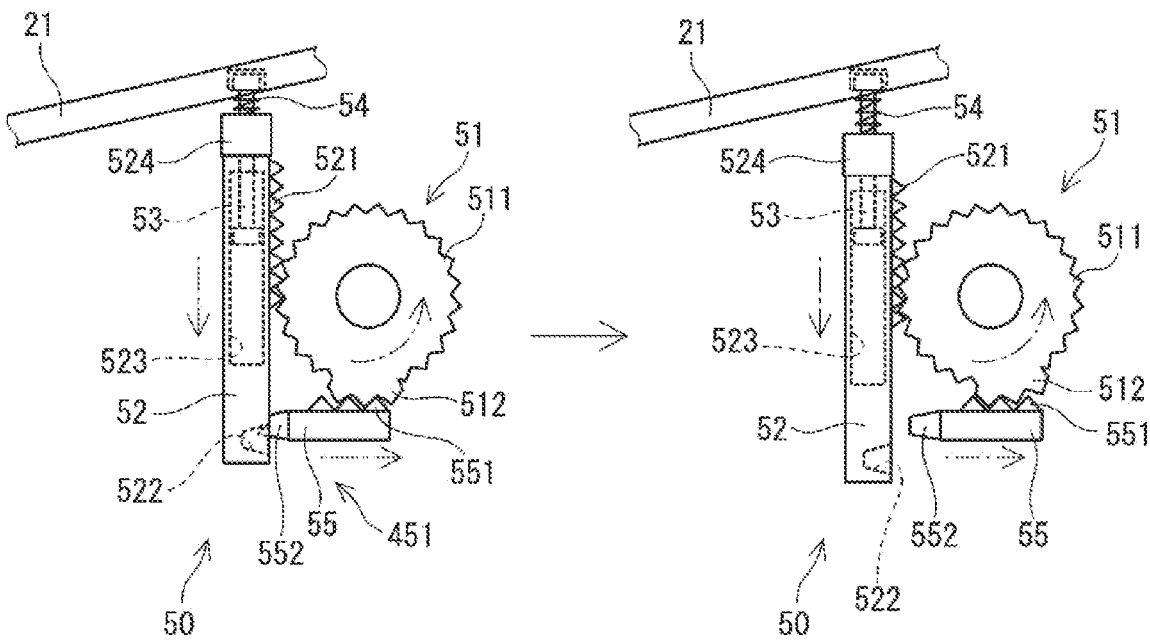
FIG. 11 is an explanatory drawing illustrating an unlock operation according to the first embodiment.
Figure 12:
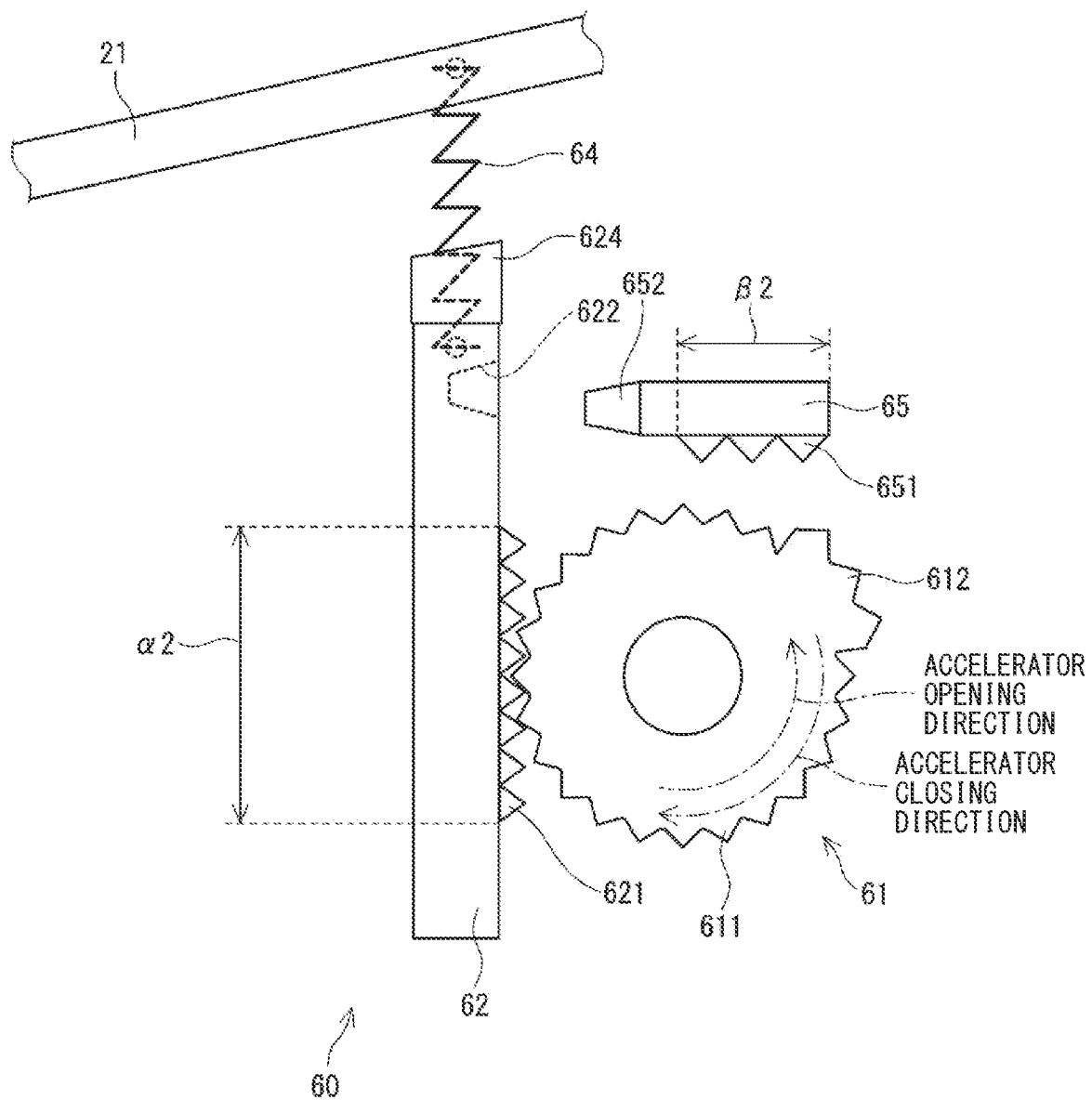
FIG. 12 is a schematic diagram of a power transmission mechanism according to a second embodiment.

FIG. 11 illustrates an operation during unlocking. In the present embodiment, the engagement portion 552 and the spring receiving portion 524 are formed of such an elastic material as rubber. When the motor 40 is driven in an opposite direction to that during locking with the engagement portion 552 fit into the engagement hole portion 522, the engagement portion 552 is elastically deformed and the engagement portion 552 comes out of the engagement hole portion 522. Further, as the result of the spring receiving portion 524 being elastically deformed, the linear-motion member 52 and the pad 21 get away from each other and an unlocking operation becomes feasible.

When a driver applies a relatively large load to the pedal lever 20 and a load LD exerted on the motor 40 side overcomes a detent torque Td produced when energization of the motor 40 is cut, the engagement portion 552 comes out of the engagement hole portion 522 and a locking state is canceled. As a result, even if the motor 40 cannot be driven in a locking state, an unlocking operation can be performed and an evacuation running can be made.

As described up to this point, the accelerator device 1 in the present embodiment includes at least one motor 40, the pedal lever 20, and the power transmission mechanism 50. The pedal lever 20 is moved according to a pedal depressing operation. In detail, the pedal lever 20 includes: the pad 21 configured to perform a pedal depressing operation; the pedal 35 rotatably supported in the case 10; and the arm 31 connecting the pad 21 and the pedal 35 with each other. The power transmission mechanism 50 is configured to transmit force both in the closing direction and opening direction of the pedal lever 20 to the pedal lever 20 by driving of the motor 40. In the present embodiment, especially, a movable range of the pedal lever 20 is so configured that the movable range spreads from fully closed to fully opened and force in both directions, return direction and depressing direction, can be supplied within the range. In other words, the pedal lever 20 is not driven to a position beyond the range from fully closed to fully opened. As a result, expansion of the functionality of the accelerator device 1 can be implemented by the motor 40.

In the present embodiment, the pedal lever 20 is actively given bidirectional force by one motor 40. "Actively given bidirectional force" cited here means that force pushing up or pulling down the pedal lever 20 is given by driving of the motor 40. This is a concept different from that force is passively exerted by gravity or external biasing force, for example, by bringing a member abutted against the pedal lever 20 away from the pedal lever.

Specifically, by exerting force in an accelerator closing direction to the pedal lever 20 by the motor 40, reaction force can be given to a driver and a push-back function and a notification function based on reaction force can be implemented. As a result, the enhancement of fuel efficiency, a danger notification, a notification of varied information, for example, related to automatic operation can be implemented.

By exerting force in an accelerator opening direction to the pedal lever 20 by the motor 40, the pedal lever can be automatically shifted to an accelerator opening corresponding to an acceleration of a vehicle or an electronic throttle opening during switching from automatic operation to manual operation. As a result, comfortability obtained during operation switching can be enhanced.

The accelerator device 1 includes the locking mechanism 451 configured to regulate movement of the pedal lever 20. "Configured to regulate movement of the pedal lever" cited here is a concept including that a movement of the pedal lever 20 is zeroed or a movement is made smaller than that in a non-locking state in the pedal lever 20 or the power transmission mechanism 50.

The locking mechanism 451 drives the locking member 55 to a lock position by the motor 40 and locks the pedal lever 20. In the present embodiment, the linear-motion member 52 and the locking member 55 constitute the locking mechanism 451. A position where the locking member 55 is fit into the engagement hole portion 522 of the linear-motion member 52 is equivalent to the "lock position." By locking the pedal lever 20, the pedal lever can be caused to function as a footrest during an automatic operation. The pedal lever 20 can be prevented from being depressed for erroneous depression prevention.

When predetermined or larger force is exerted to the pedal lever 20, the locking mechanism 451 can be unlocked. "Predetermined or larger force" cited here refers to force sufficiently larger than pedal effort applied to the pedal lever 20 by a driver's normal depressing operation. As a result, even if the motor 40 becomes faulty in a pedal locking state, an unlocking operation can be performed by depressing the pedal lever 20 with predetermined or lager force and evacuation running can be made.

The power transmission mechanism 50 includes the gear 51 driven by the motor 40 and the linear-motion member 52 having the driving rack gear portion 521 engaged with the gear 51. The power transmission mechanism 50 includes the connecting pin 53 and the reaction force adjusting biasing member 54. On end of the connecting pin 53 is fixed on the pedal lever 20 and the other end thereof is so housed in the housing chamber 523 formed in the linear-motion member 52 that the connecting pin is configured to be moved according to driving of the pedal lever 20. The reaction force adjusting biasing member 54 is provided between the linear-motion member 52 and the pedal lever 20.

Force in an opening direction is given to the pedal lever 20 by the motor 40 by way of the connecting pin 53. Force in a closing direction is given to the pedal lever 20 by the motor 40 by way of the reaction force adjusting biasing member 54. As a result, force both in a depressing direction and in a return direction can be actively given by the motor 40.

The locking mechanism 451 includes the locking member 55 to be fit into the engagement hole portion 522 formed in the linear-motion member 52. The locking member 55 constituting the locking mechanism 451 is driven by way of the gear 51 by the motor 40 that is a drive source used for the adjustment of reaction force to the pedal lever 20. As a result, movement of the linear-motion member 52 is regulated and the pedal lever 20 can be appropriately locked. The accelerator device is so configured that the locking member 55 and the linear-motion member 52 are locked by fit and a load LD applied from the pedal lever 20 to the motor 40 side is made smaller than a detent torque Td. As a result, with energization of the motor 40 kept off, a locking state can be maintained. Consequently, heat generation can be suppressed and power consumption can be reduced as compared with cases where a locking state is constantly maintained by energization.

The gear 51 includes the first gear portion 511 engaged with the driving rack gear portion 521 and the second gear portion 512 engaged with the locking rack gear portion 551 formed on the locking member 65. As a result, the linear-motion member 52 and the locking member 55 can be appropriately driven by the gear 51.

A range of engagement between the locking rack gear portion 551 and the second gear portion 512 is smaller than a range of engagement between the driving rack gear portion 521 and the first gear portion 511. As a result, a range within which the locking member 65 is moved is limited and thus, the physical size of the accelerator device can be reduced.

The locking mechanism 451 locks the pedal lever 20 in a fully closed state. In detail, the engagement hole portion 522 is provided on the side farther from the pedal lever 20 than the driving rack gear portion 521 and locks the pedal lever 20 in a fully closed state. As a result, even if any trouble occurs in the motor 40 in a locking state, an accelerator fully closed state is maintained; therefore, safety can be ensured. A positional relation between the engagement hole portion 522 and the driving rack gear portion 521 can be inverted by placing a gear in-between. This is the same also with a second embodiment.

In a locking state, at least either a point of abutment between the linear-motion member 52 and the pedal lever 20 or a point of abutment between the linear-motion member 52 and the locking member 55 is so formed that the point is elastically deformable during an unlocking operation. In the present embodiment, the engagement portion 552 of the locking member 55 and the spring receiving portion 524 of the linear-motion member 52 are made elastically deformable during an unlocking operation by forming the engagement portion and the spring receiving portion of a flexible member. As a result, a locking state can be appropriately canceled. An unlocking operation can be performed as long as one of the engagement portion 552 and the spring receiving portion 524 is elastically deformable. Therefore, the other may be formed of a member that does not flexibility and is not elastically deformable.

Second Embodiment

FIG. 12 to FIG. 15 illustrate the second embodiment. The second embodiment to a fifth embodiment are different from the above-mentioned embodiment in power transmission mechanism and a description will be given with the focus placed on this respect. A power transmission mechanism 60 includes a gear 61, a linear-motion member 62, a reaction force adjusting biasing member 64, a locking member 65, and the like. The power transmission mechanism 60 in the present embodiment is not provided with a connecting pin. The reaction force adjusting biasing member 64 is a tension spring In the present embodiment, an engagement hole portion 622 of the linear-motion member 62 is provided between a driving rack gear portion 621 and the pad 21. The locking member 65 is provided between the gear 61 and the pad 21. As in the above embodiment, when $\alpha 2$ is taken as a range of engagement between the driving rack gear portion 621 and a first gear 611 of the gear 61 and $\beta 2$ is taken as a range of engagement between a locking rack gear portion 651 of the locking member 65 and a second gear portion 612 of the gear 61, setting is made so that $\alpha 2 > \beta 2$.

Figure 13:
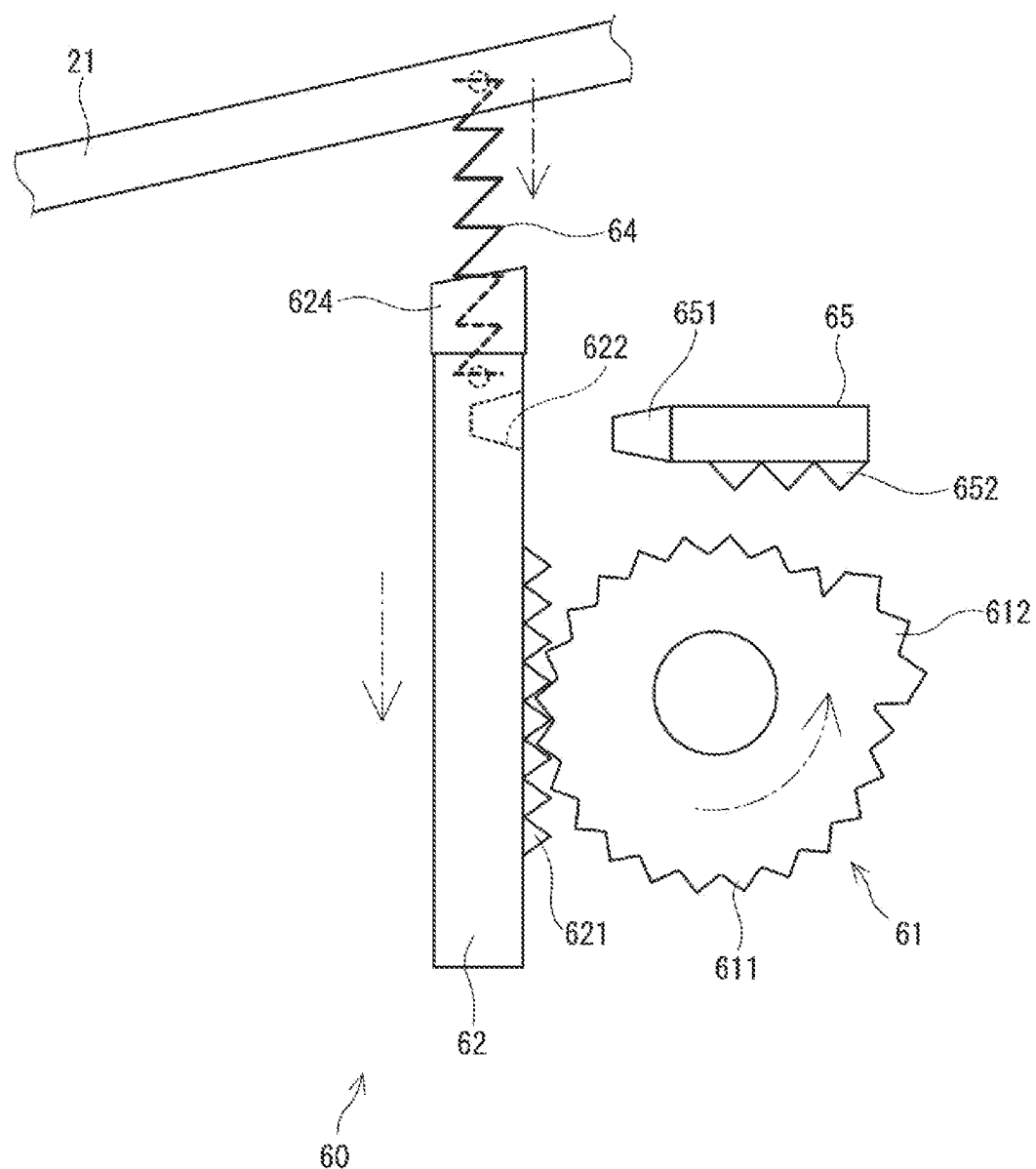
FIG. 13 is an explanatory drawing illustrating an operation of a power transmission mechanism according to the second embodiment observed when a pedal lever is actively driven in a depressing direction by driving of a motor.

In the present embodiment, as shown in FIG. 13, when the motor 40 is rotated in such a direction as to pull down the linear-motion member 62 and tensile force of the reaction force adjusting biasing member 64 overcomes biasing force of the pedal biasing member 37, the pedal lever 20 is pulled in a depressing direction by the reaction force adjusting biasing member 64. As a result, the pedal lever 20 can be driven in a depressing direction by driving of the motor 40.

Figure 14:
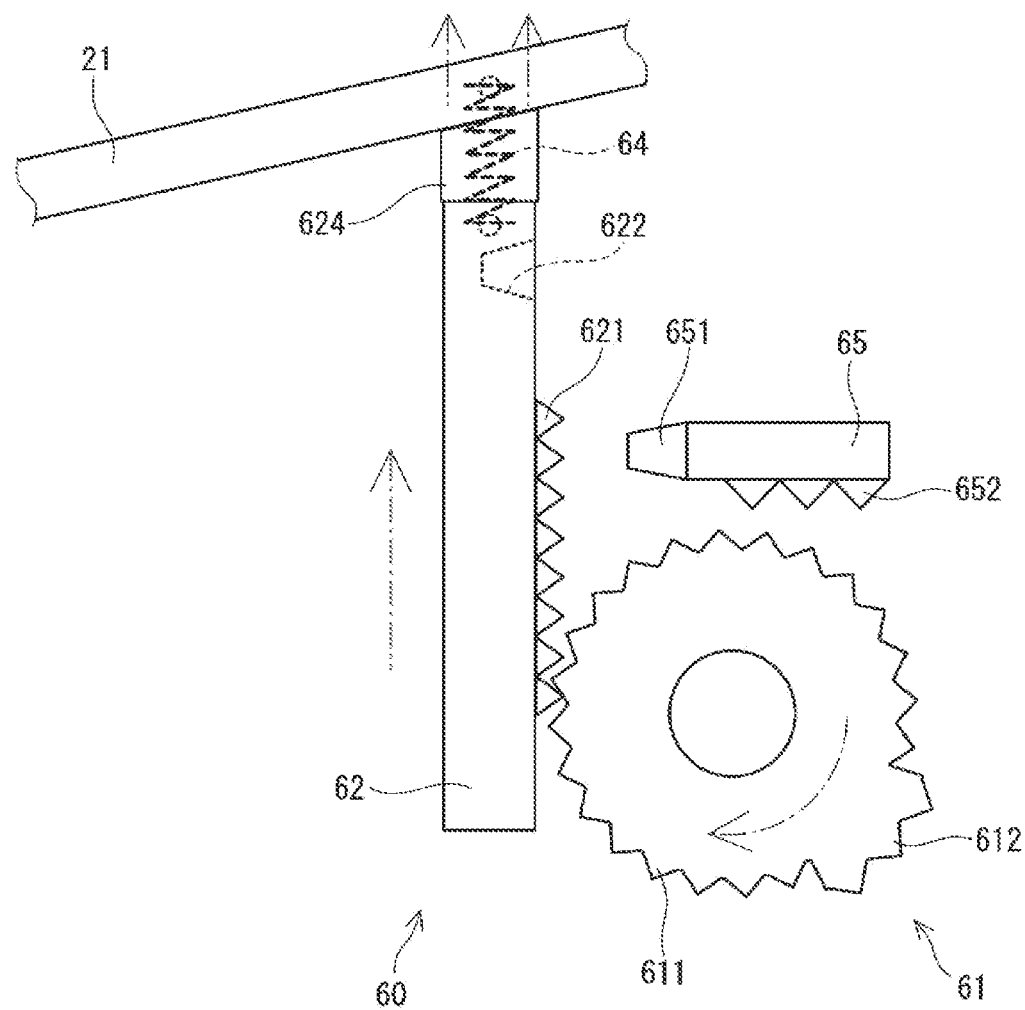
FIG. 14 is an explanatory drawing illustrating an operation of a power transmission mechanism according to the second embodiment observed when a pedal lever is actively driven in a return direction by driving of a motor.

When the motor 40 is rotated in such a direction as to push up the linear-motion member 62 as shown in FIG. 14, a spring receiving portion 624 of the linear-motion member 62 is abutted against the pad 21 and the pad 21 is directly pushed up by the linear-motion member 62. That is, in the present embodiment, the pedal lever 20 is indirectly pulled in a depressing direction by way of the reaction force adjusting biasing member 64 and reaction force is directly given to the pedal lever 20 by the linear-motion member 62.

Figure 15:
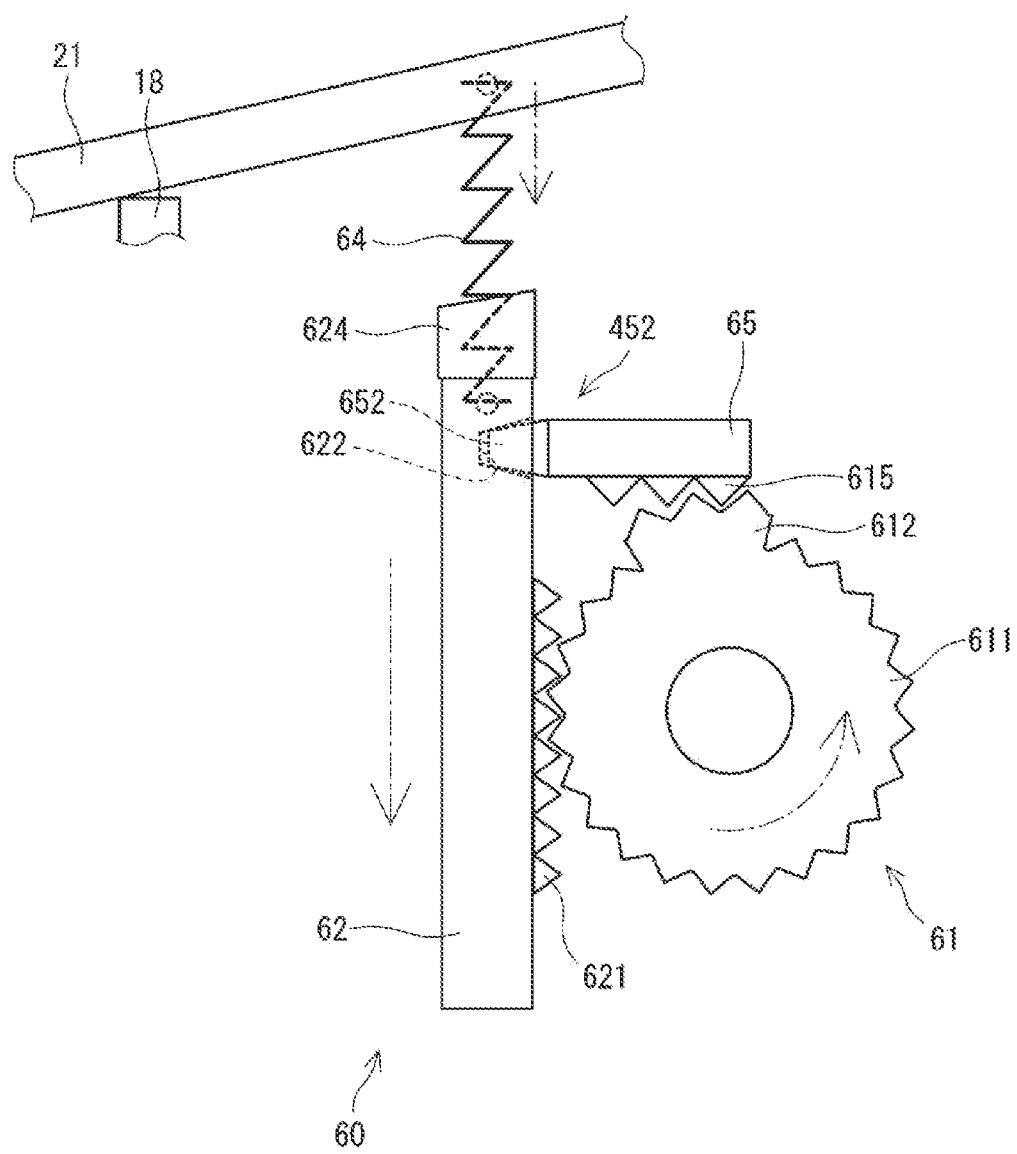
FIG. 15 is an explanatory drawing illustrating an operation of a locking mechanism according to the second embodiment.
Figure 16:
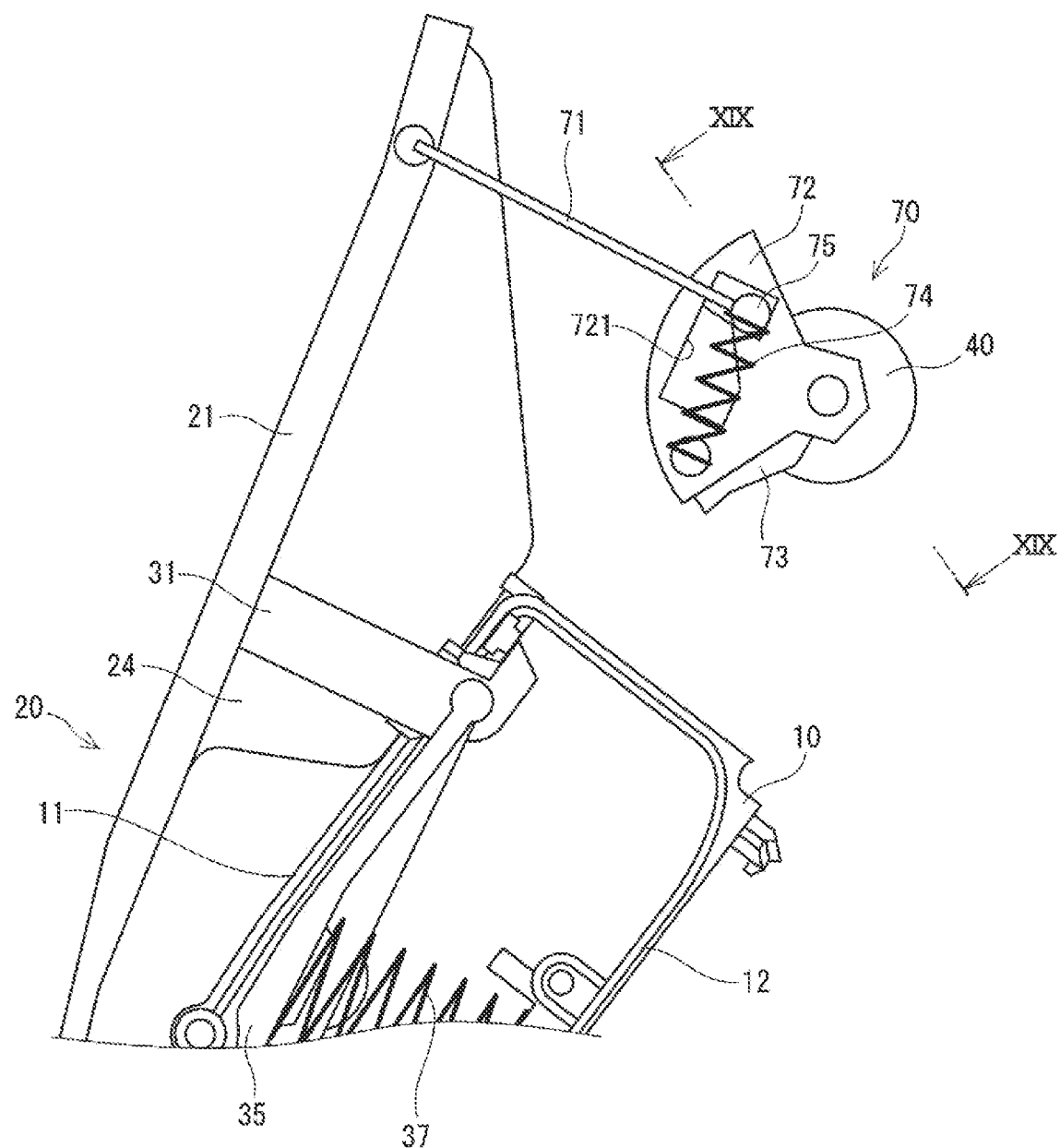
FIG. 16 is a side view of an accelerator device according to a third embodiment.

In the present embodiment, when the motor 40 is so driven that the gear 51 is rotated in the counterclockwise direction of the page surface as shown in FIG. 15, the pad 21 is abutted against the fully opened stopper 18. When the motor 40 is further driven in the same direction from this state, the second gear portion 612 of the gear 61 and the locking rack gear portion 651 of the locking member 65 are engaged with each other. As the result of the rotation of the motor 40, the locking member 65 is driven toward the linear-motion member 62 and an engagement portion 652 of the locking member 65 is fit into the engagement hole portion 622 of the linear-motion member 62. As a result, the pedal lever 20 is locked. Since locking is performed in an accelerator fully opened state in the present embodiment, such processing as control cut is performed on the system side to prevent control from being exercised based on an accelerator opening signal. This is the same also with a fifth embodiment.

Since the engagement portion 652 is formed in a taper shape as in the above embodiment, a load exerted on the motor 40 when a driver's pedal effort is made in a locking state is reduced. By so designing such a shape of the engagement portion 652 as taper angle that a load exerted on the motor 40 side is smaller than spring force of the pedal biasing member 37, a locking state can be maintained even when energization of the motor 40 is turned off. As a result, power consumption and heat generation can be reduced as compared with cases where energization is constantly performed during locking.

In the present embodiment, the power transmission mechanism 60 includes the reaction force adjusting biasing member 64 provided between the linear-motion member 62 and the pedal lever 20. Force in an opening direction is given to the pedal lever 20 by the motor 40 by way of the reaction force adjusting biasing member 64. Force in a closing direction is given to the pedal lever 20 by the motor 40 by way of the linear-motion member 62. As a result, bidirectional force can be actively given by the motor 40.

A locking mechanism 452 locks the pedal lever 20 in a fully opened position. In detail, the engagement hole portion 622 is provided between the driving rack gear portion 621 and the pedal lever 20 and locks the pedal lever 20 in a fully opened state. Since a large space can be consequently ensured above the pedal lever 20 during locking, comfortability obtained when the pedal lever is caused to function as a footrest is enhanced. In the present embodiment, the linear-motion member 62 and the locking member 65 constitute the locking mechanism 452. If any trouble arises in the motor 40 in a locking state, control is exercised on the system side to prevent an engine from being raced. The present embodiment brings about the same effect as the above embodiment does.

Third Embodiment

FIG. 16 to FIG. 33 illustrate the third embodiment. A power transmission mechanism 70 in the present embodiment includes a link 71, a link-side cam 72, a motor-side cam 73, a tension holding mechanism 74, a connecting pin 75, and the like.

One end of the link 71 is fixed on the pad 21 by clearance fit and the other end thereof is fixed on the connecting pin 75. At least either the link 71 or the connecting pin 75 has flexibility. The link-side cam 72 is formed substantially in a fan shape as viewed in a plane and a hole portion 721 is formed in the link-side cam. The connecting pin 75 penetrates the hole portion 721. The link-side cam 72 is rotatably supported in a motor housing 41 connected to the case 10. When the accelerator is fully closed, the link-side cam 72 is abutted against a stopper surface 411 formed on the motor housing 41 and a rotation range thereof is thereby limited. The link-side cam 72 is so provided that in an accelerator fully opened state, the link-side cam is not abutted against the motor housing 41. In other words, the motor housing 41 does not regulate movement of the link-side cam 72 throughout the range from accelerator fully closed to fully opened. The link-side cam 72 may be formed of two plates on the center line in the side view shown in FIG. 22 or may be formed of a single plate.

Figure 26A:
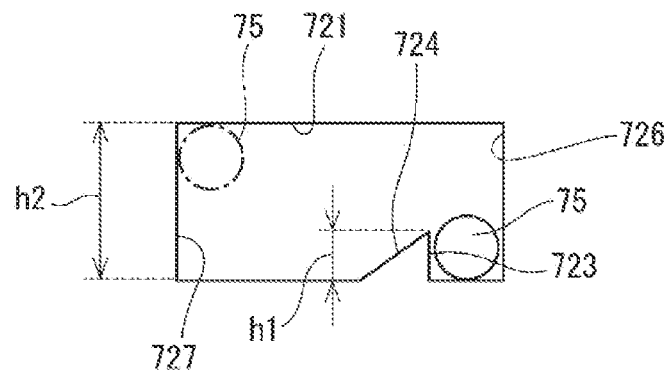
FIG. 26A is an explanatory drawing illustrating a hole portion of a link-side cam according to the third embodiment.
Figure 26B:
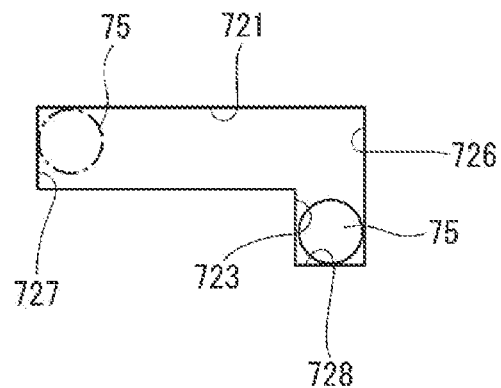
FIG. 26B is an explanatory drawing illustrating a hole portion of a link-side cam according to the third embodiment.

A description will be given to the details of the hole portion 721 with reference to FIGS. 26A and 26B. In FIGS. 26A and 26B, the connecting pin 75 abutted against a return-side wall portion 726 is indicated by a solid line and the connecting pin 75 abutted against a depression-side wall portion 727 is indicated by an alternate long and short dashed line.

An regulating wall 723 is provided on the inner circumferential side of the hole portion 721. With the connecting pin 75 abutted against the return-side wall portion 726, the regulating wall regulates the movement of the connecting pin to the depression-side wall portion 727. The regulating wall 723 is so formed that a height h1 thereof is equal to or larger than a half of the outside diameter of the connecting pin 75. The regulating wall 723 may be erected on the inner circumferential side of the hole portion 721 as shown in FIG. 26A or may be configured by forming on the return-side wall portion 726 side a recessed portion 728 that is configured to house the connecting pin 75 as shown in FIG. 26B.

A radial size of the hole portion 721 is so set that the connecting pin 75 is configured to move to the depression-side wall portion 727 beyond the regulating wall 723. Specifically, the hole portion 721 is so formed that a radial size h2 thereof is larger than a height h1 of the regulating wall 723+a diameter R of the connecting pin 75. That is, h2>(h1+R).

Figure 25:
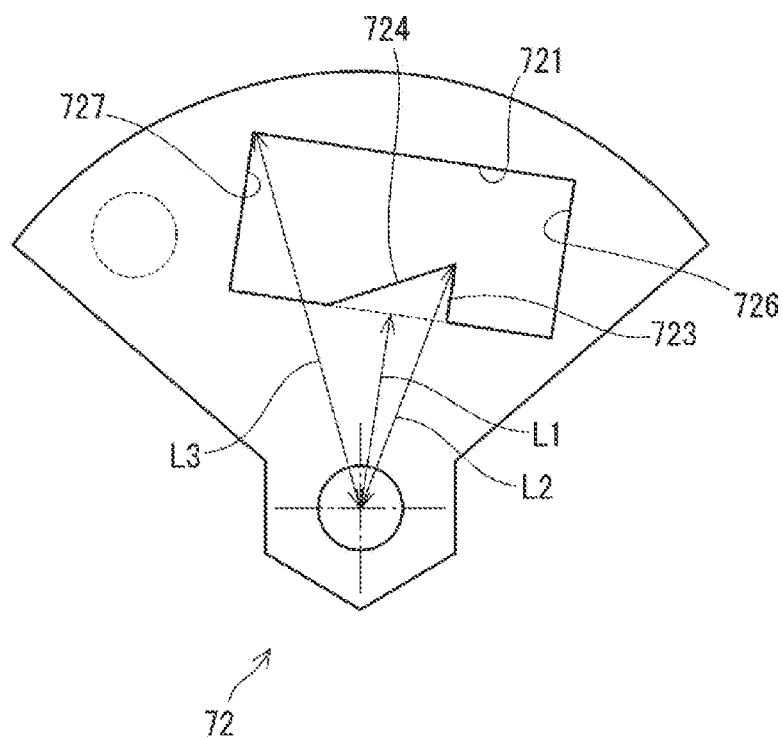
FIG. 25 is a plan view of a link-side cam according to the third embodiment.

Hereafter, a description will be given to an example in which the regulating wall 723 is erectly formed as shown in FIG. 26A. As shown in FIG. 25, in the link-side cam 72, a minimum distance to the inner circumferential side of the hole portion 721 will be designated as minimum radius L1; a length to the vertex of the regulating wall 723 will be designated as vertex radius L2; and a maximum distance to the outer circumferential side of the hole portion 721 will be designated as maximum radius L3. The radiuses L1 to L3 are lengths at points corresponding to the shape of the hole portion 721. For example, when the inner circumferential side of the hole portion 721 is linearly formed, a length at a point where a straight line connecting the center of rotation and an inner circumferential wall is vertical is minimum radius L1.

Figure 27:
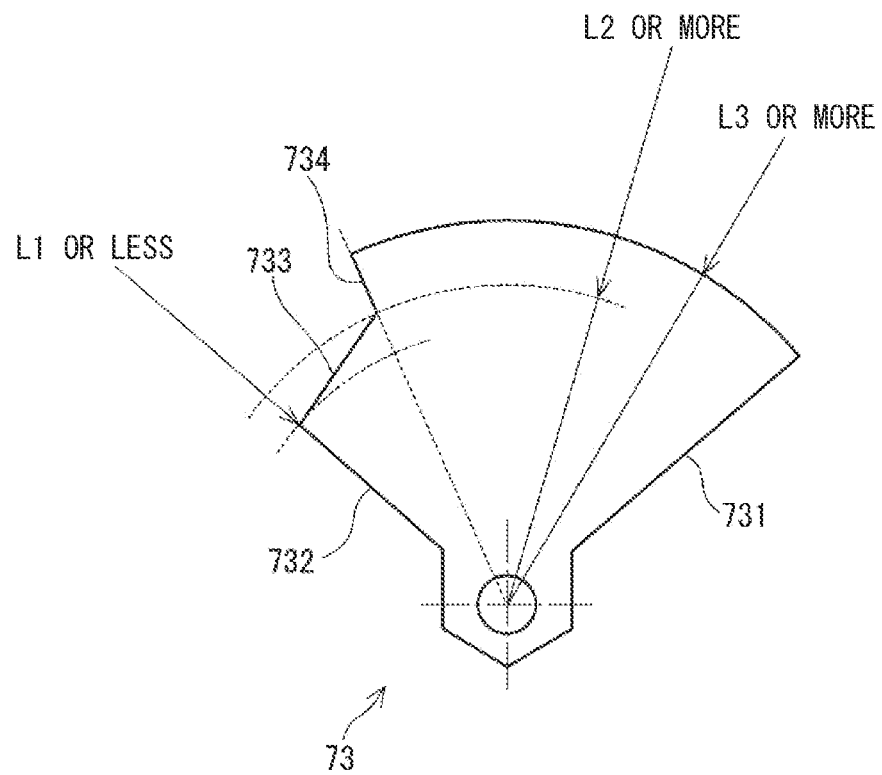
FIG. 27 is an explanatory drawing illustrating a motor-side cam according to the third embodiment.

As shown in FIG. 27 and the like, the motor-side cam 73 is formed substantially in a fan shape as viewed in a plane and is so provided that the motor-side cam can be abutted against the connecting pin 75 on both sides. The motor-side cam 73 is rotatably supported in the motor housing 41 and is rotatably driven by the motor 40. The motor-side cam 73 agrees with the link-side cam 72 in the center of rotation and is so provided that the motor-side cam is configured to rotate through 360° without the rotation thereof being limited by the motor housing 41.

A lock-side abutment portion 731 is so formed that the lock-side abutment portion is extended in a radial direction and a length thereof is larger than the maximum radius L3 of the link-side cam 72. On the unlock-side end portion 732 side, an outer portion in a radial direction is cut to form an unlocking slope 733 and a pull-time abutment wall portion 734.

The unlocking slope 733 is so formed that the unlocking slope is inclined in a direction of radial lines from the center of rotation (that is, a radial direction). With respect to an open-side end portion of the unlocking slope 733, a distance thereof from the center of rotation is on the center of rotation side relative to the minimum radius L1 and with respect to an end portion thereof on the pull-time abutment wall portion 734 side, a distance thereof from the center of rotation is outside the vertex radius L2. The unlocking slope 733 is so provided that a length thereof allows the connecting pin 75 to be pushed up by rotation. The pull-time abutment wall portion 734 is formed in a direction of radial lines from the center of rotation on the lock-side abutment portion 731 side of the unlocking slope 733.

Figure 21:
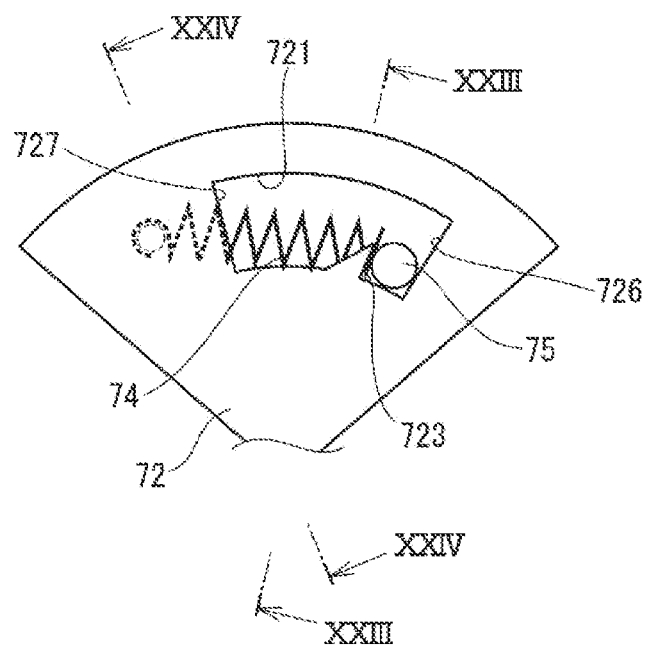
FIG. 21 is a plan view illustrating a link-side cam, a connecting pin, and a tension holding mechanism according to the third embodiment.
Figure 22:
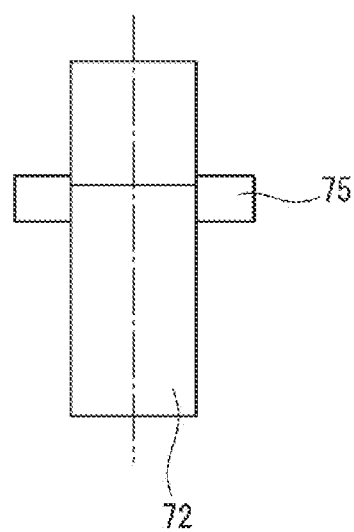
FIG. 22 is a side view illustrating a link-side cam and a connecting pin according to the third embodiment.
Figure 23:
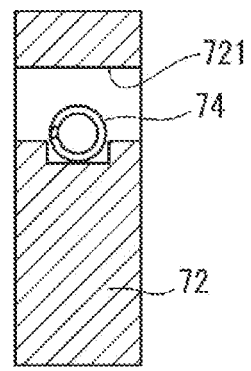
FIG. 23 is a cross-sectional view taken along line XXIII-XXIII of FIG. 21.
Figure 24:
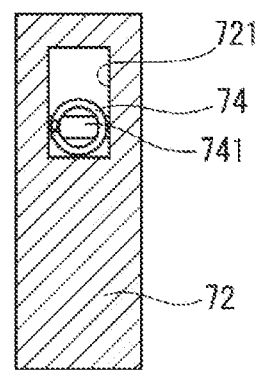
FIG. 24 is a cross-sectional view taken along line XXIV-XXIV of FIG. 21.

As shown in FIG. 21, FIG. 23, and FIG. 24, the tension holding mechanism 74 is a tension spring; and one end thereof is abutted against the connecting pin 75 and the other end thereof is fixed on the link-side cam 72 by a tension spring attaching rod 741. With respect to the tension holding mechanism 74, force exerted on the connecting pin 75 is prevented from being slanted, for example, by embedding the tension holding mechanism in the link-side cam 72 and positioning the tension holding mechanism at the center of the cam. The tension holding mechanism 74 may be provided in anywhere as long as movement of the motor-side cam 73 is not inhibited; for example, the tension holding mechanism may be installed in a surface of the link-side cam 72 on the opposite side to the motor-side cam 73.

Figure 28:
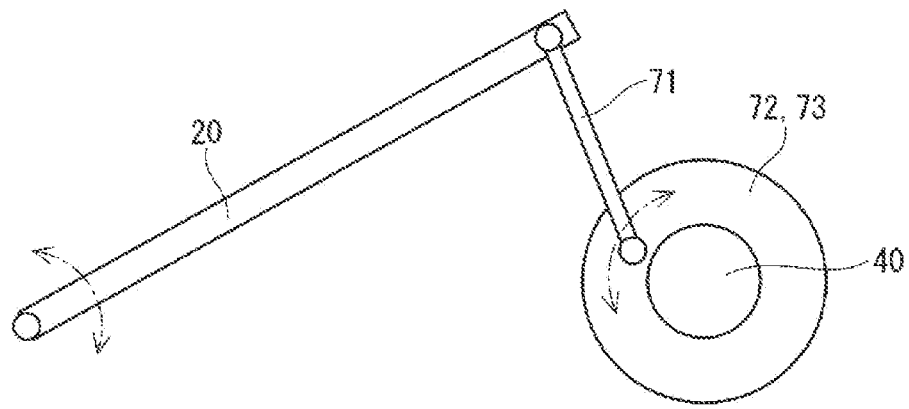
FIG. 28 is an explanatory drawing simply illustrating a link mechanism according to the third embodiment.
Figure 29:
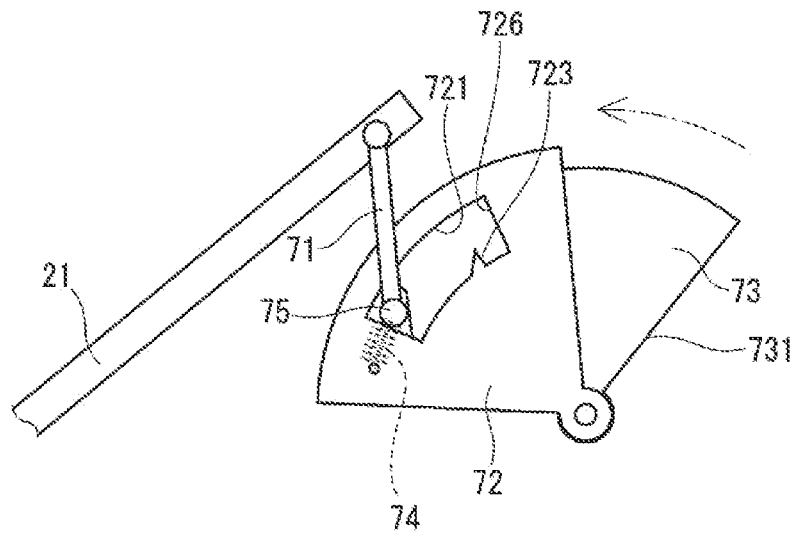
FIG. 29 is an explanatory drawing illustrating an operation of a power transmission mechanism according to the third embodiment observed when a pedal lever is actively driven in a depressing direction by driving of a motor.

In the present embodiment, as schematically shown in FIG. 28, the pedal lever 20 can be actively driven in a depressing direction and in a return direction by driving of the motor 40 by way of the cams 72, 73 and the link 71. A description will be given to how the pedal lever 20 is driven in a depressing direction by driving of the motor 40 with reference to FIG. 29. In FIG. 29 to FIG. 32 and FIG. 39 related to an embodiment described later, the tension holding mechanism 74 is indicated by a broken line for the purpose of explanation.

In cases where the pedal lever 20 is driven in a depressing direction, when the motor 40 is so driven that the motor-side cam 73 is rotated in a counterclockwise direction in the page surface, the connecting pin 75 and the pull-time abutment wall portion 734 are abutted against each other. At this time, the connecting pin 75 is abutted against the depression-side wall portion 727 outside in a radial direction in the hole portion 721 of the link-side cam 72 (refer to FIGS. 26A and 26B). By so driving the motor 40 from this state that the motor-side cam 73 is rotated in a counterclockwise direction, the pedal lever 20 can be pulled from the motor-side cam 73 in a depressing direction by way of the connecting pin 75 and the link 71.

Figure 30:
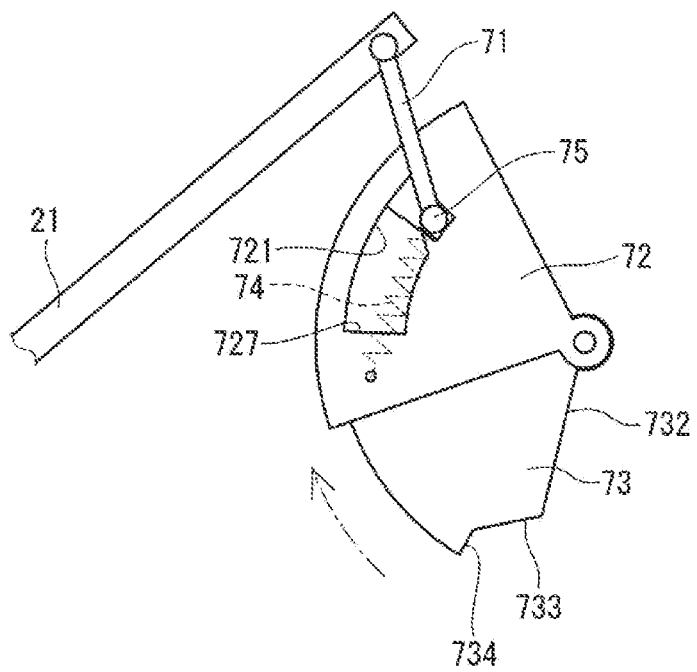
FIG. 30 is an explanatory drawing illustrating an operation of a power transmission mechanism according to the third embodiment observed when a pedal lever is actively driven in a return direction by driving of a motor.

A description will be given to how the pedal lever 20 is driven in a return direction motor 40 with reference to FIG. 30. When the motor 40 is so driven that the motor-side cam 73 is rotated in a clockwise direction in the page surface, the connecting pin 75 and the lock-side abutment portion 731 are abutted against each other. When the motor 40 is so driven from this state that the motor-side cam 73 is rotated in a clockwise direction, the connecting pin 75 is driven by the lock-side abutment portion 731 and is moved in the hole portion 721 of the link-side cam 72. When the connecting pin climbs over the regulating wall 723 by way of a guide portion 724, the connecting pin is abutted against the return-side wall portion 726. When with the connecting pin 75 abutted against the return-side wall portion 726, the motor 40 is so driven that the motor-side cam 73 is rotated in a clockwise direction, reaction force can be given from the motor-side cam 73 to the pedal lever 20 by way of the connecting pin 75 and the link 71.

Figure 17:
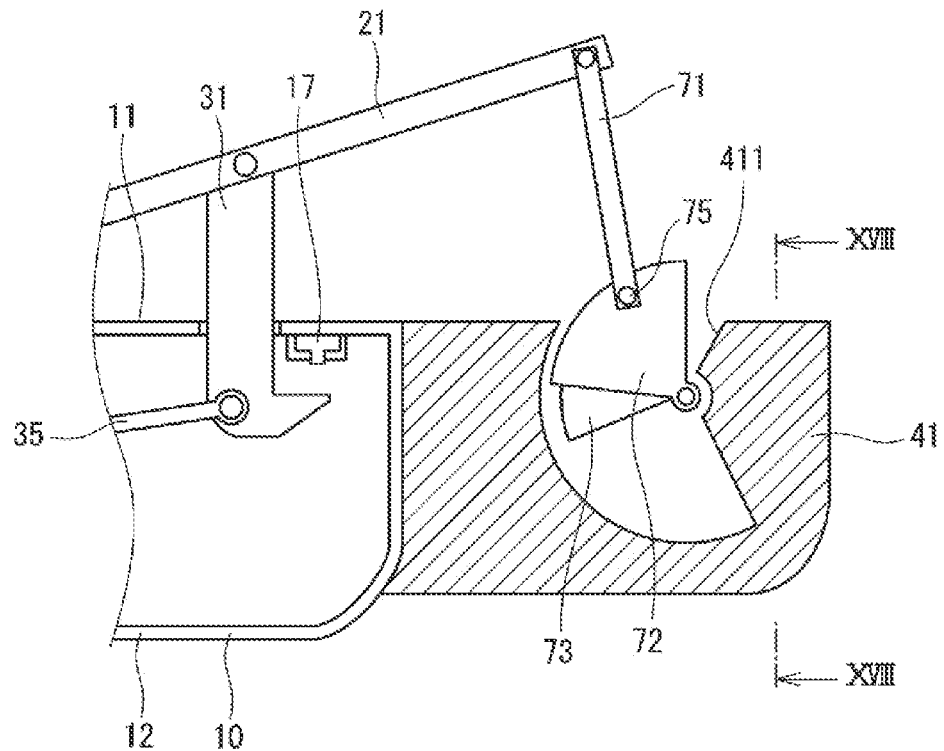
FIG. 17 is a schematic cross-sectional view of a motor case according to the third embodiment.
Figure 18:
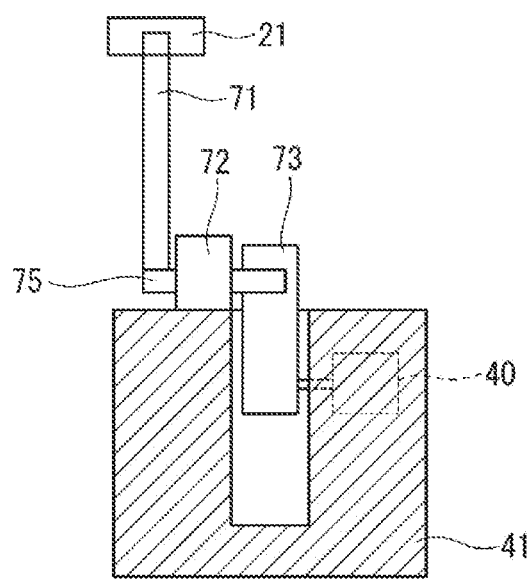
FIG. 18 is a cross-sectional view taken along line XVIII-XVIII of FIG. 17.
Figure 19:
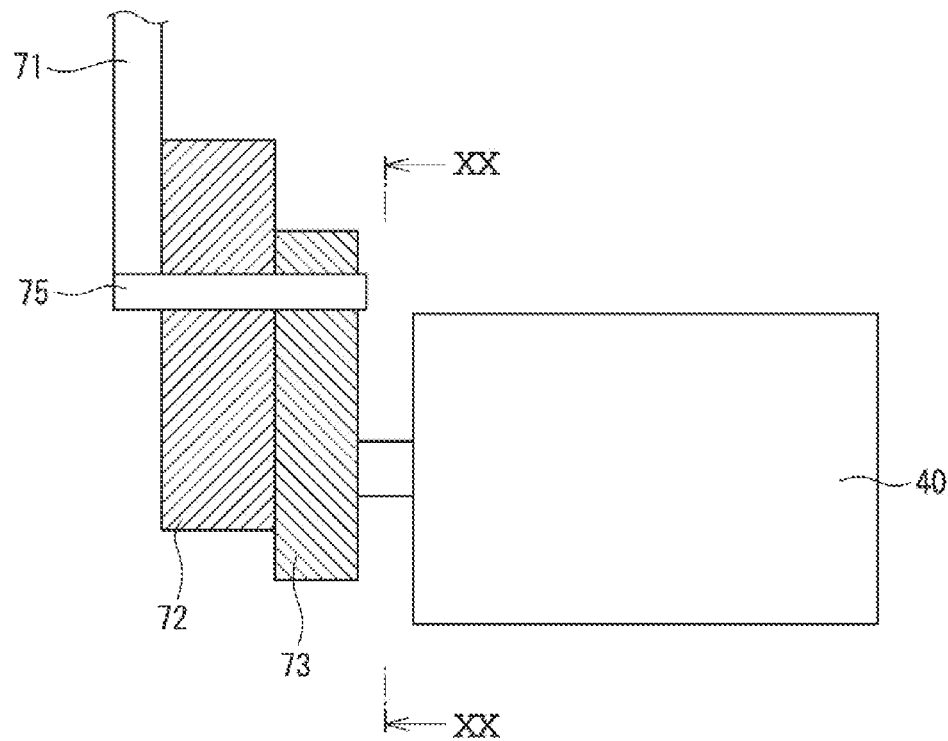
FIG. 19 is a cross-sectional view taken along line XIX-XIX of FIG. 16.
Figure 20:
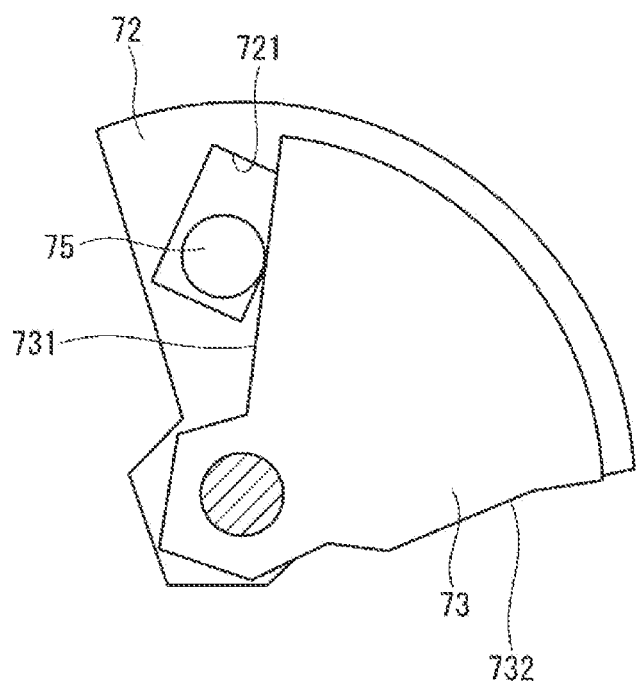
FIG. 20 is a cross-sectional view taken alone line XX-XX of FIG. 19.
Figure 31:
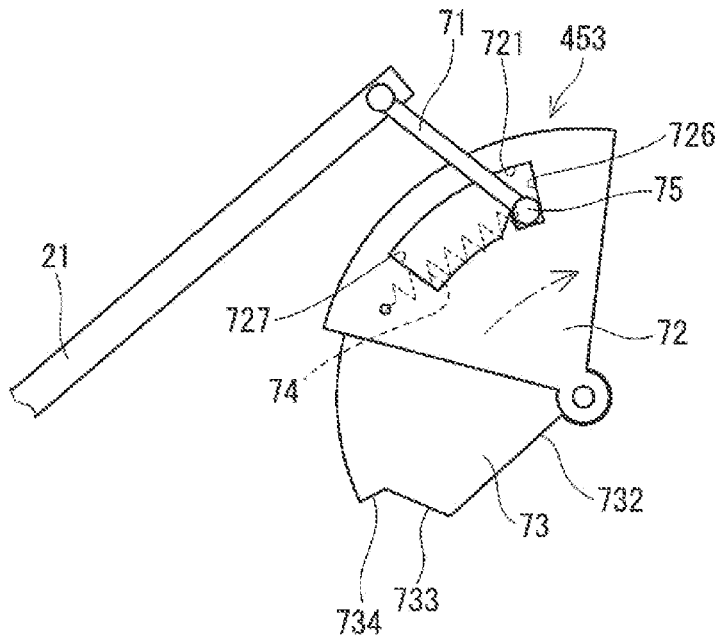
FIG. 31 is an explanatory drawing illustrating a locking mechanism according to the third embodiment.

When with the connecting pin 75 abutted against the lock-side abutment portion 731, the motor 40 is so further driven that the motor-side cam 73 is rotated in a counterclockwise direction as shown in FIG. 31, the link-side cam 72 is abutted against the stopper surface 411 (refer to FIG. 17). As a result, the pedal lever 20 is locked in a fully closed state. When energization of the motor 40 is turned off in a locking state, the connecting pin 75 is pulled in a counterclockwise direction by the tension holding mechanism 74 but movement thereof is regulated by the regulating wall 723. Thus, even when the motor 40 is turned off, a locking state can be maintained. When pedal effort is applied in a locking state, a torque in a clockwise direction is exerted on the link-side cam 72. However, this torque is exerted on the stopper surface 411; therefore, a load is not exerted on the motor 40 side. That is, even pedal effort is exerted in a locking state, a no-load state can be maintained on the motor 40 side.

Figure 32:
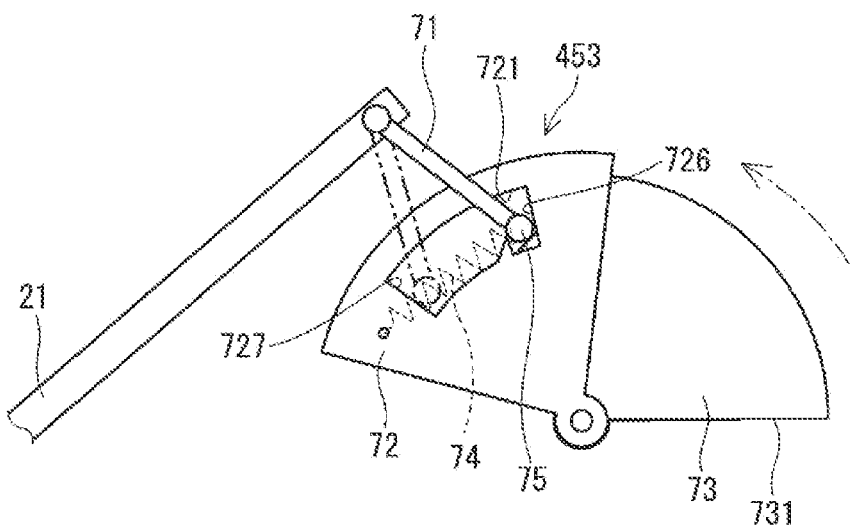
FIG. 32 is an explanatory drawing illustrating unlocking according to the third embodiment.
Figure 33:
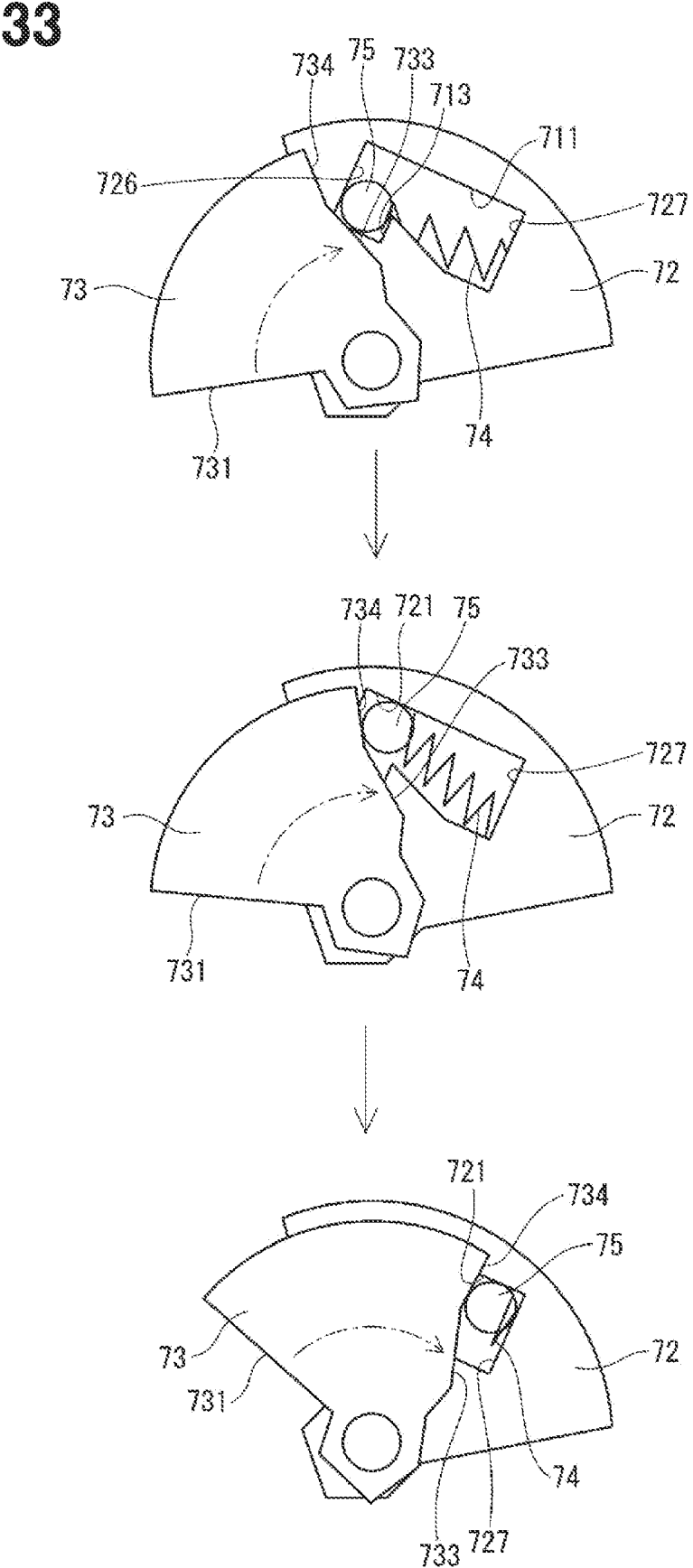
FIG. 33 is an explanatory drawing illustrating unlocking according to the third embodiment.

A description will be given to an unlocking operation with reference to FIG. 32 and FIG. 33. FIG. 32 illustrates an unlocking operation as viewed from the link-side cam 72 side; and a state before unlocking is indicated by a solid line and a state after unlocking is indicated by an alternate long and two short dashes line. Illustration of the tension holding mechanism 74 after unlocking is omitted for the avoidance of complication. FIG. 33 illustrates an unlocking operation as viewed from the motor-side cam 73 side.

When the motor-side cam 73 is so rotated that the connecting pin 75 is located at the unlock-side end portion 732 to cancel a locking state, the unlocking slope 733 and the connecting pin 75 are abutted against each other. When the motor 40 is driven from this state so as to press the motor-side cam 73 against the connecting pin 75, the connecting pin 75 is pushed up by the unlocking slope 733 and climbs over the regulating wall 723. As a result, the connecting pin 75 is pulled toward the depression-side wall portion 727 by tensile force of the tension holding mechanism 74 and the locking state is thereby canceled.

In the present embodiment, the power transmission mechanism 70 includes: the motor-side cam 73 as a cam rotated by the motor 40; and the link 71 whose one end is connected with the pedal lever 20 and whose other end is engaged with the motor-side cam 73. As a result, the motor 40 is configured to actively give bidirectional force to the pedal lever 20 by way of the power transmission mechanism 70.

The power transmission mechanism 70 includes the motor-side cam 73 as a drive source-side cam, the link-side cam 72, and the connecting pin 75. The link-side cam 72 is provided on the link 71 side of the motor-side cam 73 and the hole portion 721 is formed in the link-side cam. The connecting pin 75 is movably inserted into the hole portion 721; and the connecting pin is connected to the link 71 on the one end side and can be abutted against the motor-side cam 73 and the link-side cam 72 on the other end side.

By pressing the connecting pin against the return-side wall portion 726 side, which is one wall portion of the hole portion 721, by the motor-side cam 73, force is exerted in the closing direction of the pedal lever 20. By pressing the connecting pin against the depression-side wall portion 727 side, which is the other wall portion, force in the opening direction of the pedal lever 20. Thus, bidirectional force can be actively given by the motor 40.

A locking mechanism 453 includes the link-side cam 72. The link-side cam 72 and the stopper surface 411 as a locking portion provided in the motor housing 41 as a housing are abutted against each other and the pedal lever 20 is thereby locked. As a result, the pedal lever 20 can be appropriately locked. In the present embodiment, the link-side cam 72 and the motor housing 41 constitute the locking mechanism 453. A position where the link-side cam 72 is abutted against the stopper surface 411 is equivalent to "lock position."

In the hole portion 721, the regulating wall 723 is formed. With the pedal lever 20 locked, the regulating wall regulates the movement of the connecting pin 75 from the return-side wall portion 726 as a lock-side wall portion that is a wall portion against which the connecting pin is abutted to the side toward which the connecting pin is brought away. As a result, even when the motor 40 is turned off, a locking state can be appropriately maintained.

The power transmission mechanism 70 includes the tension holding mechanism 74 that pulls the connecting pin 75 in a direction in which the connecting pin 75 is brought away from the return-side wall portion 726. In the motor-side cam 73, the unlocking slope 733 is formed to enable to push up the connecting pin 75 from the opposite side to the regulating wall 723. As a result, a locking state can be appropriately canceled by driving of the motor 40. The same effect as in the above-mentioned embodiment is brought about.

Fourth Embodiment

Figure 34:
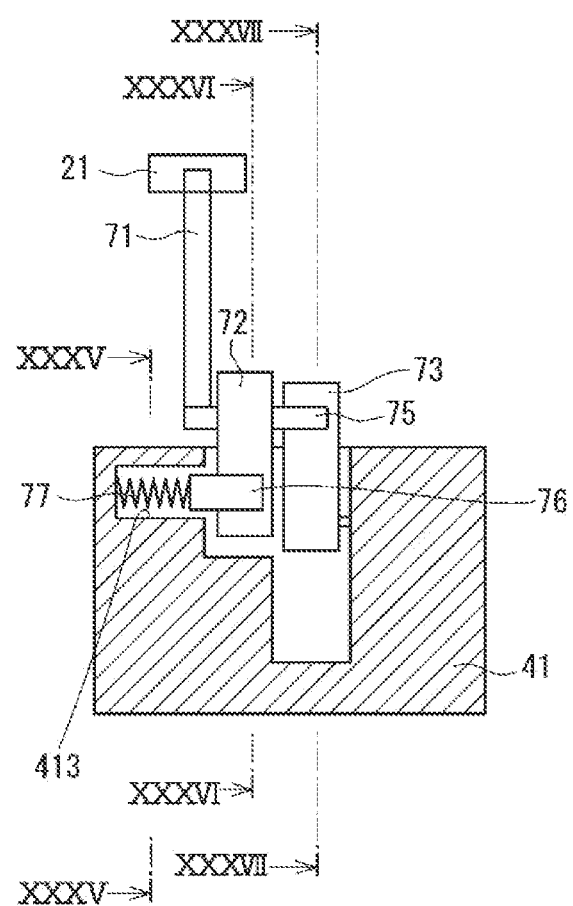
FIG. 34 is a cross-sectional view of a power transmission mechanism according to a fourth embodiment.
Figure 35:
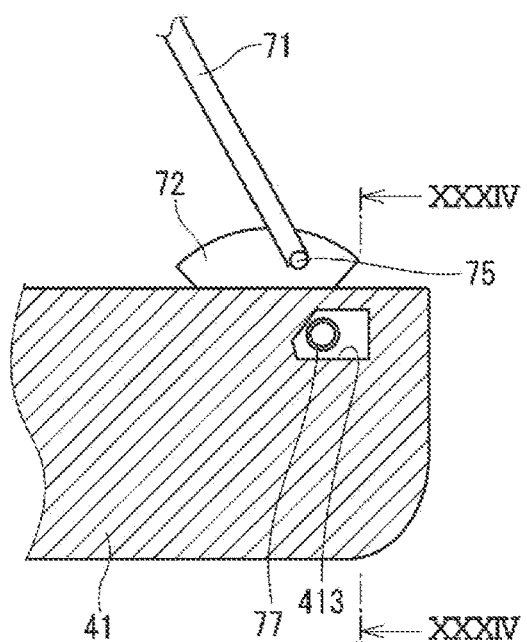
FIG. 35 is a cross-sectional view taken along line XXXV-XXXV of FIG. 34.
Figure 36:
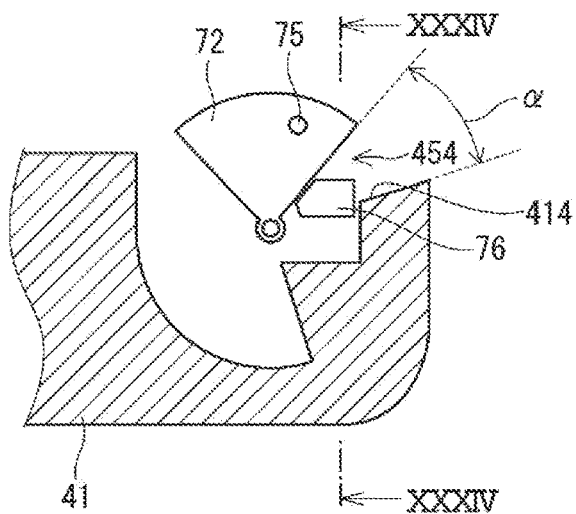
FIG. 36 is a cross-sectional view taken along line XXXVI-XXXVI of FIG. 34.
Figure 37:
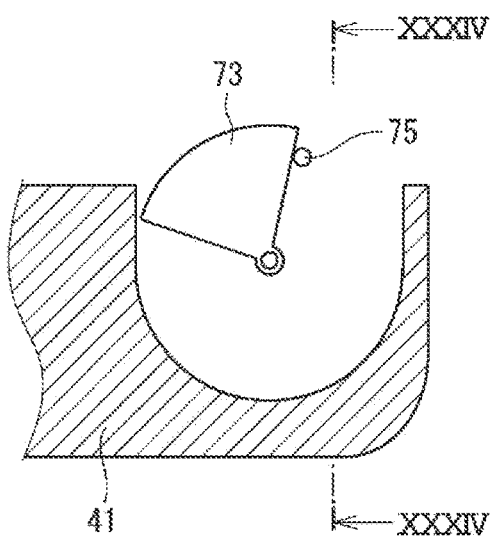
FIG. 37 is a cross-sectional view taken along line XXXVII-XXXVII of FIG. 34.
Figure 38A:
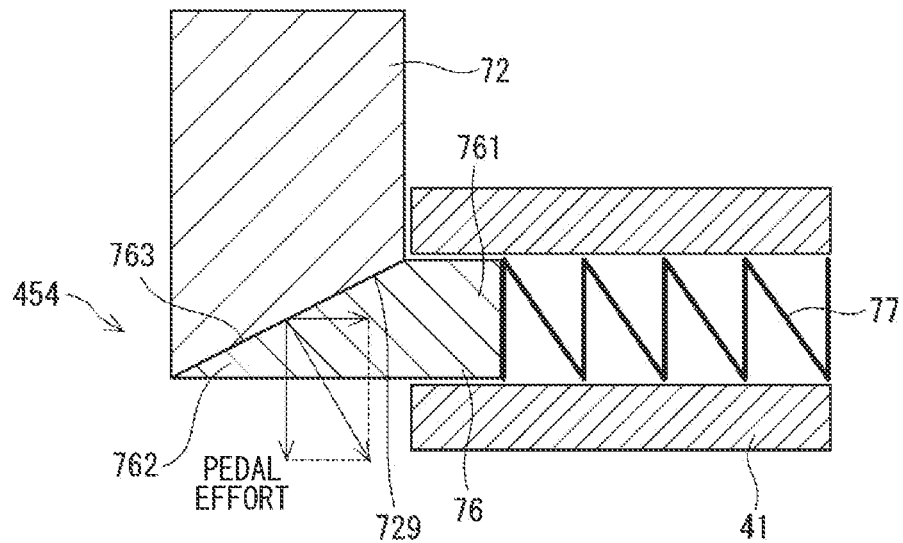
FIG. 38A is a schematic diagram illustrating a locking state according to the fourth embodiment.
Figure 38B:
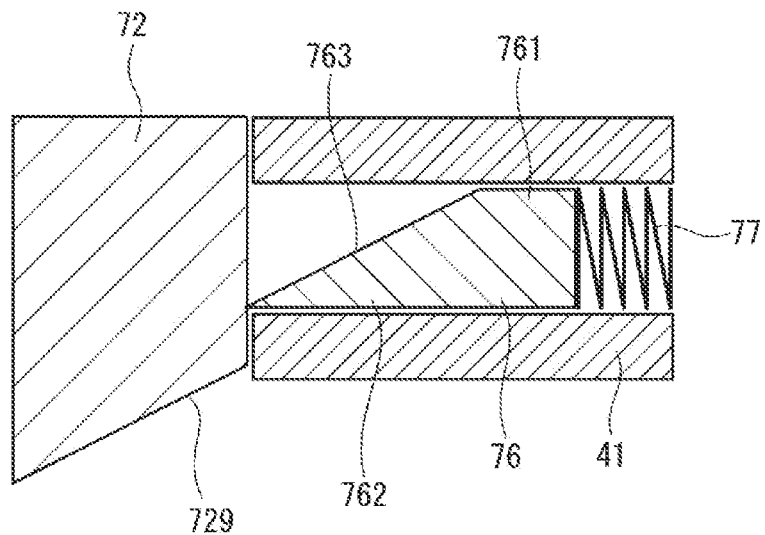
FIG. 38B is a schematic diagram illustrating an unlocking state according to the fourth embodiment.

FIG. 34 to FIG. 38B illustrate the fourth embodiment. The present embodiment is a modification to the third embodiment. FIG. 34 is a schematical cross-sectional view corresponding to FIG. 18 related to the third embodiment and is a cross-sectional view taken along line XXXIV-XXXIV of FIG. 35. In the present embodiment, a housing recessed portion 413 housing a lock stopper 76 and a stopper biasing member 77 is formed in the motor housing 41. The lock stopper 76 includes a base portion 761 located in the housing recessed portion 413 and a protruded portion 762 protruded from the housing recessed portion 413 in normal times and is so provided that the lock stopper is slidable in the housing recessed portion 413. As shown in FIGS. 38A and 38B, a sloped surface 763 is formed on the side of the protruded portion 762 opposed to the link-side cam 72. A sloped surface 729 that can be abutted against the sloped surface 763 of the lock stopper 76 is formed on the link-side cam 72.

The present embodiment is identical with the above-mentioned embodiment in operation except that at the time of locking, the link-side cam 72 is abutted against the lock stopper 76 in place of the stopper surface 411 of the motor housing 41. In the present embodiment, a failsafe mechanism that can be canceled by pedal effort is configured by making the lock stopper 76 movable.

As shown in FIG. 38A, at the time of locking, the sloped surface 729 of the link-side cam 72 and the sloped surface 763 of the lock stopper 76 are abutted against each other and the pedal lever 20 is thereby locked. As shown in FIG. 38B, when a component of pedal effort in such a direction as to push the lock stopper 76 into the housing recessed portion 413 overcomes biasing force of the stopper biasing member 77 by applying excessive pedal effort, the lock stopper 76 is pushed into the housing recessed portion 413. As a result, rotation of the link-side cam 72 is permitted and a locking state is canceled. When the lock stopper 76 is housed in the housing recessed portion 413, the link-side cam 72 can be rotated to the extent that the link-side cam is abutted against a fail-time stopper surface 414 and the pedal lever 20 can be depressed with a minimum opening a (refer to FIG. 36). As a result, even if any trouble occurs in the motor 40, evacuation running can be made.

In the present embodiment, the link-side cam 72 and the lock stopper 76 are abutted against each other and the pedal lever 20 is thereby locked. The lock stopper 76 is housed in the housing recessed portion 413 provided in the motor housing 41. When predetermined or larger force is exerted to the pedal lever 20, the lock stopper 76 is housed in the housing recessed portion 413 against biasing force of the stopper biasing member 77 biasing the lock stopper 76 toward the link-side cam 72 and a locking operation can be thereby canceled. As a result, a locking state can be appropriately canceled. The same effect as in the above-mentioned embodiment is brought about.

In the present embodiment, the link-side cam 72 and the lock stopper 76 constitute the locking mechanism 454; the lock stopper 76 is equivalent to "locking portion"; and a position where the link-side cam 72 is abutted against the lock stopper 76 is equivalent to "lock position."

Fifth Embodiment

Figure 39:
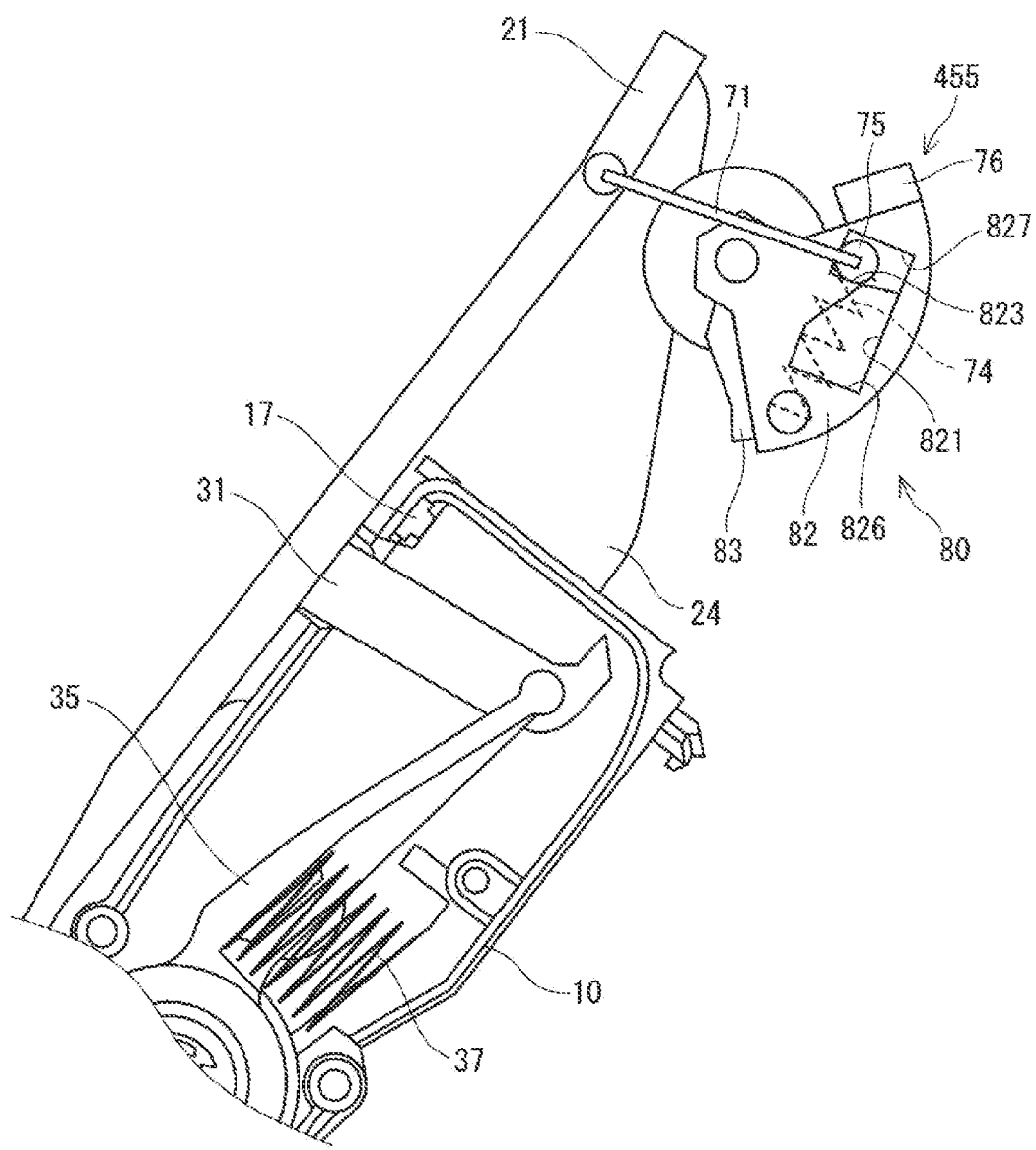
FIG. 39 is a side view of an accelerator device according to a fifth embodiment.
Figure 40:
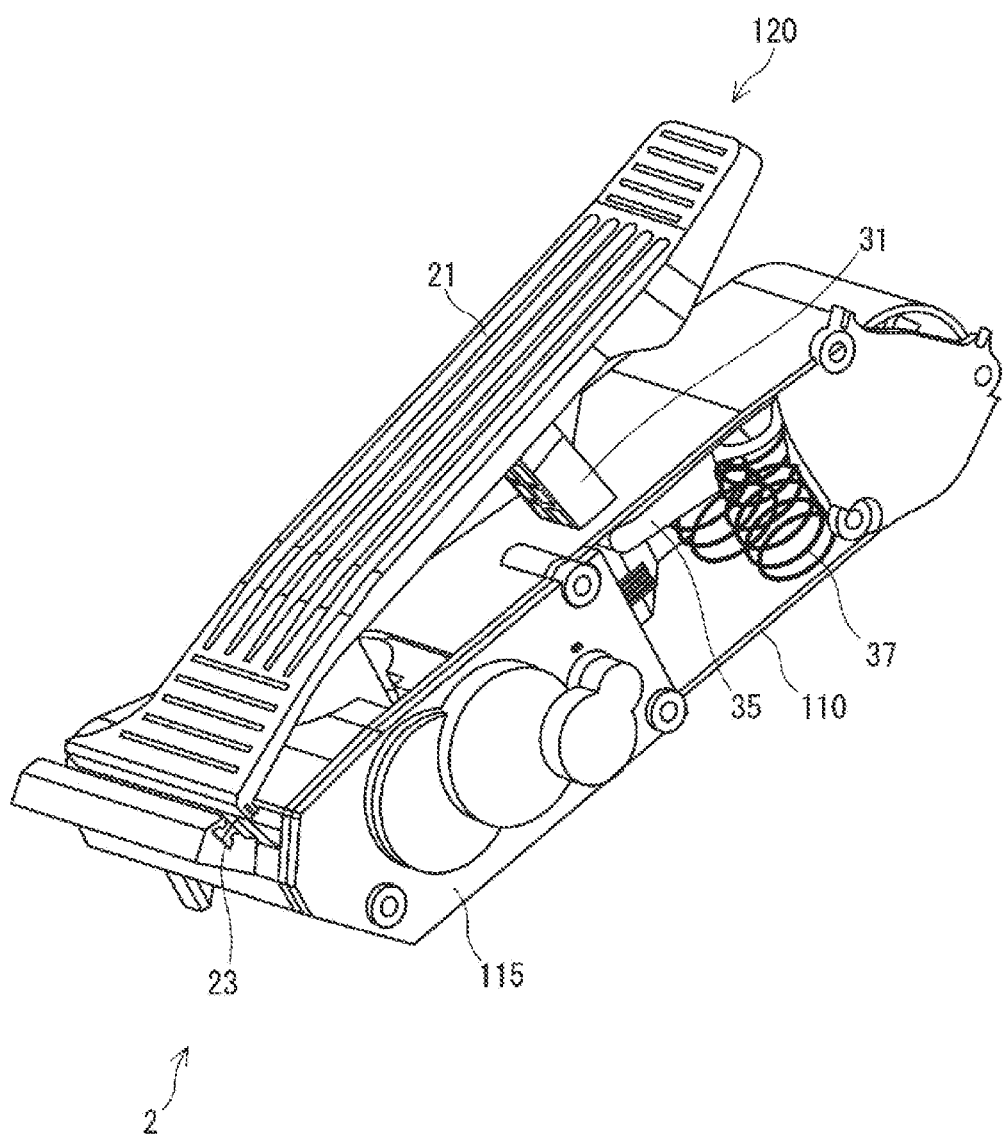
FIG. 40 is a perspective view of an accelerator device according to a sixth embodiment.

FIG. 39 illustrates the fifth embodiment. FIG. 39 corresponds to FIG. 16. A power transmission mechanism 80 in the present embodiment is different from those in the third embodiment and the fourth embodiment in that a link-side cam 82 and a motor-side cam 83 are inverted and the pedal lever 20 is locked in an accelerator fully opened state. FIG. 39 shows a locking state and the link-side cam 82 is abutted against the lock stopper 76. The connecting pin 75 inserted into a hole portion 821 of the link-side cam 82 is located on the side of a depression-side wall portion 827 and movement of the connecting pin toward a return-side wall portion 826 is regulated by an regulating wall 823. Since in a locking state, biasing force of the pedal biasing member 37 is received by the lock stopper 76, a load is not exerted on the motor 40 side.

In the present embodiment, when the motor 40 is so driven that the motor-side cam 83 is rotated in a counter-clockwise direction in the page surface of the FIG. 39, the pedal lever 20 can be pulled from the motor-side cam 83 in a depressing direction by way of the connecting pin 75 and the link 71. When the motor 40 is so driven that the motor-side cam 83 is rotated in a clockwise direction in the page surface, reaction force can be given from the motor-side cam 83 to the pedal lever 20 by way of the connecting pin 75 and the link 71.

An operation of a locking mechanism and an unlocking operation become identical with those in the third embodiment by inverting a direction of rotation; therefore, a description thereof will be omitted. In FIG. 39, the pedal lever 20 is locked by abutting the link-side cam 82 and the lock stopper 76 against each other as in the fourth embodiment. In the present embodiment, the link-side cam 82 and the lock stopper 76 constitute a locking mechanism 455. A locking operation may be performed by abutting the link-side cam 82 against the stopper surface 411 (not shown in FIG. 39) of the motor housing 41 as in the third embodiment.

In the present embodiment, an regulating wall 823 is formed in the hole portion 821. With the pedal lever 20 locked, the regulating wall regulates movement of the connecting pin 75 from the depression-side wall portion 827 as a lock-side wall portion that is a wall portion against which the connecting pin is abutted to a direction in which the connecting pin 75 is brought away. Also, when the accelerator device is configured as mentioned above, the same effect as in the above-mentioned embodiment is brought about. In the present embodiment, the motor-side cam 83 is equivalent to "cam;" the link-side cam 82 is equivalent to "locking member"; and the depression-side wall portion 827 is equivalent to "lock-side wall portion."

Sixth Embodiment

FIG. 40 to FIG. 52 illustrate the sixth embodiment. An accelerator device 2 includes a case 110, a pedal lever 120, the motor 40, a power transmission mechanism 150, and the like. The case 110 can be attached to a vehicle body and houses therein the pedal 35, the motor 40, the power transmission mechanism 150, and the like. A rack case housing chamber 111 housing a rack case 160 described later and a lock housing chamber 112 housing a lock pin biasing member 195 are formed in the case 110.

In the pedal lever 20 of the accelerator device 1 in the first embodiment, the pedal 35 is provided on the fulcrum member 23 side of the arm 31. Meanwhile, in the pedal lever 120 in the present embodiment, the pedal 35 is provided on the arm 31 on the opposite side to the fulcrum member 23. Since the pedal lever 120 is identical with the pedal lever 20 in the first embodiment in functionality and the like except that the disposition of the pedal 35, the pedal biasing member 37, and the like is different, these members will be marked with identical reference numerals and symbols and a description thereof will be omitted. In the present embodiment, the motor 40, the power transmission mechanism 150, and the like are placed on the fulcrum member 23 side of the arm 31.

Figure 41:
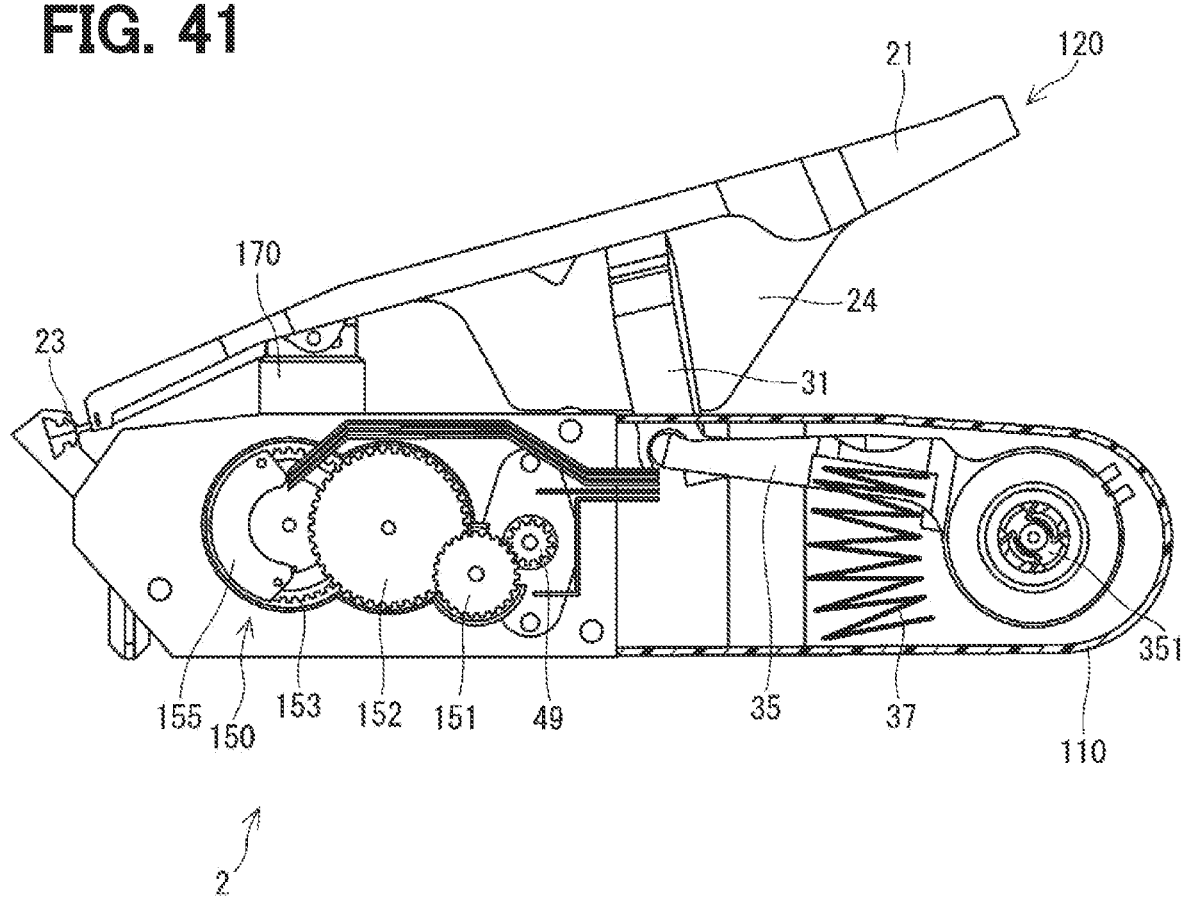
FIG. 41 is a side view of an accelerator device according to the sixth embodiment.
Figure 42:
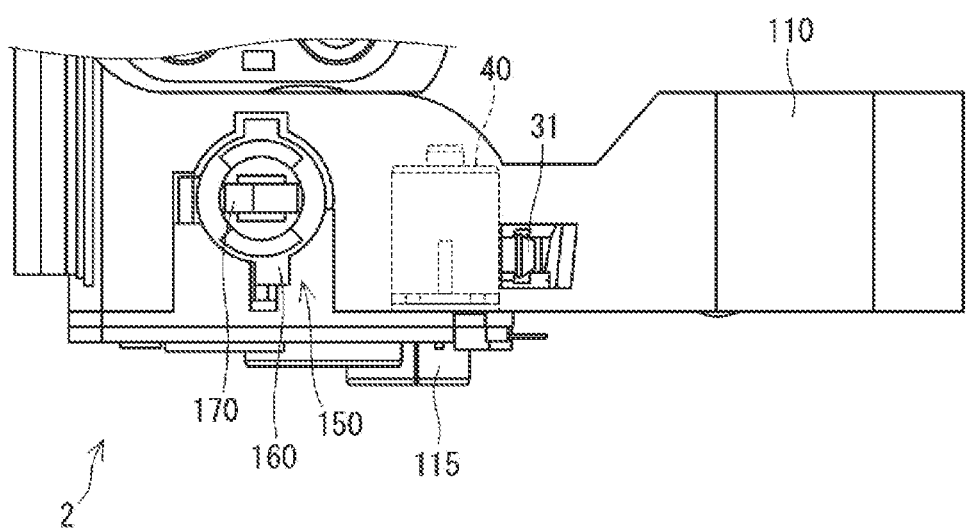
FIG. 42 is a plan view of an accelerator device according to the sixth embodiment with a pad removed.
Figure 43:
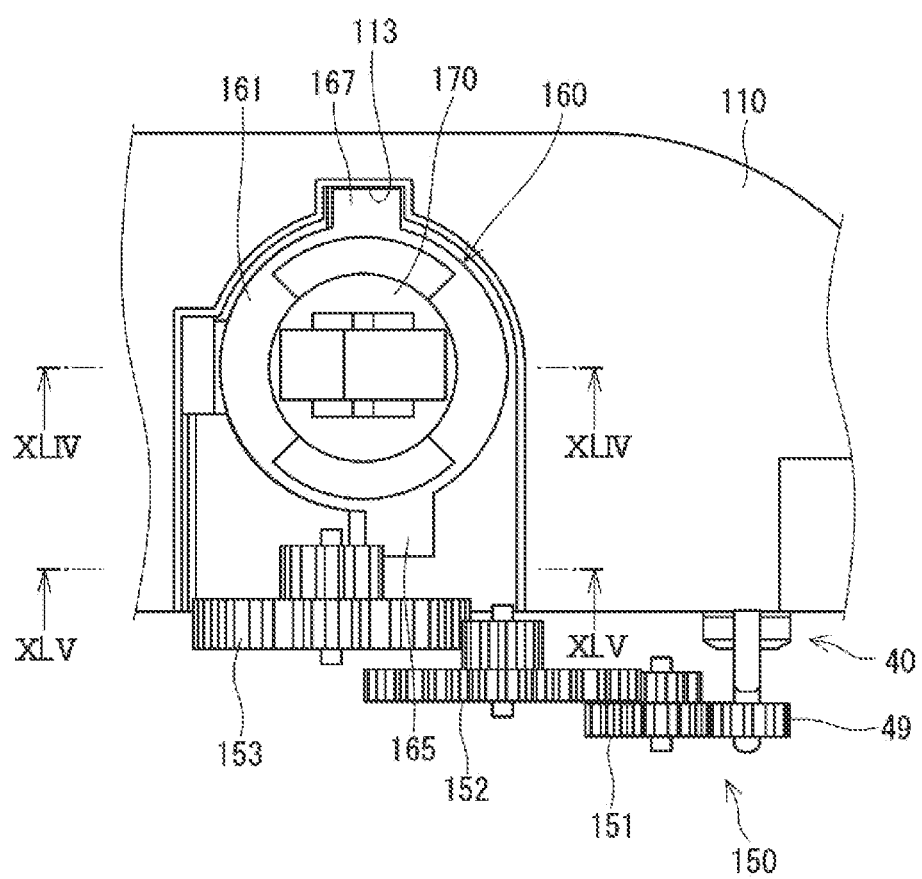
FIG. 43 is a plan view illustrating a disposition of speed reduction gears in an accelerator device according to the sixth embodiment.

The power transmission mechanism 150 includes speed reduction gears 151 to 153, the rack case 160, a spring case 170, a holder 180, a reaction force adjusting biasing member 185, and the like. Each of the speed reduction gears 151 to 153 has a major diameter portion and a minor diameter portion and is rotatably supported on a side face of the case 110. A gear cover 115 is attached to the case 110 for housing the gears 151 to 153. FIG. 41 and FIG. 43 show the power transmission mechanism with the gear cover 115 removed. In the present embodiment, the speed reduction gears 151 to 153 are constituted of three gears but can be set according to a required reducing ratio as appropriate. The major diameter portion of the gear 151 in the first stage is engaged with a motor gear 49 rotated integrally with an output shaft of the motor 40.

A position sensor 155 detects a rotational position of the gear 153 in the last stage. The position sensor 155 in the present embodiment is an encoder but any other member than an encoder may be adopted. The ECU controls driving of the motor 40 based on a detection value of the position sensor 155 and the like.

Figure 44:
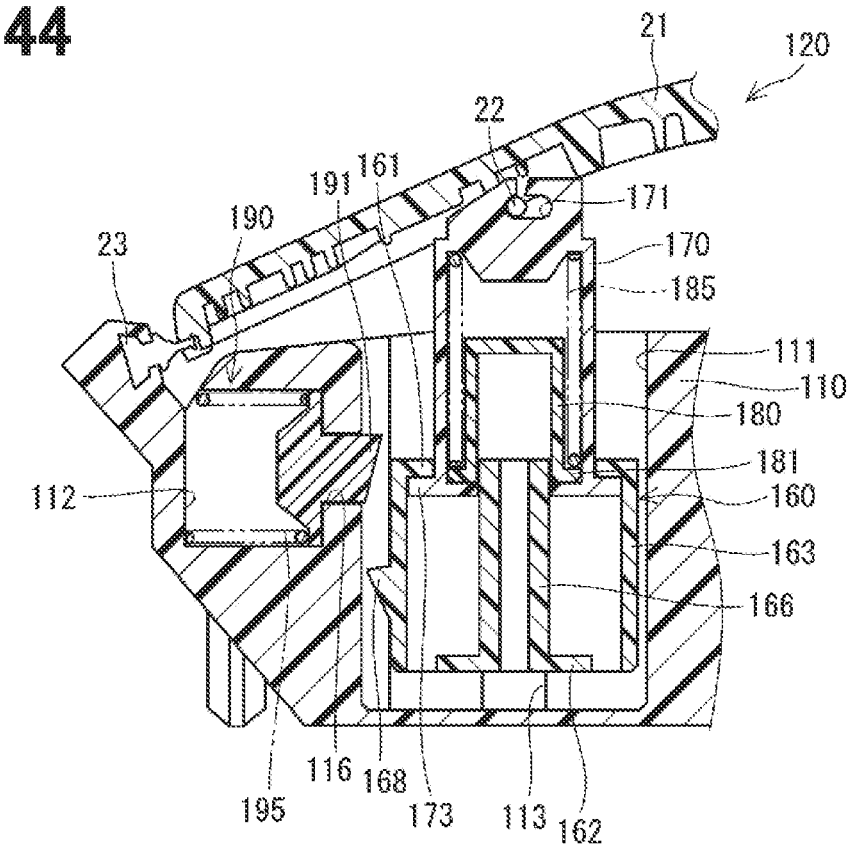
FIG. 44 is a cross-sectional view taken along line XLIV-XLIV of FIG. 43.
Figure 45:
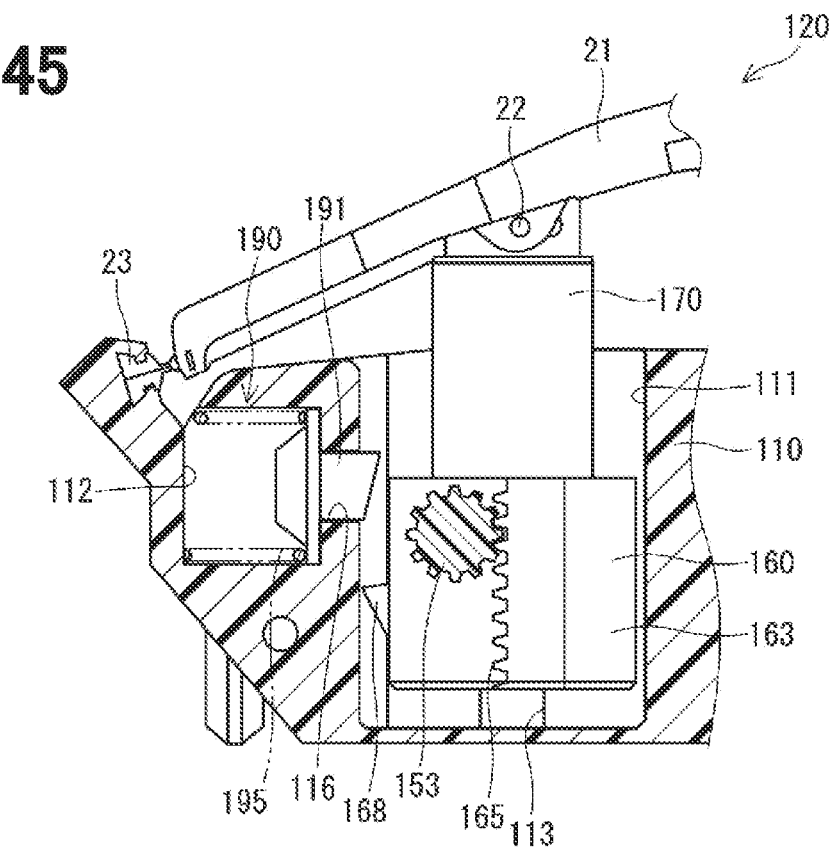
FIG. 45 is a cross-sectional view taken along line XLV-XLV of FIG. 43.

As shown in FIG. 43 to FIG. 45, the rack case 160 is formed substantially in a cylindrical shape. A rack case housing chamber 111 open to the pad 21 side is formed in the case 110 and the rack case 160 is housed in the rack case housing chamber 111. Hereafter, a surface of the rack case 160 on the pad 21 side will be designated as top wall 161 and a surface opposite side to the pad 21 will be designated as bottom wall 162. A rack gear portion 165 is so formed that the rack gear portion is protruded to outside a circumferential wall surface 163 and is extended in an axial direction. The rack gear portion 165 is engaged with the minor diameter portion of the gear 153.

In the circumferential wall surface 163 on the opposite side to the rack gear portion 165 with an axis line in-between, a guide portion 167 is so formed that the guide portion is extended in an axial direction. The guide portion 167 is slidably fit into a guide groove 113 formed in the case 110. A lock hooking portion 168 protruded outward in a radial direction is formed on the fulcrum member 23 side of the circumferential wall surface 163.

When the speed reduction gears 151 to 153 are rotated by rotation of the motor 40, the rack case 160 is moved in an axial direction. In the present embodiment, when the gear 153 is rotated counterclockwise, the rack case 160 is moved and brought closer to the pad 21; and when the gear 153 is rotated clockwise, the rack case 160 is moved in such a direction that the rack case is brought away from the pad 21. Hereafter, movement of the rack case 160 in such a direction as to approach the pad 21 will be designated as ascending and movement thereof in such a direction as to depart from the pad 21 will be designated as descending.

A protrusion 166 extended in an axial direction is formed in the rack case 160. The top wall 161 is open outside the protrusion 166 in a radial direction and the spring case 170 is so inserted thereinto that the spring case is axially movable.

The spring case 170 is formed substantially in a cylindrical shape. The spring case 170 is placed outside the protrusion 166 in a radial direction and is so provided that the spring case is configured to be moved in an axial direction relative to the rack case 160. A hooking hole 171 is formed in an end portion of the spring case 170 on the pad 21 side. A connecting pin 22 provided on the pad 21 is inserted into the hooking hole 171. As a result, the pad 21 and the spring case 170 are connected with each other. A hooking wall 173 extended from the cylindrical portion inward and outward in a radial direction is formed on an end portion of the spring case 170 on the opposite side to the pad 21. When the hooking wall 173 is abutted against the top wall 161 or the bottom wall 162, a moving range of the spring case 170 relative to the rack case 160 is limited.

The holder 180 is formed substantially in a shape of a closed-end cylinder open on the opposite side to the pad 21 and is so provided that the holder is located inside the spring case 170 in a radial direction and outside the protrusion 166 of the rack case 160 in a radial direction. A hooking portion 181 extended outward in a radial direction is formed on the open side of the holder 180.

The reaction force adjusting biasing member 185 is a compression spring and is placed between the spring case 170 and the holder 180. With respect to the reaction force adjusting biasing member 185, an end portion thereof on the pad 21 side is hooked to the spring case 170 and an end portion thereof on the opposite side to the pad 21 is hooked to the hooking portion 181 of the holder 180.

The locking portion 190 includes a lock pin 191 and the lock pin biasing member 195. A communicating portion 116 communicating the rack case housing chamber 111 and the lock housing chamber 112 with each other is formed at a point of the case 110 opposed to the lock hooking portion 168. One end of the lock pin 191 is so provided that the one end is protruded from the communicating portion 116 and can be abutted against the lock hooking portion 168 and the other end thereof is housed in the lock housing chamber 112. The lock pin 191 is so provided that the lock pin is movable in a direction different from the direction of movement of the rack case 160. In the present embodiment, the lock pin 191 is so provided that the lock pin is movable in a direction orthogonal to the direction of movement of the rack case 160. The direction of movement of the lock pin 191 need not be orthogonal to the direction of movement of the rack case 160 as long as the directions of movement are different from each other.

The lock pin biasing member 195 is housed in the lock housing chamber 112. One end of the lock pin biasing member 195 is hooked to the case 110 and the other end thereof is hooked to the lock pin 191. The lock pin biasing member 195 biases the lock pin 191 in such a direction that the lock pin is brought closer to the rack case 160.

A description will be given to an operation of the accelerator device 2 with reference to FIG. 44 to FIG. 52. FIG. 44, FIG. 46, FIG. 47, FIG. 59, and FIG. 51 correspond to a cross section taken along line XLIV-XLIV of FIG. 43 and FIG. 45, FIG. 48, FIG. 50, and FIG. 52 correspond to a cross section taken along line XLV-XLV of FIG. 43.

Figure 46:
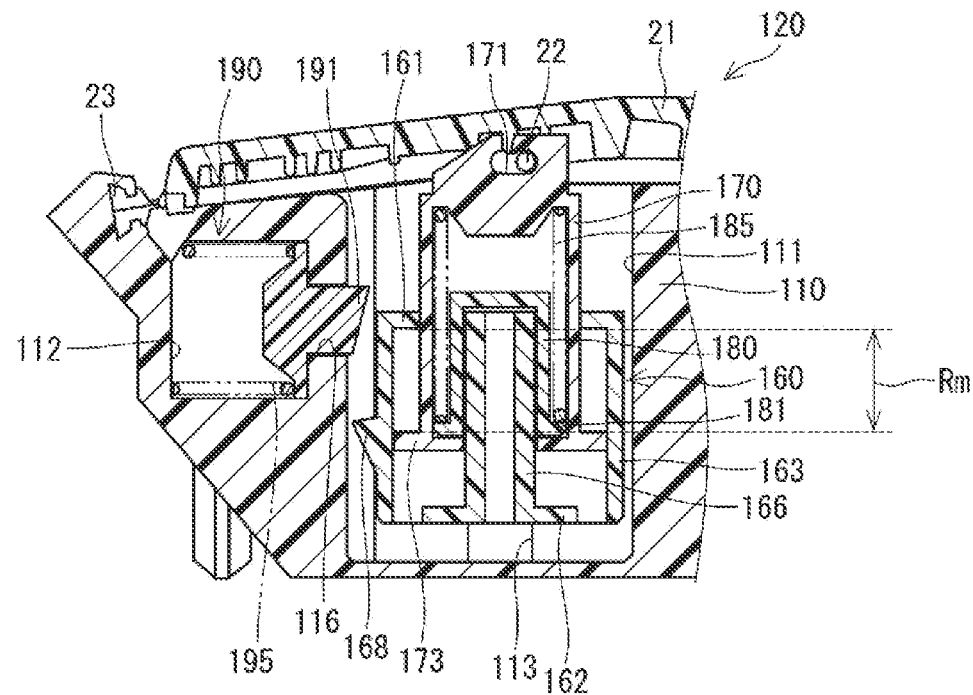
FIG. 46 is a cross-sectional view illustrating a pedal lever in an accelerator device according to the sixth embodiment as is in a fully opened state.

FIG. 44 to FIG. 46 show a state in which the motor 40 is not biased and force in a return direction or a depressing direction power is not given to the pedal lever 120 by way of the transmission mechanism 150. As shown in FIG. 44 and FIG. 45, when the pedal lever 120 is in a fully closed state, the spring case 170 is in a state in which the spring case has been pulled up by the pedal lever 120. As shown in FIG. 46, when the pedal lever 120 is in a fully opened state, the spring case 170 is in a state in which the spring case has been pressed down by the pedal lever 120. At this time, the hooking wall 173 is away from a surface of the bottom wall 162 on the pad side.

When the motor 40 is not biased, an influence of cogging torque can be avoided by neutrally moving the spring case 170 in the rack case 160 within a range Rm throughout the movable range of the pedal lever 120 from fully closed to fully opened. Thus, a driver's pedal effort feeling can be adjusted by a design of the pedal body. When the motor 40 is not biased, a surface of the bottom wall 162 of the rack case 160 on the opposite side to the pad 21 is away from the case 110.

Figure 47:
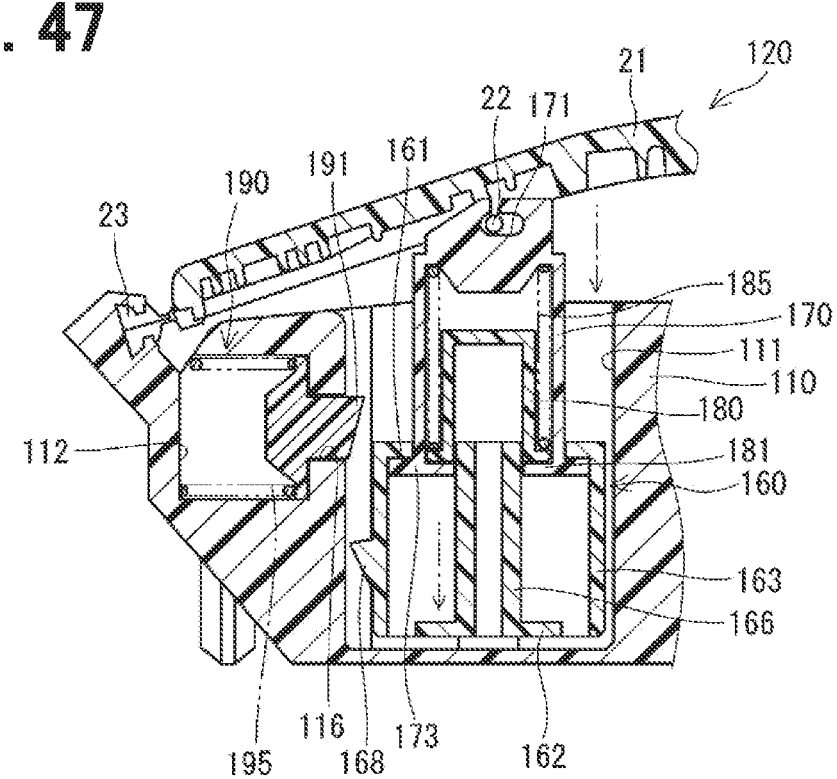
FIG. 47 is a cross-sectional view illustrating an operation of exerting force to a pedal lever in a depressing direction according to the sixth embodiment.
Figure 48:
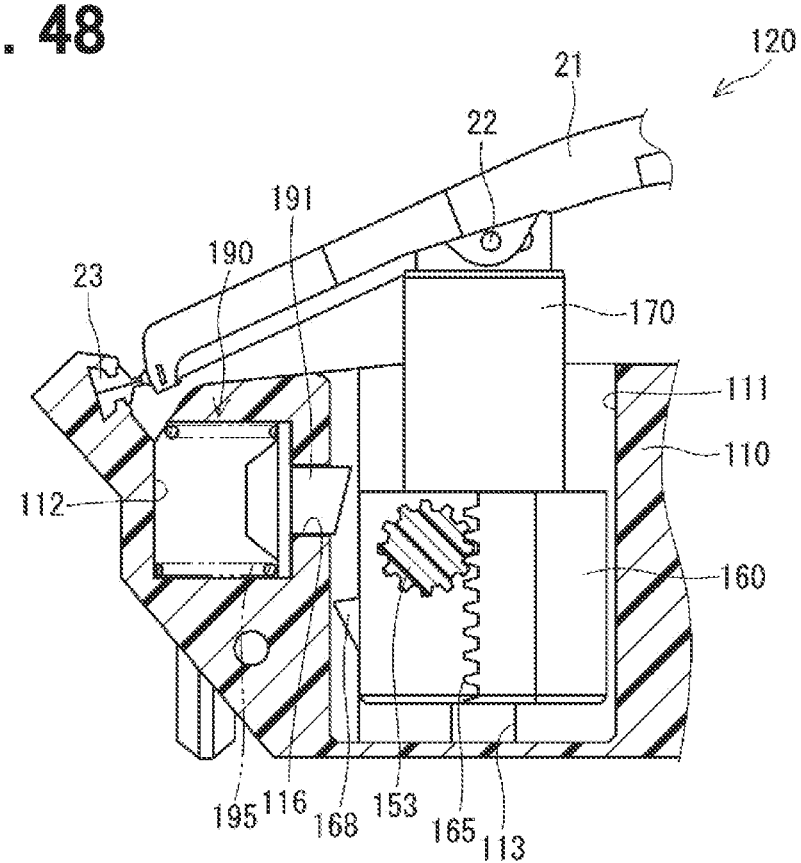
FIG. 48 is a cross-sectional view illustrating an operation of exerting force to a pedal lever in a depressing direction according to the sixth embodiment.

In cases where the pedal lever 120 is driven in a depressing direction as shown in FIG. 47 and FIG. 48, when the gear 153 is rotated in a clockwise, the rack case 160 descends and the top wall 161 and the hooking wall 173 of the spring case 170 are abutted against each other. When the rack case 160 is further caused to descend with the top wall 161 and the hooking wall 173 abutted against each other, the pad 21 is pulled in an accelerator opening direction by way of the spring case 170.

Figure 49:
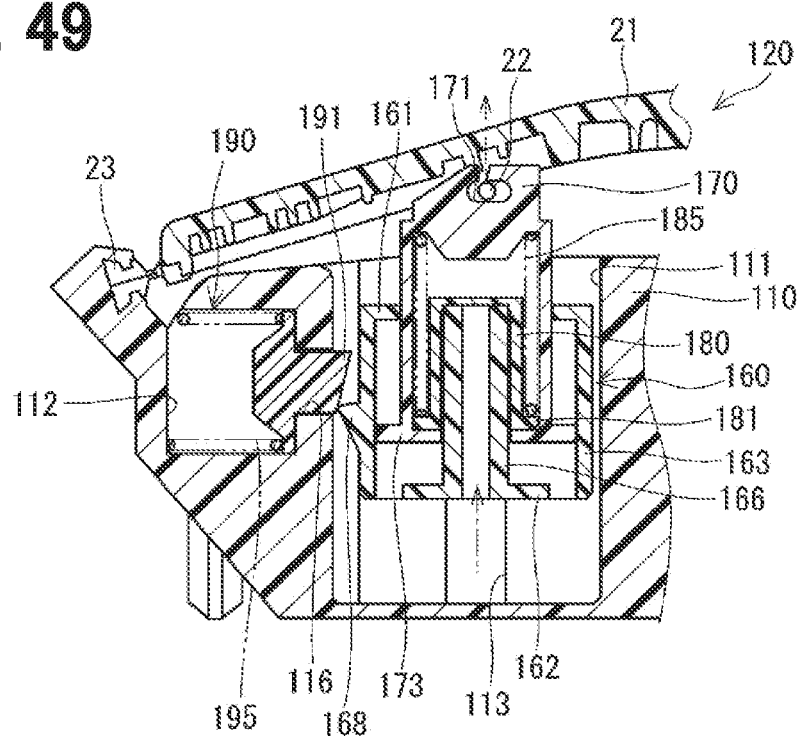
FIG. 49 is a cross-sectional view illustrating an operation of exerting force to a pedal lever in a return direction according to the sixth embodiment.
Figure 50:
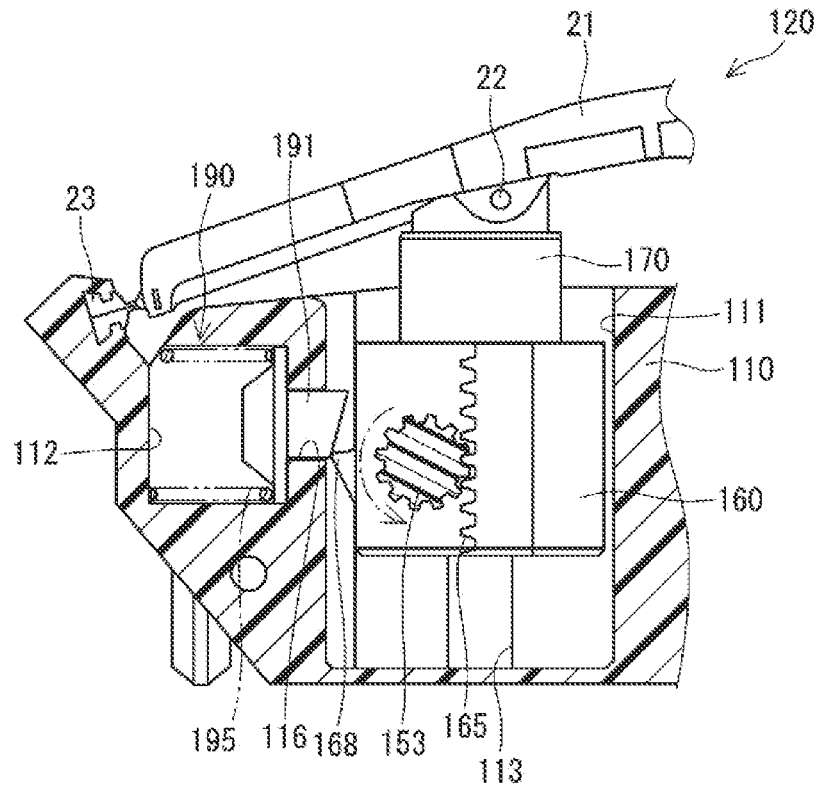
FIG. 50 is a cross-sectional view illustrating an operation of exerting force to a pedal lever in a return direction according to the sixth embodiment.

In cases where the pedal lever 120 is driven in a return direction as shown in FIG. 49 and FIG. 50, when the gear 153 is rotated in a counterclockwise direction, the rack case 160 ascends and a tip of the protrusion 166 of the rack case 160 and the holder 180 are abutted against each other. When the rack case 160 is further caused to ascend from this state, the holder 180 is pushed up by the protrusion 166. As a result, the reaction force adjusting biasing member 185 is compressed and reaction force is given to the pedal lever 120 by biasing force of the reaction force adjusting biasing member 185.

Figure 51:
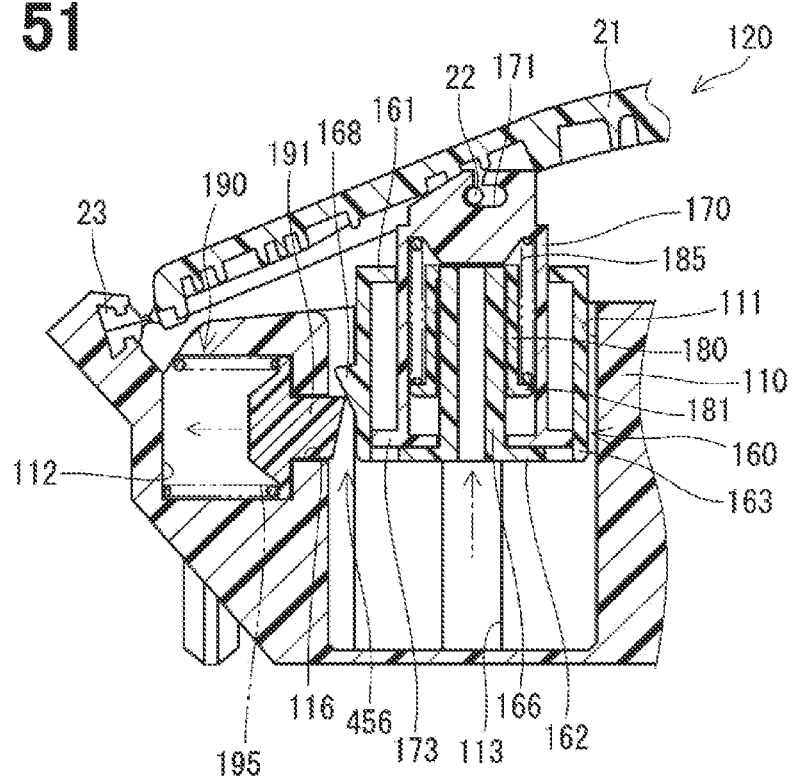
FIG. 51 is a cross-sectional view of a pedal lever according to the sixth embodiment as is in a locking state.
Figure 52:
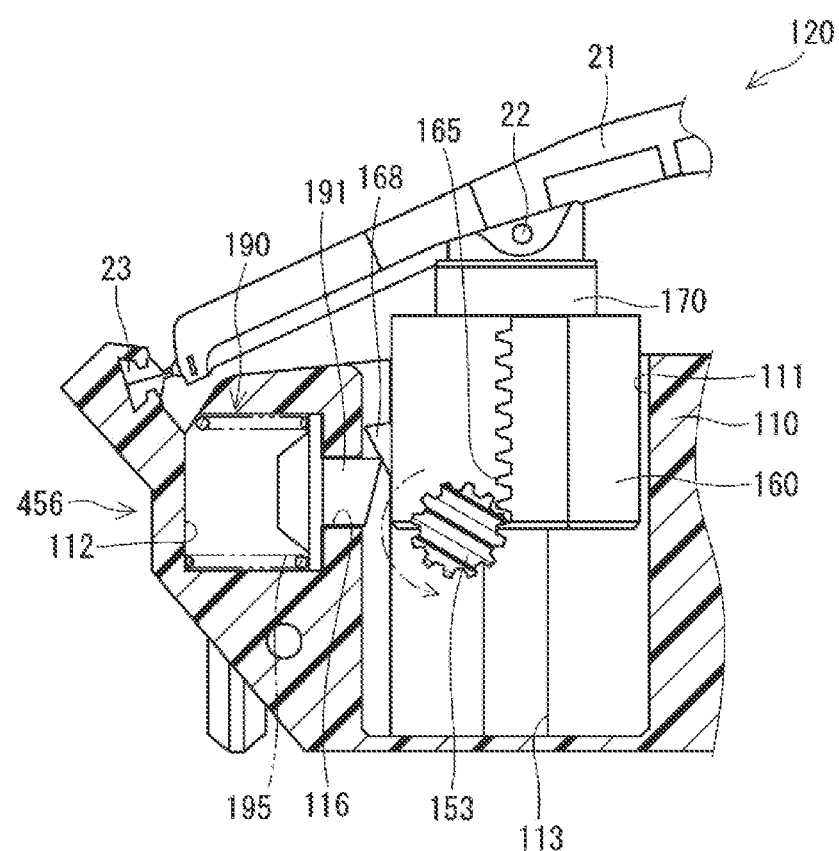
FIG. 52 is a cross-sectional view of a pedal lever according to the sixth embodiment as is in a locking state.
Figure 53:
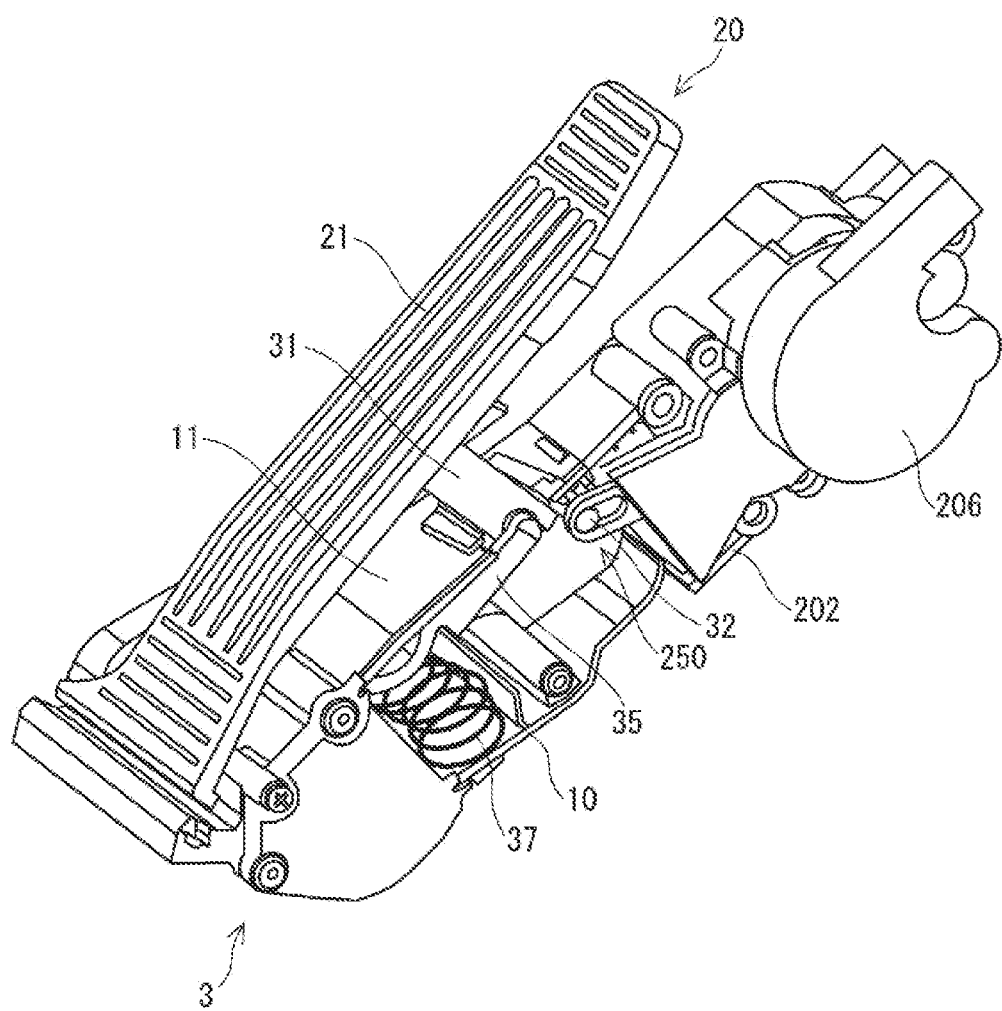
FIG. 53 is a perspective view of an accelerator device according to a seventh embodiment.
Figure 54:
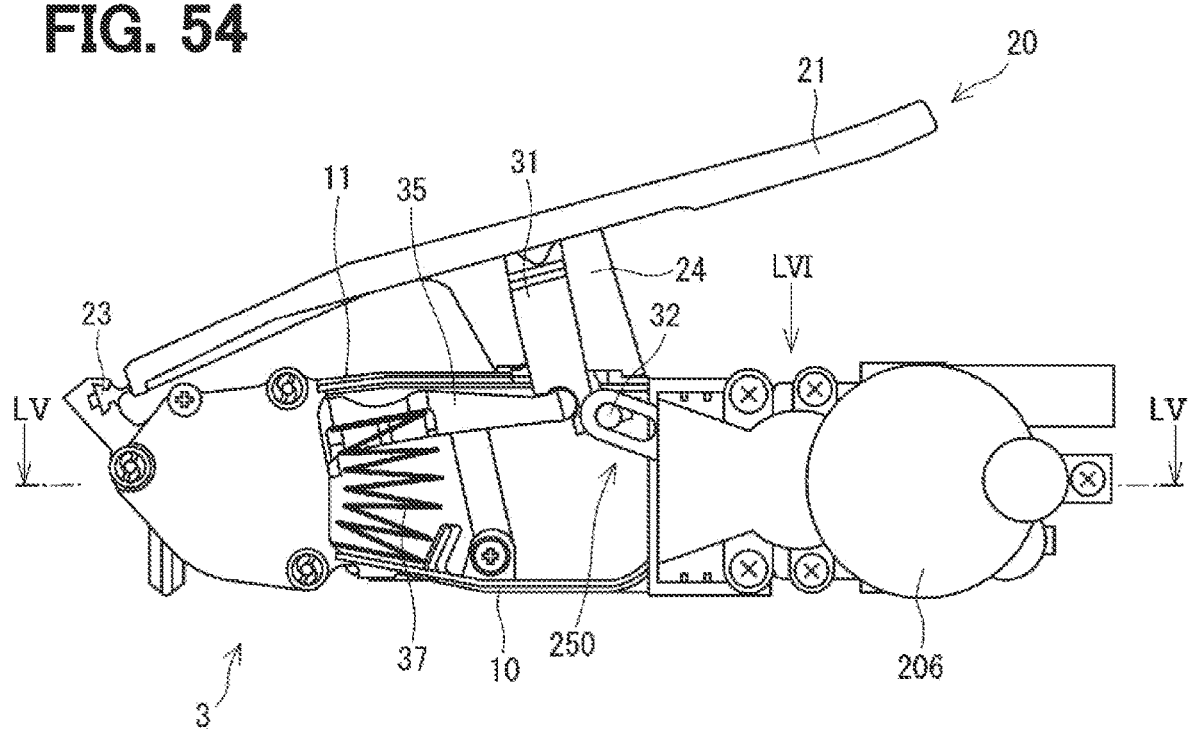
FIG. 54 is a side view of an accelerator device according to the seventh embodiment.

When the rack case 160 is caused to ascend as shown in FIG. 51 and FIG. 52, the lock hooking portion 168 of the rack case 160 and the lock pin 191 are abutted against each other. When the rack case 160 is further caused to ascend, the lock hooking portion 168 is moved along the sloped surface of the lock pin 191 and pushes the lock pin 191. When the lock hooking portion 168 climbs over the lock pin 191, the pedal lever 120 is locked. With respect to the abutment face between the lock hooking portion 168 and the lock pin 191 at this time, an angle of slope and the like are so set that a locking state can be maintained even when the pedal lever 120 is depressed with unlocking pedal effort smaller than predetermined. This is the same also with the abutment face between a lock pin 261 and a lock hooking portion 229 in a seventh embodiment.

When with the pedal lever 120 locked, the pedal lever 120 is depressed with predetermined or larger unlocking pedal effort or the gear 153 is rotated in a clockwise direction, the following operation takes place: When a component of force externed in such a direction as to push the lock pin 191 exceeds biasing force of the lock pin biasing member 195, the rack case 160 is caused to descend while pushing the lock pin 191 along the sloped surface of the lock hooking portion 168. When the lock hooking portion 168 climbs over the lock pin 191 again, the pedal lever 120 is unlocked. In the present embodiment, the rack case 160 and the locking portion 190 constitute a locking mechanism 456.

In the present embodiment, the locking portion 190 is provided in a fully closed lock position. Instead, the accelerator device may be configured as described below: The locking portion 190 and the lock hooking portion 168 are provided in places where a locking operation can be performed in an intermediate position between the pedal lever 120's fully closed position and fully opened position. Then, movement of the pedal lever 120 in the pedal lever 120 opening direction is regulated in the intermediate position. In this case, movement of the pedal lever 120 in a closing direction is not regulated. As a result, a depressing margin can be ensured for a failsafe operation.

The power transmission mechanism 150 includes: the gears 151 to 153 driven by the motor 40; the rack case 160 having the rack gear portion 165; the spring case 170 driven integrally with the pedal lever 120; the reaction force adjusting biasing member 185; and the holder 180. One end of the reaction force adjusting biasing member 185 is hooked to the spring case 179 and the other end thereof is hooked to the holder 180. The holder 180 is so provided that the holder is configured to be moved relative to the spring case 170 by the rack case 160. As a result, force both in a depressing direction and in a return direction can be actively given by the motor 40.

The locking mechanism 456 includes: the lock hooking portion 168 provided in a power transmission path extending from the motor 40 to the pedal lever 120; and the lock pin 191 that is configured to be moved or deformed by elastic force. The locking mechanism 456 regulates movement of the pedal lever 120 by the lock hooking portion 168 climbing over the lock pin 191 and being hooked to the lock pin 191.

In detail, the locking mechanism 456 includes the lock pin 191 that is movable in a direction different from the direction of movement of the spring case 170 and can regulate movement of the pedal lever 120 by hooking the lock hooking portion 168 formed on the rack case 160. As a result, movement of the pedal lever 120 can be appropriately regulated. The same effect as in the above-mentioned embodiment is brought about.

In the present embodiment, the rack case 160 is equivalent to "linear-motion member"; the spring case 170 is equivalent to "case member"; the lock pin 191 is equivalent to "locking member"; and elastic force of the lock pin biasing member 195 is equivalent to "elastic force." The lock hooking portion 168 is provided integrally with the rack case 160 constituting the power transmission mechanism 150 and can be considered to "be provided in a power transmission path."

Seventh Embodiment

FIG. 53 to FIG. 68 illustrate the seventh embodiment. A power transmission mechanism 200 of an accelerator device 3 includes a motor gear 204, a bevel gear 205, a first spur gear 210, a second spur gear 220, a third spur gear 230, a torsion spring 245, a cam 250, a locking portion 260, and the like.

The motor 201 is, for example, a DC motor, generates turning force, and is housed in a motor case 202. The motor 201 is so provided that a rotation axis, not shown, is substantially in parallel to the top wall portion 11 of the case 10.

The motor gear 204 is rotated integrally with a shaft of the motor 201. The bevel gear 205 is engaged with the motor gear 204 and connected with the first spur gear 210 via a shaft 211. The shaft 211 is rotatably supported in a connector case 203 and a gear cover 206.

The gear cover 206 is provided on side faces of the motor 201 and the connector case 203 and houses the spur gears 210, 220, 230, the cam 250, and the like. The gear cover 206 is fixed on the connector case 203 and the motor case 202 by a fixing member 207 that is a tapping or the like. The gear cover 206 is provided with a rotation angle sensor, not shown, detecting a rotation of the second spur gear 220.

Figure 55:
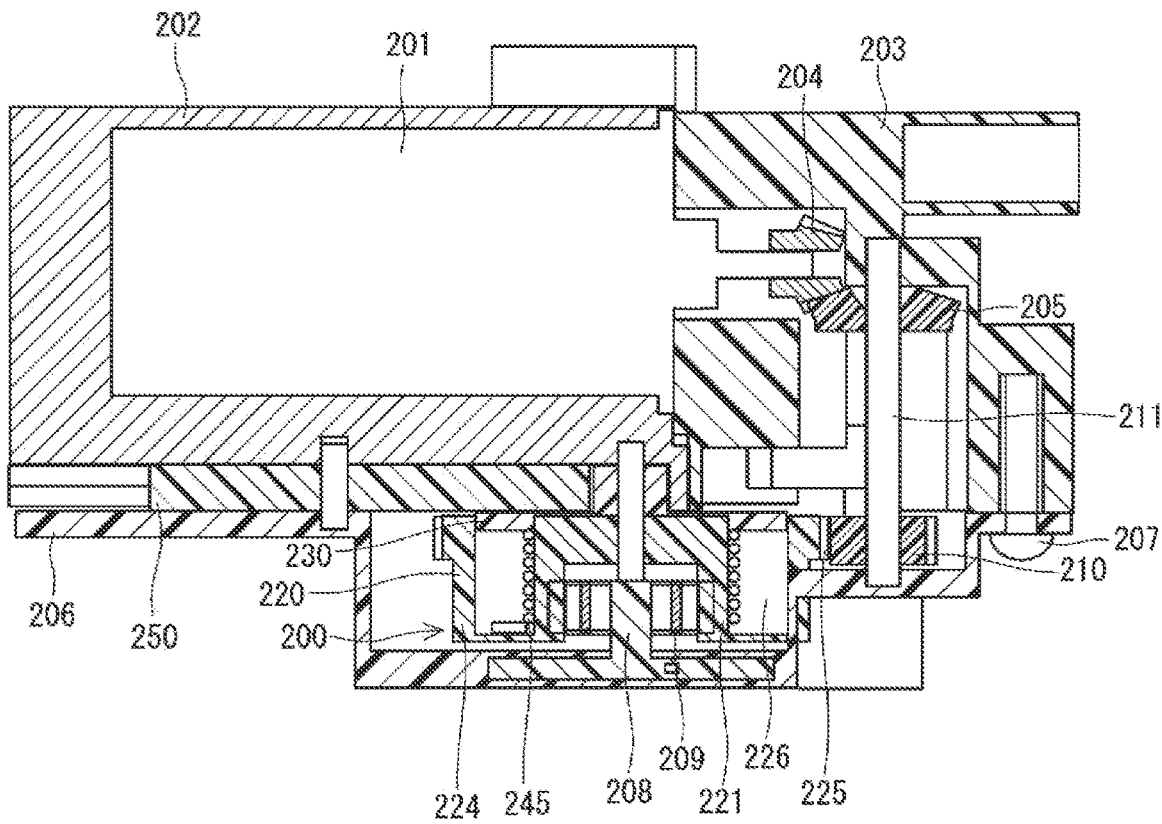
FIG. 55 is a cross-sectional view taken along line LV-LV of FIG. 54.
Figure 56:
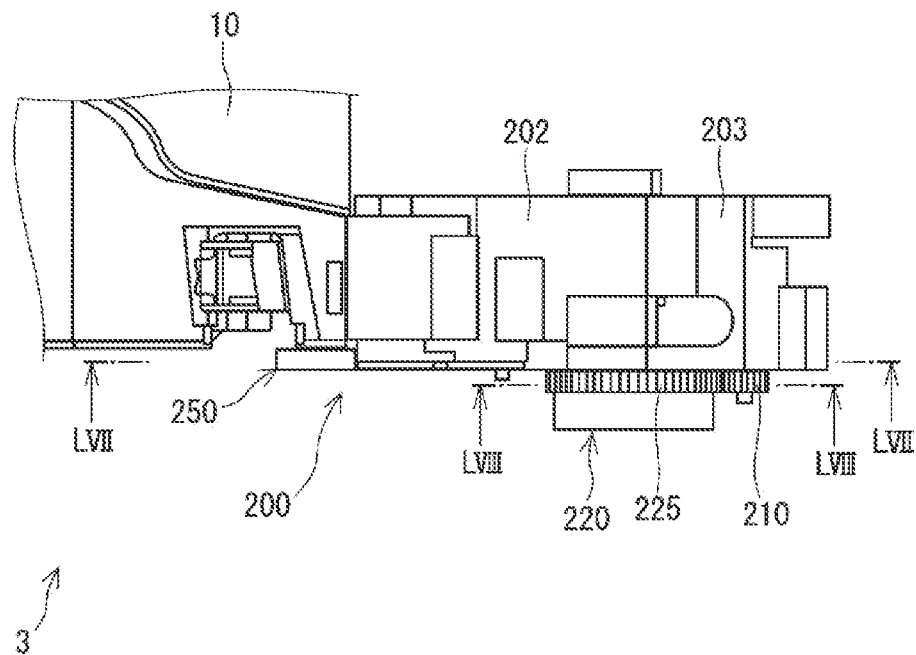
FIG. 56 is an arrow view taken in the direction of arrow LVI of FIG. 54.
Figure 59:
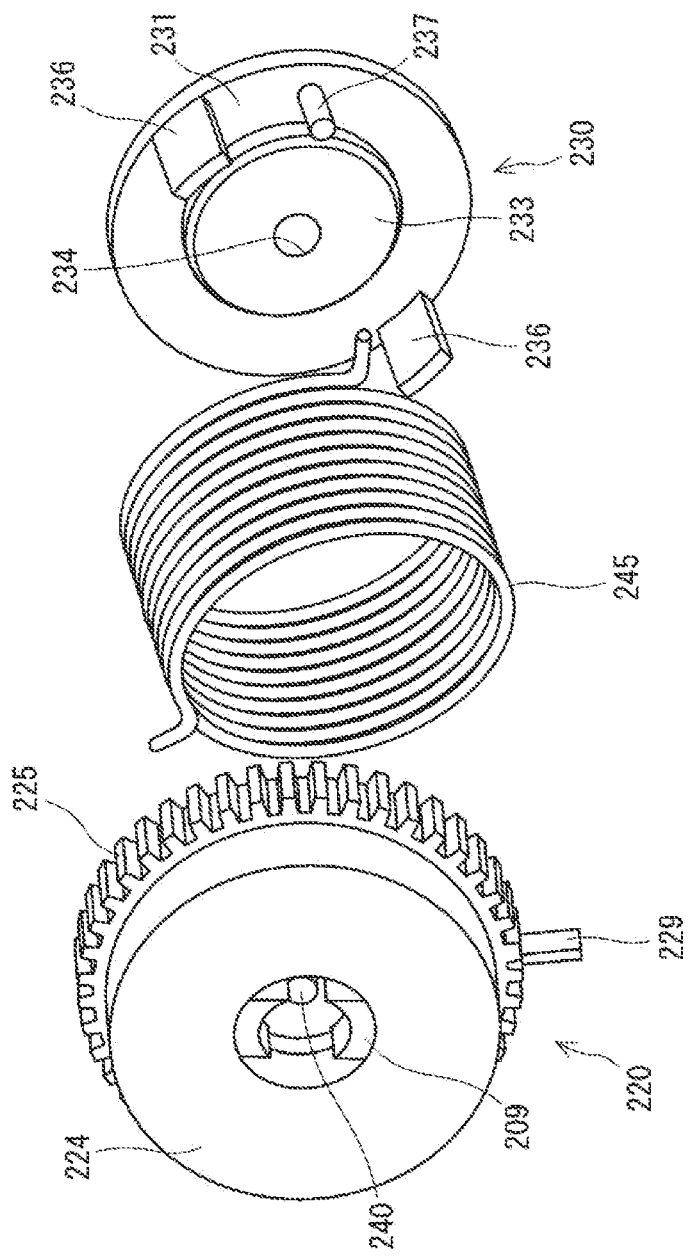
FIG. 59 is a perspective view of a second spur gear, a third spur gear, and a torsion spring according to the seventh embodiment.
Figure 60:
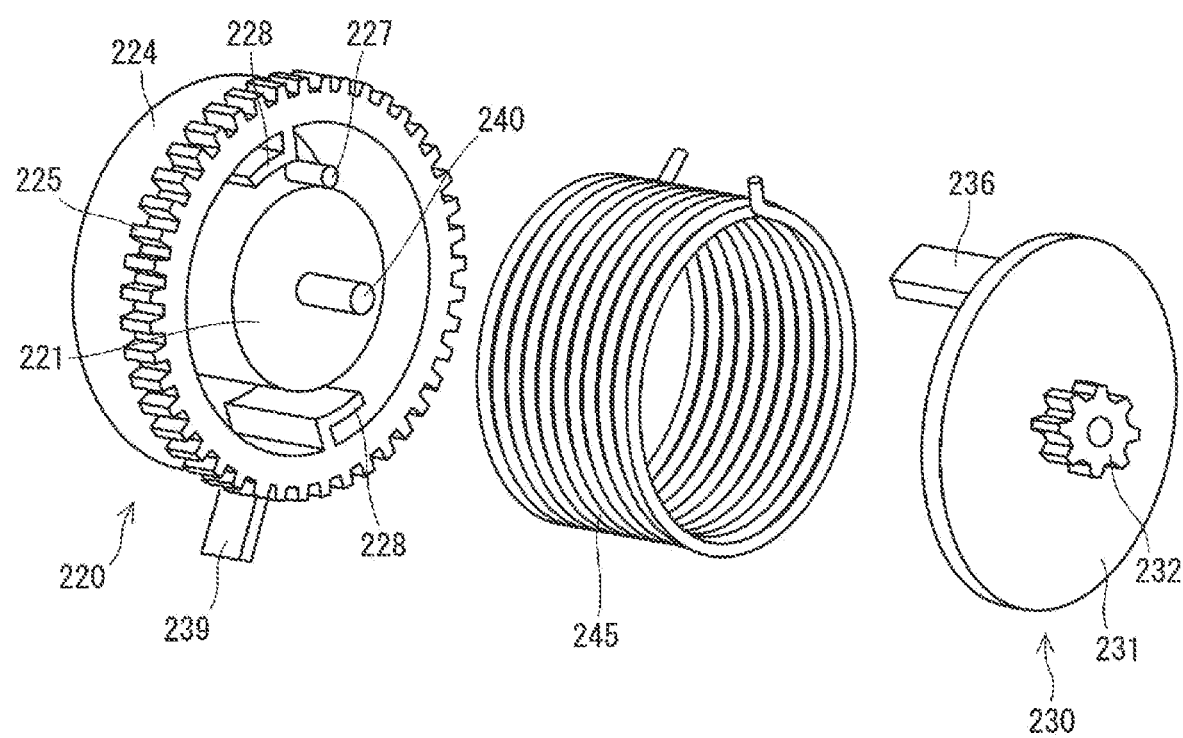
FIG. 60 is a perspective view of a second spur gear, a third spur gear, and a torsion spring according to the seventh embodiment.

As shown in FIG. 55, FIG. 59, FIG. 60, and the like, the second spur gear 220 includes an inner cylindrical portion 221 open on the opposite side to the motor case 202, an outer cylindrical portion 224 open on the motor case 202 side, and the like and is integrally formed of resin or the like. A shaft 240 is press-fit into a bottom portion 222 of the inner cylindrical portion 221. A sensor holding portion 208 provided with the rotation angle sensor is inserted on the inner circumferential side of the inner cylindrical portion 221. The inner cylindrical portion 221 is provided with a magnet 209 in a place detectable by the rotation angle sensor.

A gear portion 225 engaged with the first spur gear 210 is formed on the open side of the outer cylindrical portion 224. A housing chamber 226 housing the torsion spring 245 is formed between the inner cylindrical portion 221 and the outer cylindrical portion 224. A pin 227 to which one end of the torsion spring 245 is hooked is protrudingly formed on the housing chamber 226.

A hooking wall 228 formed substantially in an L shape as viewed in a plane is formed on an inner wall of the outer cylindrical portion 224. In the present embodiment, two hooking walls 228 are formed with an axis line in-between. The lock hooking portion 229 is protrudingly formed outside the outer cylindrical portion 224 in a radial direction.

The third spur gear 230 includes a base portion 231, a gear portion 232, an inserted portion 233, a hooking projected portion 236, a pin 237, and the like and is integrally formed of resin or the like. The gear portion 232 is protrudingly formed on the base portion 231 on the opposite side to the second spur gear 220. The inserted portion 233 is protrudingly formed on the second spur gear 220 side of the base portion 231 and is inserted into inside the outer cylindrical portion 224 in a radial direction. An insertion hole 234 into which the shaft 240 is inserted is formed in the gear portion 232 and the inserted portion 233.

The hooking projected portion 236 is so formed as to protrude toward the second spur gear 220 in two places on the outer circumferential side of the base portion 231 and the hooking projected portions are inserted into a space between the hooking walls 228 and the outer cylindrical portion 224. The pin 237 is so formed as to protrude to the second spur gear 220 side of the base portion 231.

The torsion spring 245 is housed in the housing chamber 226 of the second spur gear 220; one end thereof is hooked to the pin 227 of the second spur gear 220 and the other end thereof is hooked to the pin 237 of the third spur gear 230. When the second spur gear 220 is rotated by driving of the motor 201, the second spur gear 220 and the third spur gear 230 are integrally rotated until a set load of the torsion spring 245 is reached. When the set load is exceeded, the second spur gear 220 and the third spur gear 230 depart from each other and the third spur gear 230 is not rotated even though the second spur gear 220 is rotated.

Figure 57:
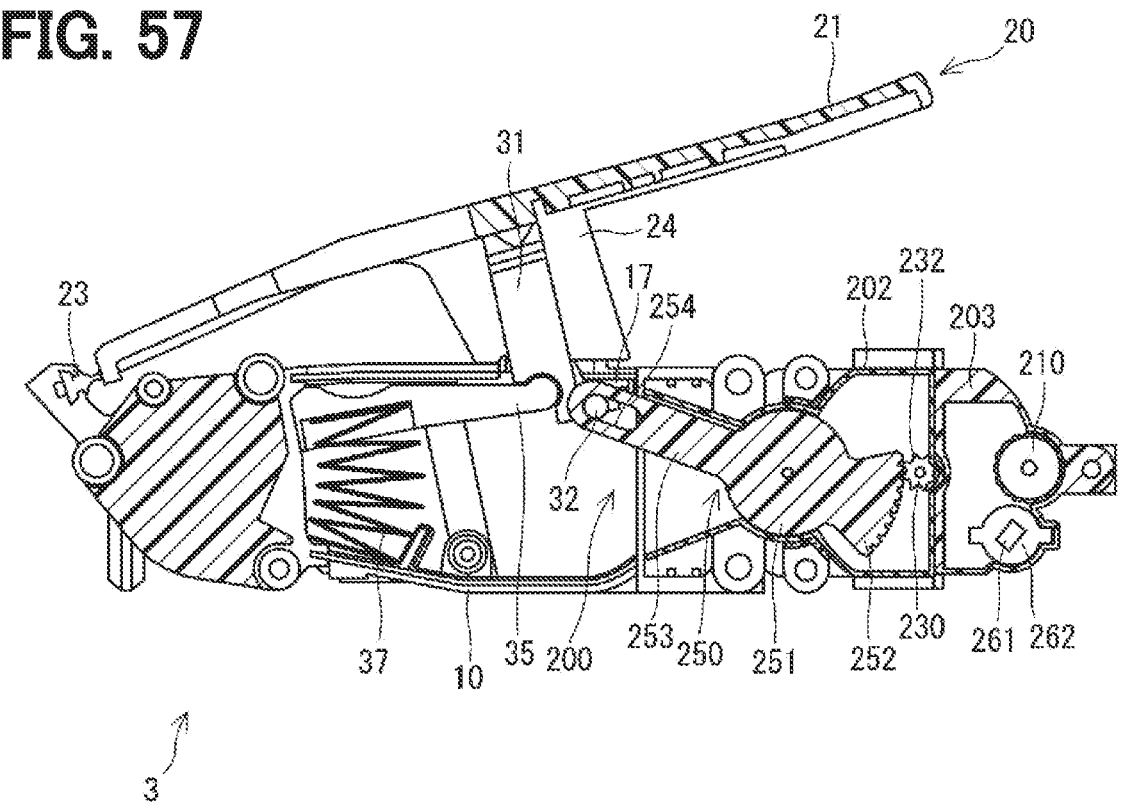
FIG. 57 is a cross-sectional view taken along line LVII-LVII of FIG. 56.
Figure 58:
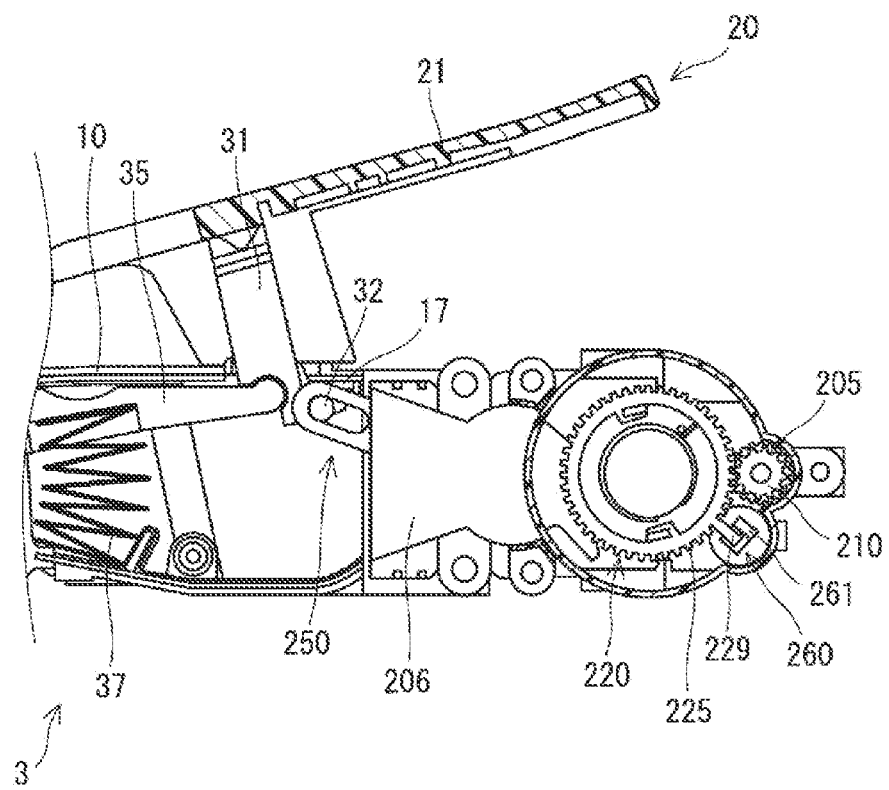
FIG. 58 is a cross-sectional view taken along line LVIII-LVIII of FIG. 56.

As shown in FIG. 57 and the like, the cam 250 includes a body portion 251, a gear portion 252, and a cam lever 253. The body portion 251 is formed substantially in a circular form as viewed in a plane and is rotatably supported in the motor case 202 and the gear cover 206. The gear portion 252 is so formed that the gear portion is protruded outward from the body portion 251 in a radial direction and is engaged with the gear portion 232 of the third spur gear 230.

The cam lever 253 is so formed that the cam lever is extended substantially to the opposite side to the gear portion 232 relative to the rotation axis of the body portion 251 outside the body portion 251 in a radial direction. A hole portion 254 is provided on the tip side of the cam lever 253. A connecting pin 32 provided on the arm 31 is inserted into the hole portion 254.

Figure 61:
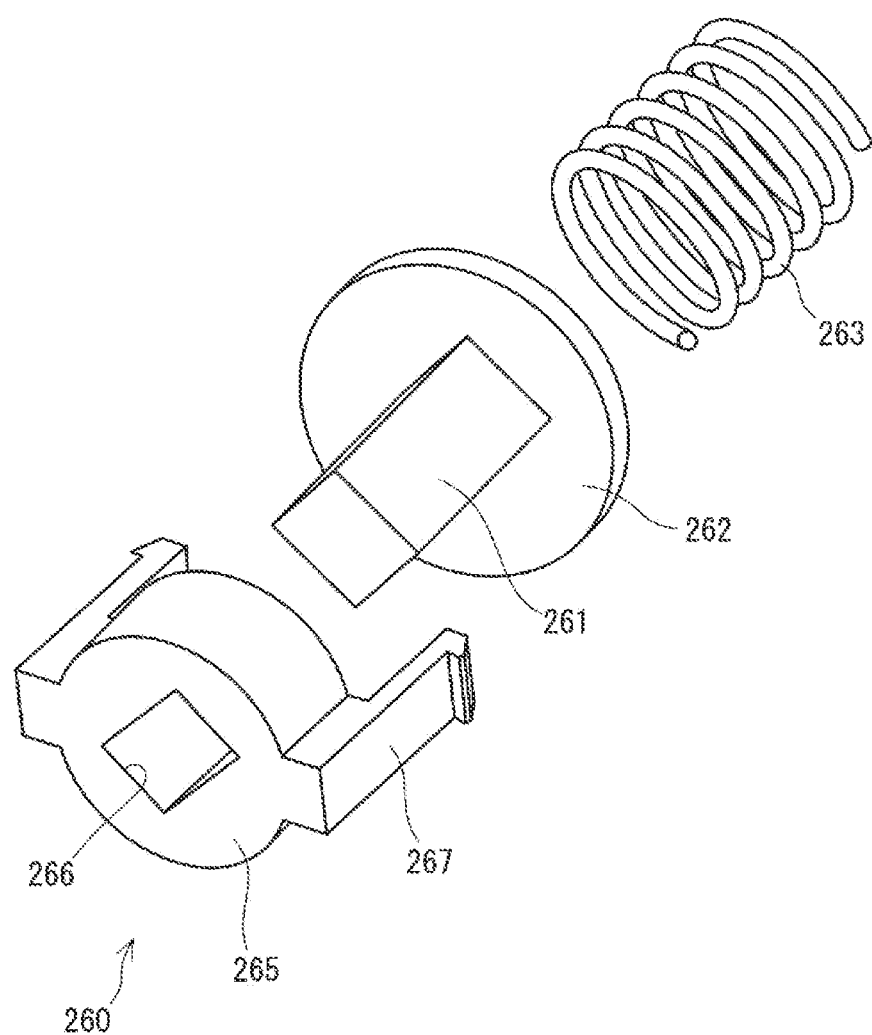
FIG. 61 is an exploded perspective view of a locking member according to the seventh embodiment.

As shown in FIG. 61, the locking portion 260 includes the lock pin 261, an elastic member 263, a lock pin case 265, and the like. The lock pin 261 is protrudingly provided on one surface of a flat plate portion 262. The elastic member 263 is a compression spring and is provided on a surface of the flat plate portion 262 on the opposite side to the side where the lock pin 261 is provided. The lock pin case 265 is formed substantially in a cylindrical shape and a hole portion 266 through which the lock pin 261 is taken out is formed at a bottom portion thereof. A fixing portion 257 is formed outside the cylindrical portion of the lock pin case 265 in a radial direction. The locking portion 260 is fixed on the connector case 203 by fixing the fixing portion 267 on the connector case 203 by snap-fit or the like in a state in which the elastic member 263 can be compressed by the flat plate portion 262.

A description will be given to an operation of the power transmission mechanism 200. Hereafter, the direction of rotation of the motor 201 performed when the cam 250 is rotated in a clockwise direction in FIG. 62 and the like will be taken as positive and the direction of rotation of the motor 201 when the cam is rotated in a counterclockwise direction will be taken as negative.

Figure 62:
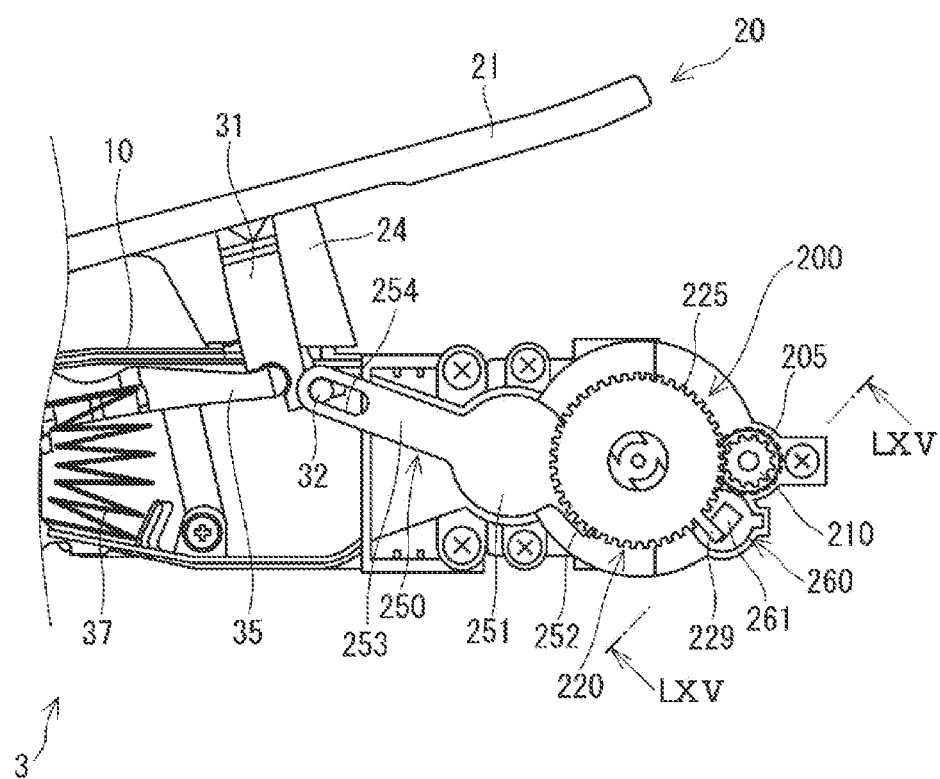
FIG. 62 is a side view of a pedal lever according to the seventh embodiment as is in a fully closed state.
Figure 63:
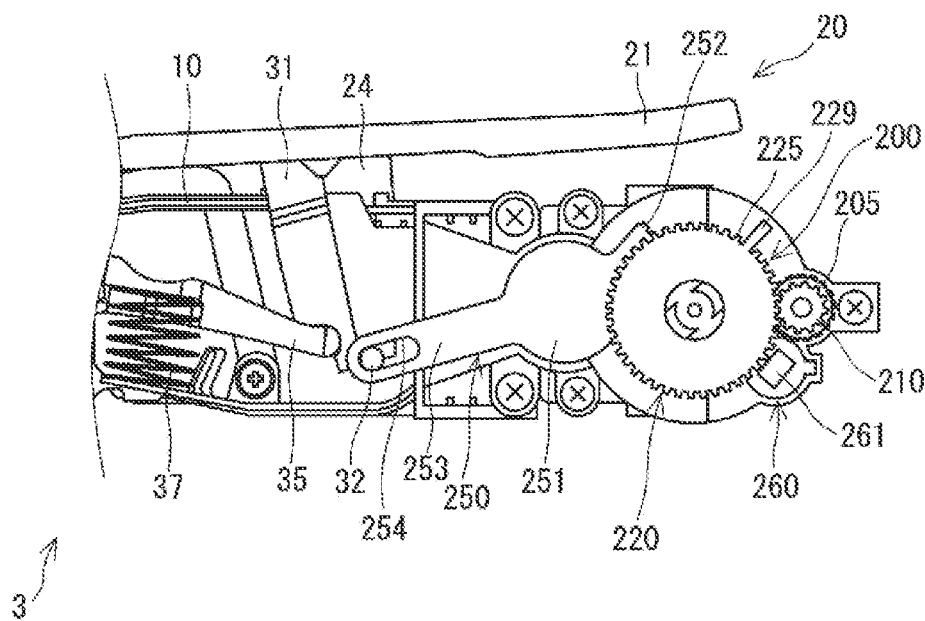
FIG. 63 is a side view of a pedal lever according to the seventh embodiment as is in a fully opened state.

FIG. 62 and FIG. 63 show a state in which the motor 201 is not biased and force in a return or depressing direction is not given to the pedal lever 20 by way of the power transmission mechanism 200. As shown in FIG. 62, when the pedal lever 20 is in a fully closed state, the cam lever 253 has been pulled up by the pad 21. FIG. 63 shows the pedal lever 20 in a fully opened state. When the pad 21 is depressed, the cam 250 is corotated with the pedal lever 20. At this time, cogging torque is produced at the motor 40.

Figure 64:
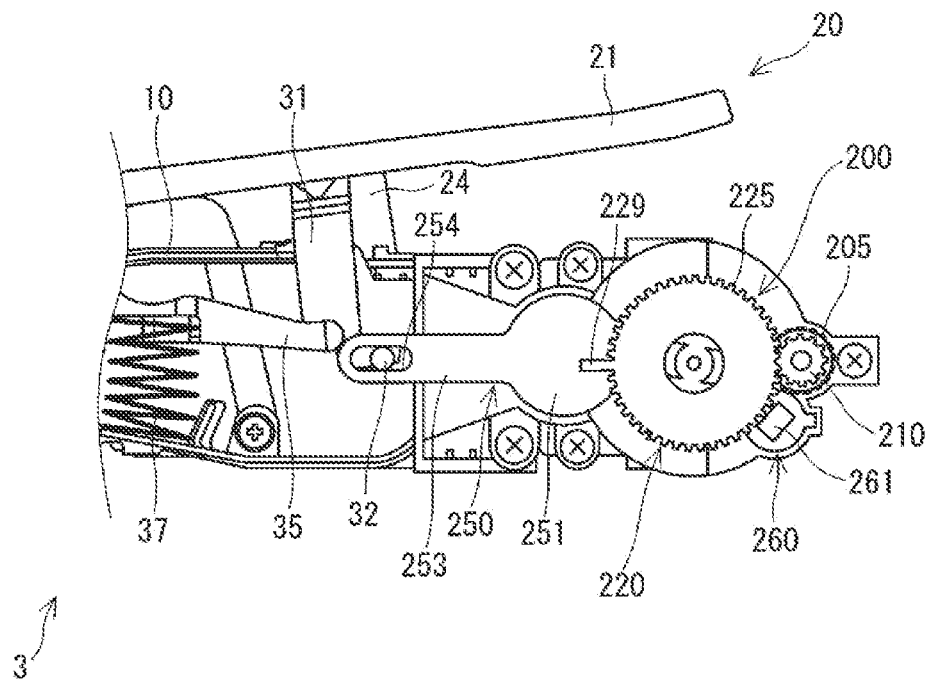
FIG. 64 is a side view of a pedal lever according to the seventh embodiment as is in an intermediate position.

FIG. 64 shows a state in which the pedal lever 20 is in an intermediate position between fully closed and fully opened. The pedal lever 20 can be driven in a depressing direction by rotating the motor 201 in a negative direction to rotate the cam 250 in a counterclockwise direction. The pedal lever 20 can be given reaction force in a return direction by rotating the motor 201 in a positive direction to rotate the cam 250 in a clockwise direction. At this time, the lock hooking portion 229 of the second spur gear 220 and the lock pin 261 are away from each other and rotation of the gears is not regulated.

Figure 65:
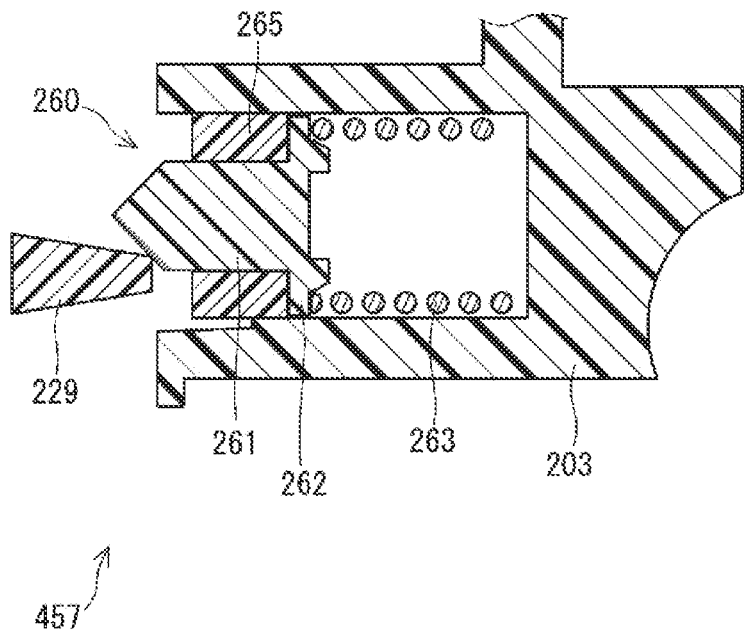
FIG. 65 is a cross-sectional view taken along line LXV-LXV of FIG. 62.
Figure 66:
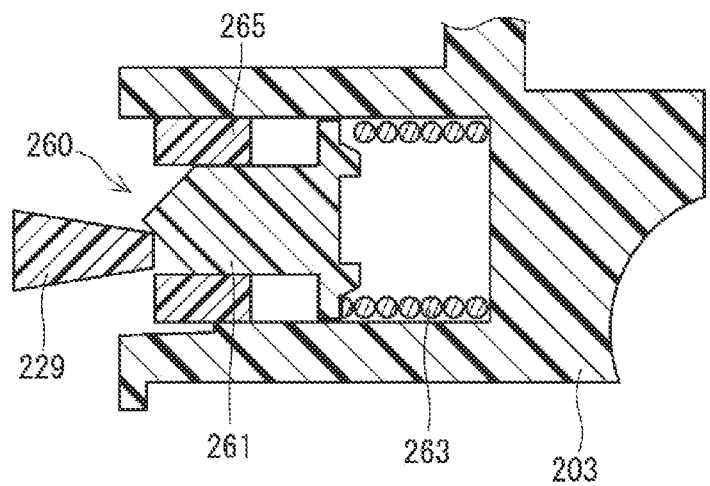
FIG. 66 is a cross-sectional view illustrating a state in which locking is in process according to the seventh embodiment.

When the arm 31 is abutted against the fully closed stopper 17 as shown in FIG. 62 and FIG. 65, rotation of the cam 250 in a clockwise direction is regulated. When the motor 201 is rotated in a positive direction in this state and the first spur gear 210 is rotated beyond a set load of the torsion spring 245, the torsion spring 245 is twisted; therefore, the second spur gear 220 is rotated in a counterclockwise direction. As a result, as shown in FIG. 65, the lock hooking portion 229 pushes lock pin 261 by thrust force and squeezes the elastic member 263.

Figure 67:
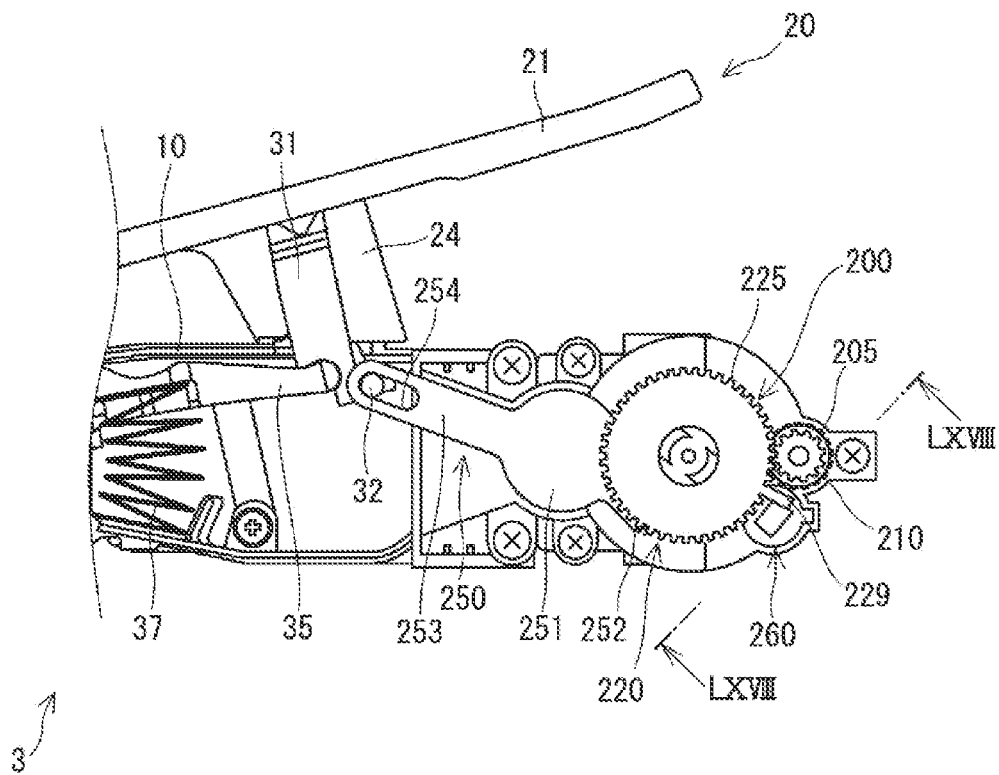
FIG. 67 is a side view illustrating a pedal locking state according to the seventh embodiment.
Figure 68:
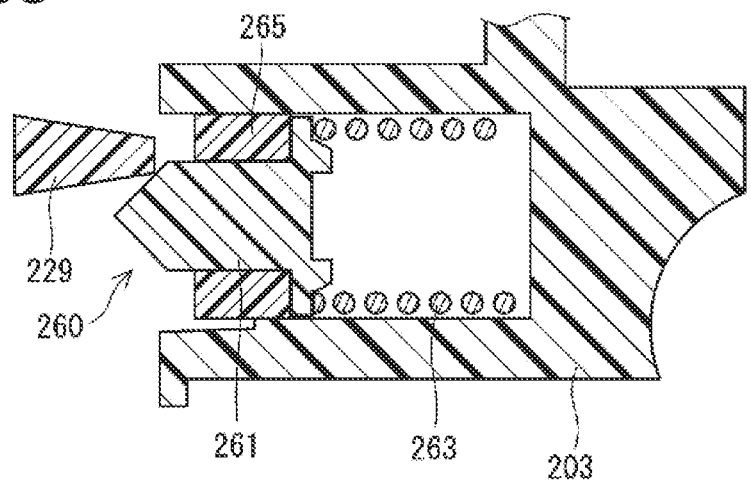
FIG. 68 is a cross-sectional view taken alone line LXVIII-LXVIII of FIG. 67.

When the lock hooking portion 229 climbs over the lock pin 261 as shown in FIG. 67 and FIG. 68, the pedal lever 20 is locked. When with the pedal lever 20 locked, the pedal lever 20 is depressed with predetermined or larger unlocking pedal effort or the motor 201 is driven in a negative direction, the elastic member 263 is squeezed by a component of force exerted in such a direction as to push the lock pin 261. When the lock hooking portion 229 climbs over the lock pin 261 again, the pedal lever 20 is unlocked. In the present embodiment, the locking portion 260 and the second spur gear 220 constitute a locking mechanism 457. The locking mechanism 457 is of a plunger type.

The power transmission mechanism 200 includes the cam 250 driven by the motor 201 and connected to the pedal lever 20. The gears 210, 220, 230 constituting a speed reducing mechanism are provided between the motor 201 and the cam 250. As a result, the motor 40 can actively give bidirectional force to the pedal lever 20 by way of the power transmission mechanism 200.

The speed reducing mechanism includes the second spur gear 220 as a drive source-side gear and the third spur gear 230 as a cam-side gear which are coaxially placed and the torsion spring 245 as a gear-to-gear biasing member is provided between the second spur gear 220 and the third spur gear 230. When the second spur gear 220 is rotated in a reaction force exerting direction, the third spur gear 230 is rotated integrally with the second spur gear 220 until a set load of the torsion spring 245 is reached and is not rotated when the set load of the torsion spring 245 is exceeded.

The locking mechanism 457 includes: the lock hooking portion 229 rotated integrally with the second spur gear 220; and the lock pin 261 configured to perform hooking the lock hooking portion 229 in a range within which the third spur gear 230 is not rotated but the second spur gear 220 is rotated. As a result, movement of the pedal lever 20 can be appropriately regulated. The same effect as in the above-mentioned embodiment is brought about.

In the present embodiment, the motor 201 is equivalent to "drive source"; the second spur gear 220 is equivalent to "drive source-side gear": the third spur gear 230 is equivalent to "cam-side gear"; the torsion spring 245 is equivalent to "gear-to-gear biasing member"; the lock pin 261 is equivalent to "locking member"; and elastic force of the elastic member 263 is equivalent to "elastic force." The lock hooking portion 229 is provided integrally with the second spur gear 220 constituting the power transmission mechanism 200 and can be considered to be "provided in a power transmission path."

Eighth Embodiment

Figure 69:
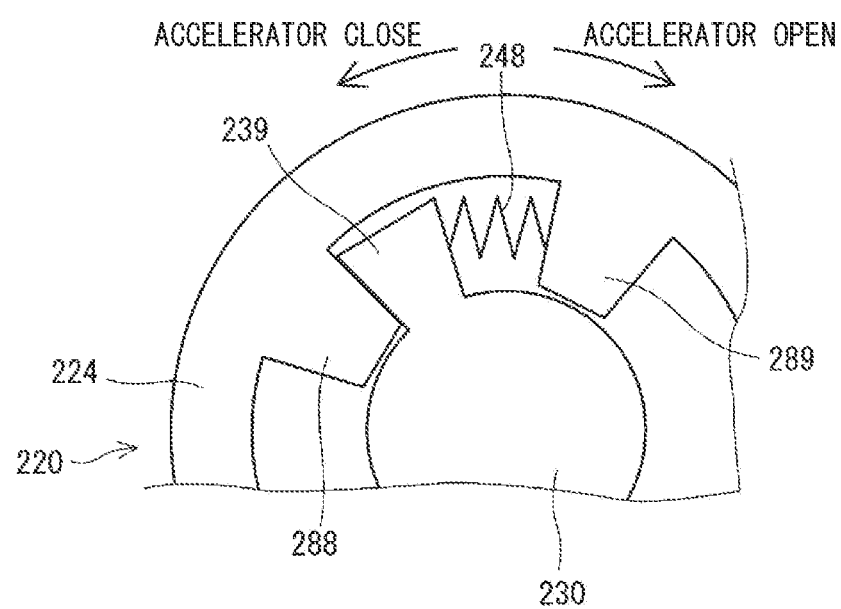
FIG. 69 is a schematic diagram of a second spur gear, a third spur gear, and a compression spring according to an eighth embodiment.

FIG. 69 illustrates the eighth embodiment. In the eighth embodiment, the torsion spring 245 is provided between the second spur gear 220 and the third spur gear 230. In the eighth embodiment, a compression spring 248 as a gear-to-gear biasing member is provided between the second spur gear 220 and the third spur gear 230. Hooking walls 288, 289 are formed on an inner wall of the outer cylindrical portion 224 of the second spur gear 220 in place of the hooking walls 228 and the pin 227. A hooking projected portion 239 is provided on the third spur gear 230 in place of the hooking projected portions 236 and the pin 237.

The hooking projected portion 239 is so provided as to be located between the two hooking walls 288, 289 of the second spur gear 220. The compression spring 248 is provided between the hooking wall 289 and the hooking projected portion 239 and biases the third spur gear 330 in an accelerator closing direction. The hooking projected portion 239 is so provided that the hooking projected portion can be abutted against the hooking wall 288 by biasing force of the compression spring 248. The hooking walls 288, 289 and the hooking projected portion 239 are provided according to a set length of the compression spring 248. In the present embodiment, as in the seventh embodiment, the second spur gear 220 and the third spur gear 230 are integrally rotated until a set load of the compression spring 248 is reached. When the set load is exceeded, the third spur gear 230 is not rotated but the second spur gear 220 is rotated. Also, with the above-mentioned configuration, the same effect as in the above-mentioned embodiment is brought about.

Ninth Embodiment

Figure 70A:
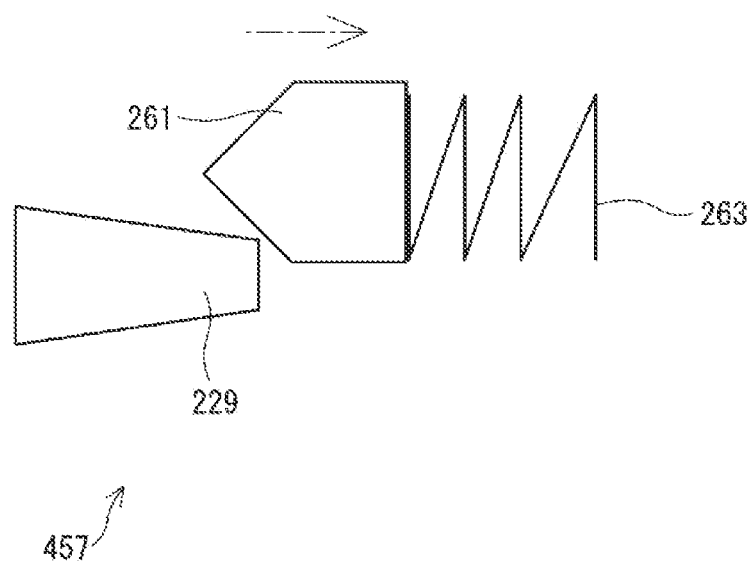
FIG. 70A is a schematic diagram of a locking mechanism according to the seventh embodiment as is before locking.
Figure 70B:
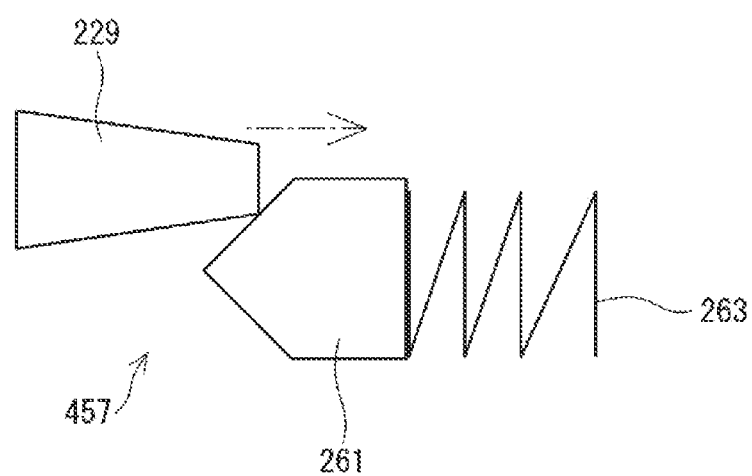
FIG. 70B is a schematic diagram of a locking mechanism according to the seventh embodiment as is in a locking state.

The ninth embodiment to a fifteenth embodiment are different from the above-mentioned embodiment in locking mechanism and a description will be given with focus placed on this regard. The locking mechanism described here may be combined with the power transmission mechanism in any embodiment. FIG. 70A and FIG. 70B schematically show the locking mechanism 457 in the seventh embodiment and the lock hooking portion 229 pushes the lock pin 261 by thrust force by rotation of the second spur gear 220 (not shown in FIG. 70A or FIG. 70B). As the result, the lock hooking portion 229 climbs over the lock pin 261 and the pedal lever 20 is thereby locked.

In order to be able to produce thrust force to the lock pin 261 by the lock hooking portion 229, it is desirable that the abutment face of at least either of the lock hooking portion 229 and the lock pin 261 that are abutted against each other when the lock hooking portion 229 is moved in a locking direction should be a sloped surface. Similarly, it is desirable that the abutment face of at least either of the lock hooking portion 229 and the lock pin 261 that are abutted against each other when the lock hooking portion 229 is moved in an unlocking direction should be a sloped surface. An angle of slope and the like can be arbitrarily set according to torque and the like required for locking or unlocking operation. The sloped surface need not be a flat surface and may be a curved surface. For example, the tip surface of the lock pin 261 may be formed in a dome shape. This is the same also with the ninth embodiment.

In a locking mechanism 458 in the ninth embodiment shown in FIG. 71A, FIG. 71B, and FIG. 71C, a lock pin 268 is formed of such a flexible material as rubber. The lock hooking portion 229 is moved and bends the lock pin 268 as shown in FIG. 71B and the lock hooking portion 229 thereby climbs over the lock pin 268 and the pedal lever 20 is locked (refer to FIG. 71C). Also, with the above-mentioned configuration, the same effect as in the above-mentioned embodiment is brought about. In the present embodiment, the lock pin 268 is equivalent to "locking member" and elastic force of the lock pin 268 itself is equivalent to "elastic force."

Tenth Embodiment

FIG. 72A, FIG. 72B, and FIG. 72C show the tenth embodiment. The present embodiment includes, as a locking mechanism 459, a magnetic material 301, a magnet 302, and an elastic member 303. The magnetic material 301 is provided on the pad 21. The magnet 302 is provided in a place of the case 10 opposed to the magnetic material 301. The elastic member 303 is housed in a housing chamber 304 provided in the case 10; one end thereof is hooked to an inner wall of the housing chamber 304 and the other end thereof is connected with the magnet 302. The magnet 302 may be adopted on the pad 21 side and the magnetic material 301 may be adopted on the case 10 side.

In the present embodiment, the pad 21 can be locked in a fully opened state by the magnetic material 301 and the magnet 302 attracting each other. When the pad 21 is further depressed from a locking state to compress the elastic member 303, the magnetic material 301 and the magnet 302 are pulled away from each other by reaction force of the elastic member 303. As a result, the locking state can be canceled. Also, with the above-mentioned configuration, the same effect as in the above-mentioned embodiment is brought about. In the present embodiment, the case 10 is equivalent to "housing."

Eleventh Embodiment to Fourteenth Embodiment

Figure 73A:
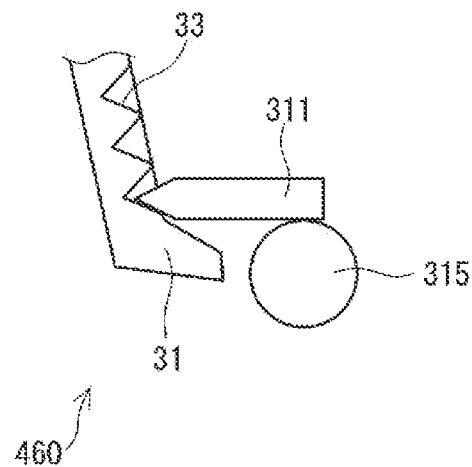
FIG. 73A is a schematic diagram of a locking mechanism according to an eleventh embodiment as is in a locking state.
Figure 73B:
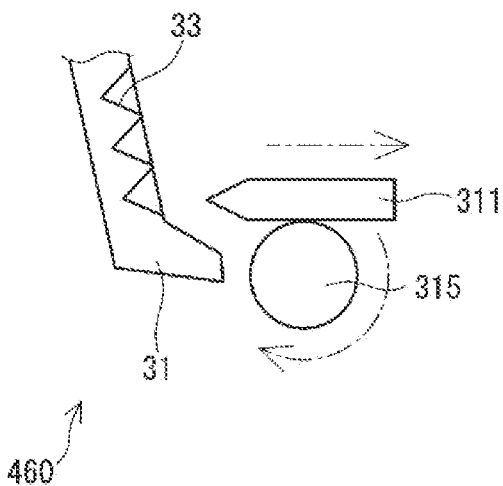
FIG. 73B is a schematic diagram of a locking mechanism according to the eleventh embodiment as is in an unlocking state.
Figure 74A:
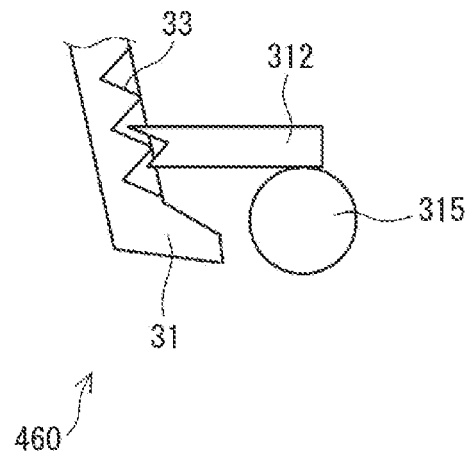
FIG. 74A is a schematic diagram of a locking mechanism according to a twelfth embodiment as is in a locking state.
Figure 74B:
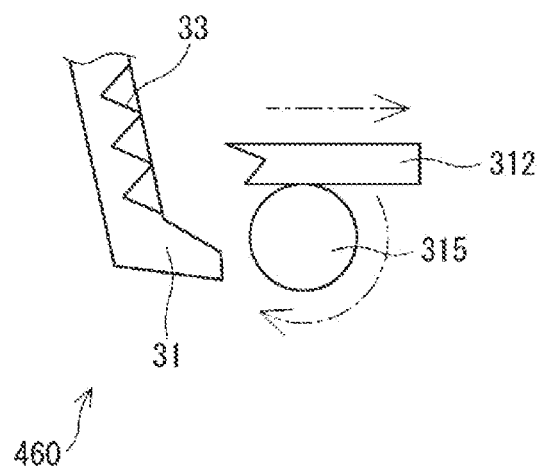
FIG. 74B is a schematic diagram of a locking mechanism according to the twelfth embodiment as is in an unlocking state.
Figure 75A:
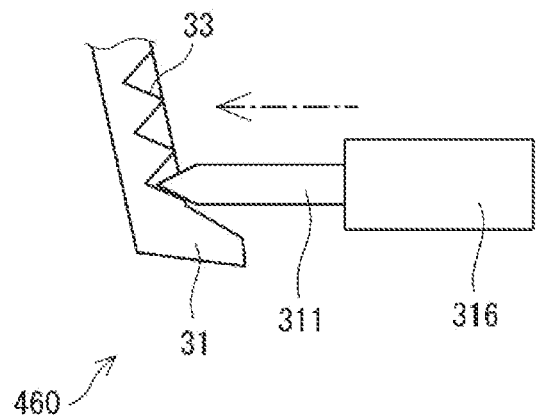
FIG. 75A is a schematic diagram of a locking mechanism according to a thirteenth embodiment as in a locking state.
Figure 75B:
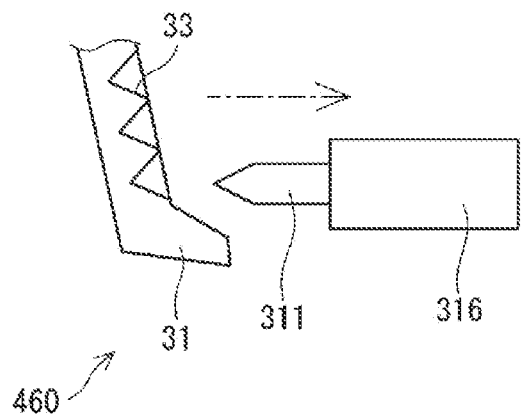
FIG. 75B is a schematic diagram of a locking mechanism according to the thirteenth embodiment as is in an unlocking state.
Figure 76A:
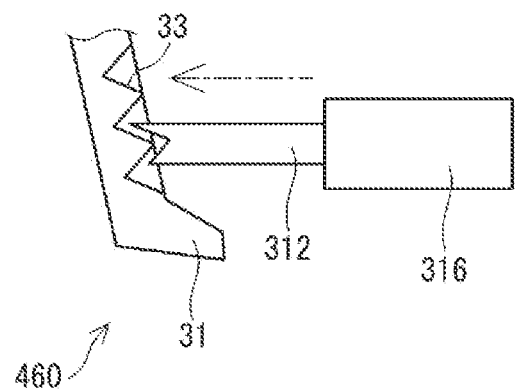
FIG. 76A is a schematic diagram of a locking mechanism according to a fourteenth embodiment as is in a locking state.
Figure 76B:
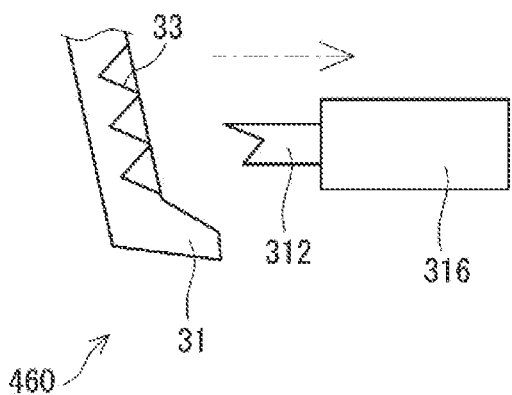
FIG. 76B is a schematic diagram of a locking mechanism according to the fourteenth embodiment as is in an unlocking state.

FIG. 73A and FIG. 73B show the eleventh embodiment; FIG. 74A and FIG. 74B show the twelfth embodiment; FIG. 75A and FIG. 75B show the thirteenth embodiment; and FIG. 76A and FIG. 76B show the fourteenth embodiment. As shown in FIG. 73A to FIG. 76B, a fitting portion 33 is formed in the arm 31 and the pedal lever 20 is locked by a lock pin 311, 312 being fit. By so forming the fitting portion 33 that a plurality of points where the lock pin 311 is fit are provided, the pedal lever 20 can be locked stepwise in an intermediate position between fully closed and fully opened. In FIG. 73A to FIG. 76B, the lock pin 311, 312 constitutes a locking mechanism 460.

In the eleventh embodiment shown in FIG. 73A and FIG. 73B, the lock pin 311 whose tip is formed in a projected shape is driven by a motor 315 as a locking drive source. In the twelfth embodiment shown in FIG. 74A and FIG. 74B, the lock pin 312 whose tip is formed in a recessed shape is driven by the motor 315.

In the thirteenth embodiment shown in FIG. 75A and FIG. 75B, the lock pin 311 whose tip is formed in a projected shape is driven by a solenoid 316 as a locking drive source. In the fourteenth embodiment shown in FIG. 76A and FIG. 76B, the lock pin 312 whose tip is formed in a recessed shape is driven by the solenoid 316.

In these embodiments, a locking drive source is provided separately from the motor 40 as a drive source for exerting reaction force. As a result, a degree of freedom of the locking mechanism is enhanced. The locking drive source may be the motor 315 as in the eleventh embodiment and twelfth embodiment or may be the solenoid 316 as in the thirteenth embodiment and fourteenth embodiment.

The locking mechanism 460 includes the lock pin 311, 312 that is fit into/onto the fitting portion 33 formed in the pedal lever 20 and thereby can regulate movement of the pedal lever 20. As a result, movement of the pedal lever can be appropriately regulated. The fitting portion 33 and the lock pin 311, 312 may be different in shape or the like from those in FIG. 73A to FIG. 76B as long as the pedal lever 20 can be locked by their fitting. Also, with the above-mentioned configuration, the same effect as in the above-mentioned embodiment is brought about. In the eleventh embodiment to fourteenth embodiment, the lock pin 311, 312 is equivalent to "locking member."

Fifteenth Embodiment

Figure 77:
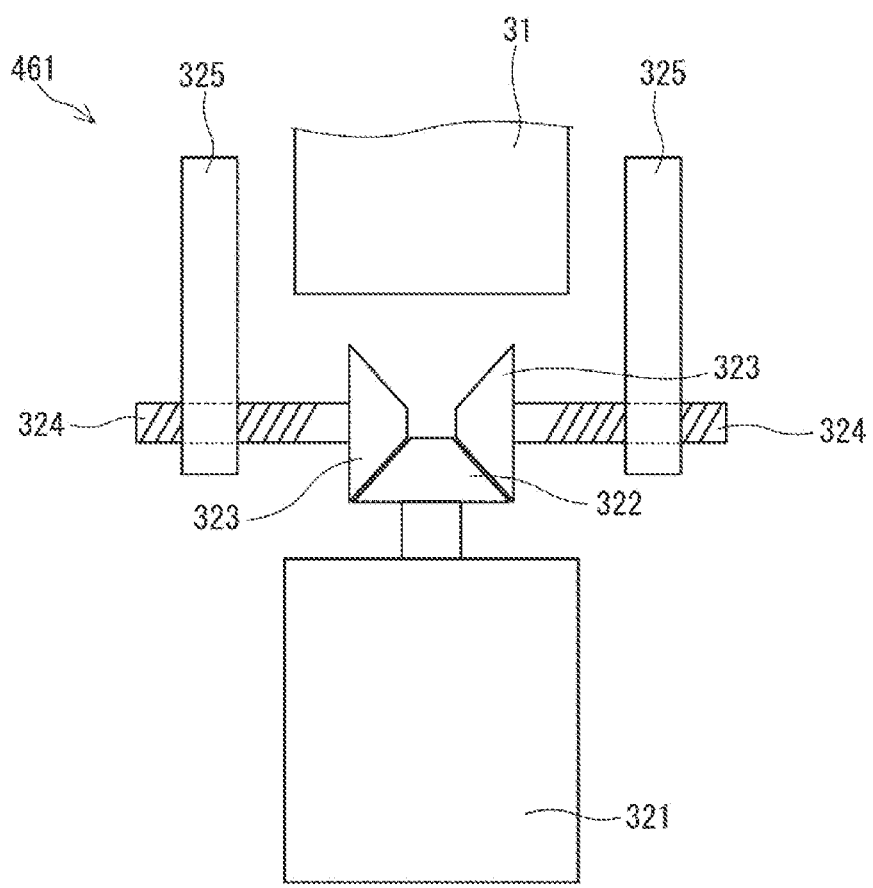
FIG. 77 is a schematic diagram of a locking mechanism according to a fifteenth embodiment.

FIG. 77 shows the fifteenth embodiment. In the present embodiment, a locking mechanism 461 includes a bevel gear 323, a feed screw 324, and a locking pad 325. The locking pad 325 is driven by rotation of a motor 321 as a locking drive source by way of a motor gear 322, the bevel gear 323, and the feed screw 324 and clamps the arm 31 between the locking pads 325 to lock the pedal lever 20 by frictional force.

In the present embodiment, the locking mechanism 461 includes the locking pads 325 so provided as to clamp the pedal lever 20 therebetween and movement of the pedal lever 20 is regulated by the locking pads 325 clamping the pedal lever 20 therebetween. As a result, movement of the pedal lever 20 can be regulated in any position between fully closed and fully opened. A position of clamping, a configuration of the gears, and the like may be varied as long as the pedal lever 20 can be clamped between pads driven by a drive source. Also, with the above-mentioned configuration, the same effect as in the above-mentioned embodiment is brought about.

Sixteenth Embodiment

Figure 78:
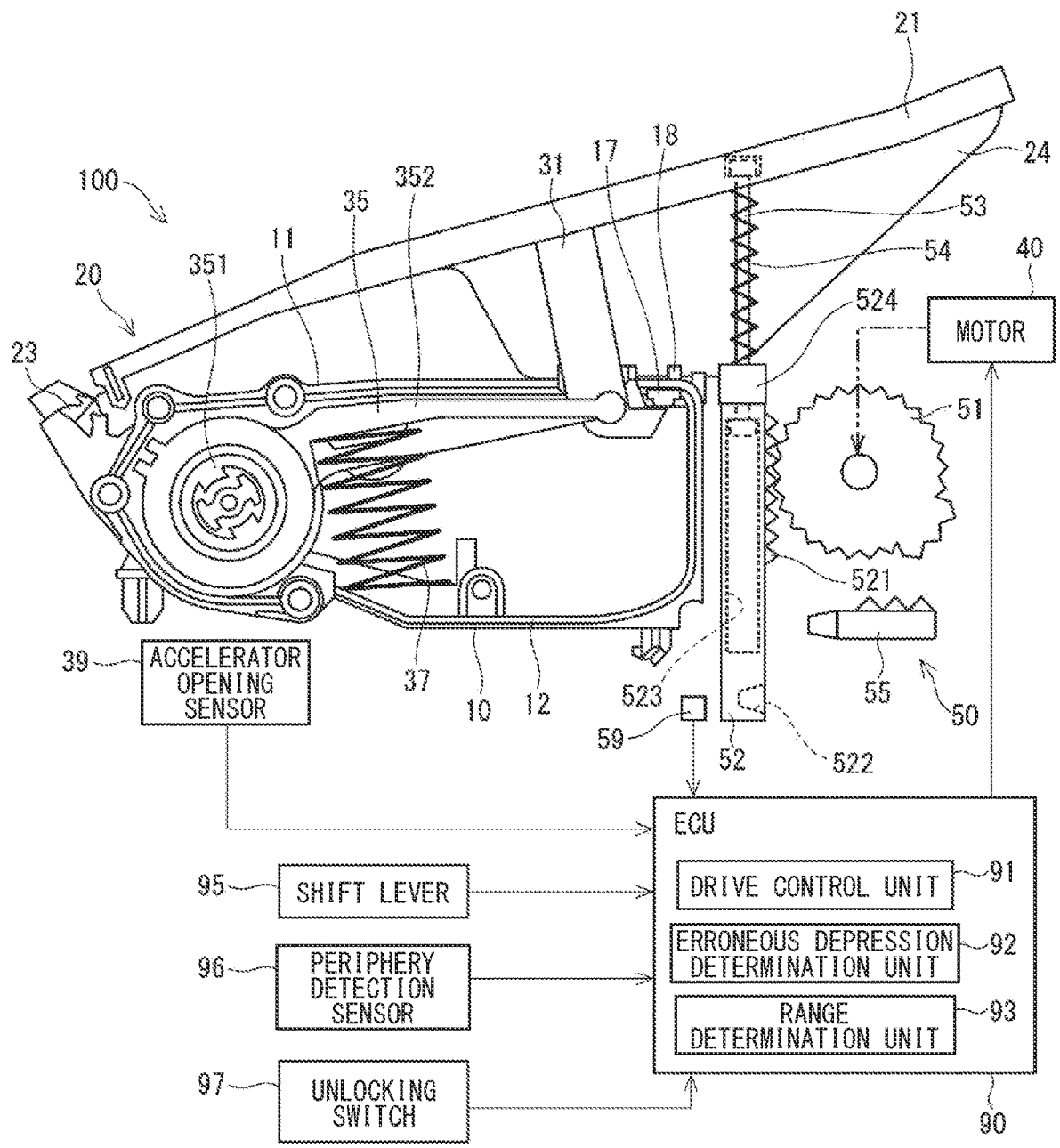
FIG. 78 is an explanatory drawing showing the control configuration of an accelerator device according to a sixteenth embodiment.
Figure 79:
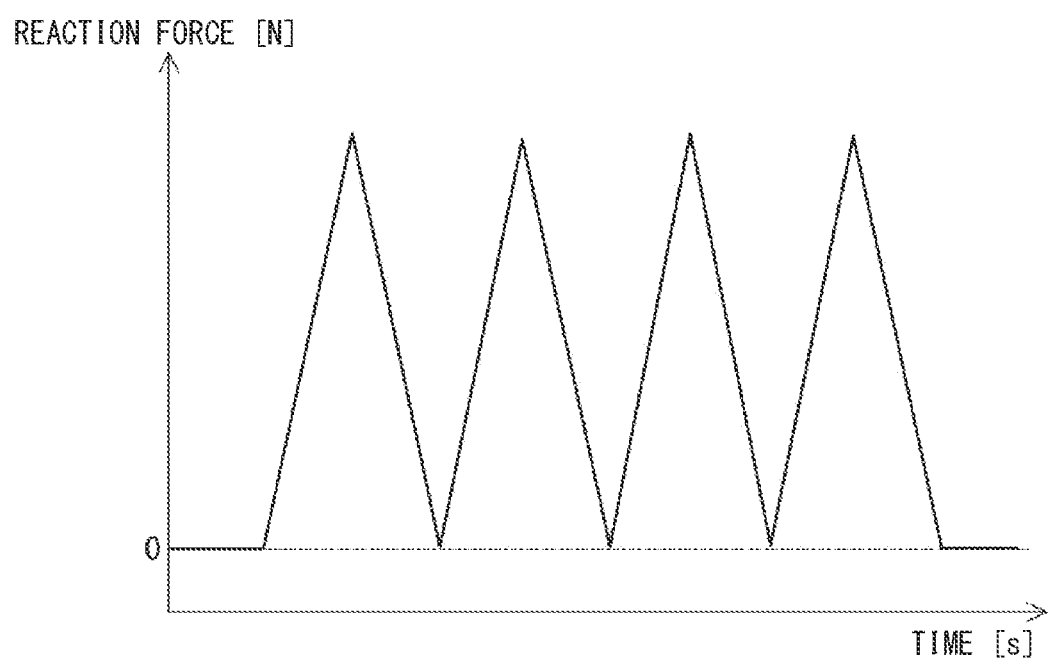
FIG. 79 is a time chart indicating pulsed reaction force according to the sixteenth embodiment.
Figure 80:
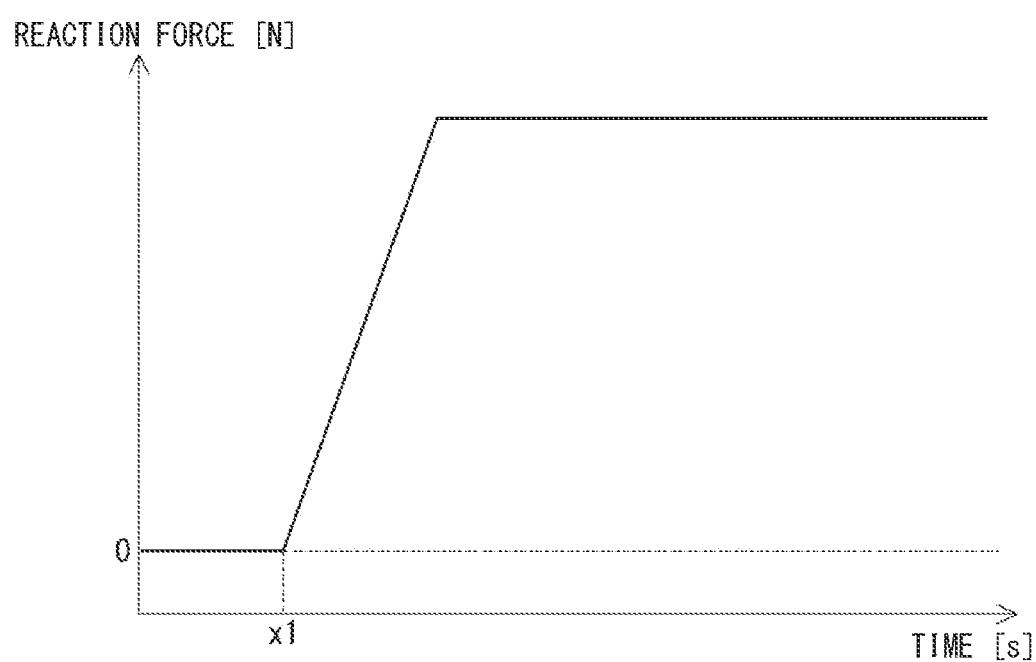
FIG. 80 is a time chart indicating constant reaction force according to the sixteenth embodiment.

FIG. 78 to FIG. 80 show the sixteenth embodiment. With respect to the sixteenth embodiment, a description will be given mainly to control of the accelerator device. FIG. 78 illustrates the power transmission mechanism 50 in the first embodiment as an example but the configurations of the second and following embodiments may be applied. The accelerator device 100 includes ECU 90 as a control unit in addition to the case 10, the pedal lever 20, the motor 40, the power transmission mechanism 50, and the like. The ECU 90 may be configured of such an existing ECU as an engine ECU or a brake ECU or one separately provided for controlling the motor 40 may be adopted. The accelerator device may be configured of ECU different in functional block related to control configuration and may be so configured that information is shared via communication or the like.

The ECU 90 is configured based on a microcomputer and the like and includes therein CPU, ROM, RAM, and I/O, none of which is shown, a bus line connecting these configuration elements, and the like. Each processing at the ECU 90 may be software processing performed by executing a program stored in such a tangible memory device as ROM (that is, a readable non-transitory tangible recording medium) at the CPU or may be hardware processing performed by a dedicated electronic circuit.

The ECU 90 includes, as functional blocks, a drive control unit 91, an erroneous depression determination unit 92, a range determination unit 93, and the like. The drive control unit 91 controls driving of the motor 40 based on detection values of an accelerator opening sensor 39 and a position sensor 59 or the like.

The erroneous depression determination unit 92 determines whether a driver can be considered to be erroneously depressing the pedal lever 20. In the present embodiment, when any obstacle is detected by a periphery detection sensor 96 and the pedal lever 20 is depressed, an occurrence of an erroneous depression is determined. The periphery detection sensor 96 is, for example, an infrared sensor, a sonar, or the like.

When a depression speed of the pedal lever 20 based on a detection value of the accelerator opening sensor 39 is equal to an erroneous depression determination value or higher, an occurrence of an erroneous depression is determined. When the pedal lever 20 is suddenly depressed, an occurrence of an erroneous depression is determined on the assumption of panic braking. An erroneous depression determination value is set to an arbitrary value higher than a depression speed assumed for normal pedal lever operation.

The range determination unit 93 determines a shift range based on a signal from a shift lever 95. Instead of directly acquiring a signal from the shift lever 95, a shift switch, or the like, the accelerator device may be so configured as to acquire information related to a shift range from any other ECU, such as a higher-order ECU. An unlocking switch 97 is provided in, for example, the vicinity of the steering wheel where a driver can manually operate the unlocking switch.

In the present embodiment, when an occurrence of an erroneous depression of the pedal lever 20 is determined, the drive control unit 91 drives the motor 40 to lock the pedal lever 20. When an occurrence of an erroneous depression of the pedal lever 20 is determined, the motor 40 may be so controlled as to drive the pedal lever 20 in a return direction instead of locking the pedal lever 20. As a result, the driver is made to recognize that the driver is erroneously depressing the pedal lever 20 and is guided to depress a brake pedal instead.

In the present embodiment, when the shift range is reverse (R), the drive control unit 91 drives the motor 40 to lock the pedal lever 20. When the shift range is reverse, that is, when the vehicle moves backward, the pedal lever 20 is prevented from being depressed and creep running is made. An erroneous depression itself is thereby eliminated. Since the unlocking switch 97 for a user to instruct to intentionally cancel a locking state, creep running can be canceled when required.

In the present embodiment, information can be transmitted to a driver by way of the pedal lever 20 by actively controlling the motor 40. As shown in FIG. 79, for example, the motor 40 is so controlled that at least one time of pulsed pedal effort is applied to the pedal lever 20. A driver can sense a single pulse as a pulse signal and continuous pulses as vibration.

When a predetermined condition holds as shown in FIG. 80, constant reaction force may be exerted to the pedal lever 20 for a predetermined time or longer. The example in FIG. 80 is on the assumption that a predetermined condition holds at time x1. An example of a predetermined condition is that the present situation is determined to degrade fuel efficiency. In this case, the pedal lever 20 becomes heavy by continuously exerting constant reaction force to the pedal lever 20 and thus, depression of the pedal lever 20 can be suppressed.

In the present embodiment, the accelerator device 100 includes the motor 40, the pedal lever 20, the power transmission mechanism 50, and the ECU 90. The ECU 90 includes the drive control unit 91 controlling driving the motor 40 and the erroneous depression determination unit determining an erroneous depression of the pedal lever. When an occurrence of an erroneous depression of the pedal lever 20 is determined, the drive control unit 91 drives the motor 40 to lock the pedal lever 20. As a result, erroneous take-off due to an erroneous depression of the pedal lever 20 can be prevented and safety is enhanced.

The ECU 90 includes the drive control unit 91 and the range determination unit 93 determining a shift range. When a shift range is determined to be reverse, the drive control unit 91 drives the motor 40 to lock the pedal lever 20. When a vehicle moves backward, an erroneous take-off to a rearward direction of the vehicle can be prevented by locking the pedal lever 20 and safety is enhanced.

The accelerator device 100 includes the unlocking switch 97 that allows the pedal lever 20 to be manually unlocked when a vehicle moves backward. As a result, a driver can intentionally cancel pedal locking and user convenience is increased.

When the pedal lever 20 is locked according to an erroneous depression determination or a shift range, a locking function only has to be implemented. Therefore, a direction of force transmitted to the pedal lever 20 by way of the power transmission mechanism 50 is disregarded.

When an occurrence of an erroneous depression of the pedal lever 20 is determined, the drive control unit 91 drives the motor 40 to give reaction force in a return direction of the pedal lever 20. Also, with the above-mentioned configuration, sudden take-off due to an erroneous depression of the pedal lever 20 can be prevented and safety is enhanced.

The drive control unit 91 controls driving of the motor 40 to give at least one time of driver-sensible pulsed reaction force. As a result, various types of information can be transmitted to a driver by way of the pedal lever 20.

The drive control unit 91 controls the motor 40 so as to give constant reaction force to a return direction of the pedal lever 20 for a predetermined time or longer. As a result, for example, fuel efficiency can be enhanced. The same effect as in the above-mentioned embodiment is brought about.

When reaction force is given to cope with an erroneous depression, transmit information about erroneous depression, or enhance fuel efficiency or for other like purposes, the power transmission mechanism 50 only has to be able to transmit force to a closing direction of the pedal lever 20 and the accelerator device may be so configured that force is not transmitted to an opening direction. A configuration related to application of reaction force may be different from a configuration of the above-mentioned embodiment.

OTHER EMBODIMENTS

In the above-mentioned embodiments, a drive source is a DC motor. In any other embodiment, a drive source may be a motor of a different type from DC motor. For example, any other member, such as a solenoid, than a motor may be adopted as a drive source. A plurality of drive sources configured to give reaction force may be adopted.

In a description of the above embodiments, the accelerator device of a floorstanding type (so-called "organ type") has been taken as an example. In any other embodiment, the accelerator device may be of a so-called suspended type (so-called "pendant type"). A power transmission mechanism or a locking mechanism may be differently configured from the above-mentioned embodiments.

In a description of the above embodiments, an integral type in which an actuator and an accelerator pedal are connected with each other has been taken as an example. In any other embodiment, a separate type in which an actuator and an accelerator pedal are not connected with each other and are respectively connected to a floor may be adopted.

A control unit described in the present disclosure and a technique therefor may be implemented by a dedicated computer provided by configuring a processor and a memory programmed to execute one or more functions crystallized by a computer program. Or, a control unit described in the present disclosure and a technique therefor may be implemented by a dedicated computer provided by configuring a processor with one or more dedicated hardware logic circuits. Alternatively, a control unit described in the present disclosure and a technique therefor may be implemented by one or more dedicated computer configured of a combination of a processor and a memory programmed to execute one or more functions and a processor configured of one or more hardware logic circuits. A computer program may be stored in a computer-readable non-transitory tangible recording medium as an instruction to be executed by a computer. The present disclosure is not limited to the above-mentioned embodiments and may be implemented in various modes without departing from the subject matter thereof.

The present disclosure has been described in accordance with embodiments but the present disclosure is not limited to the above-mentioned embodiments or structures. The present disclosure also includes various modifications and modifications within an equivalent range. In addition, various combinations and modes and other combinations and modes obtained by adding only one element or more or less element to the combinations and modes are also included in the category and technical scope of the present disclosure.

What is claimed is:

1. An accelerator device comprising:
   at least one drive source;
   a pedal lever configured to move according to a pedal depressing operation; and
   a power transmission mechanism configured to transmit a force, which is caused by driving the drive source, to the pedal lever in both a closing direction and an opening direction of the pedal lever; and
   a locking mechanism configured to regulate movement of the pedal lever;
   wherein the locking mechanism is configured to be driven by the drive source that is for an adjusting reaction force exerted to the pedal lever.

2. The accelerator device according to claim 1, wherein the locking mechanism is configured to perform an unlocking operation when a predetermined force or larger is exerted to the pedal lever.

3. The accelerator device according to claim 1, wherein the locking mechanism is configured to regulate movement of the pedal lever at a fully closed position of the pedal lever.

4. The accelerator device according to claim 1, wherein the locking mechanism is configured to regulate movement of the pedal lever at a fully opened position of the pedal lever.

5. The accelerator device according to claim 1, wherein the locking mechanism is configured to regulate movement of the pedal lever at least in a depressing direction at an intermediate position between a fully closed position and a fully opened position of the pedal lever.

6. The accelerator device according to claim 1, wherein the locking mechanism includes:
   a lock hooking portion provided in a power transmission path extending from the drive source to the pedal lever and
   a locking member movable or deformable by elastic force, and
   the lock hooking portion is configured to be hooked to the locking member to regulate movement of the pedal lever.

7. The accelerator device according to claim 1, wherein the locking mechanism includes;
   a magnet provided in one of the pedal lever and a housing and
   a magnetic material provided in an other of the pedal lever and the housing, and
   the magnet and the magnetic material are configured to attract each other to regulate movement of the pedal lever.

8. The accelerator device according to claim 1, wherein the locking mechanism includes a locking member configured to fit to a fitting portion formed in the pedal lever to regulate movement of the pedal lever.

9. The accelerator device according to claim 1, wherein the locking mechanism includes a locking pad configured to clamp the pedal lever therebetween, and
   the locking pad is configured to regulate movement of the pedal lever by clamping the pedal lever therebetween.

10. The accelerator device according to claim 1, wherein the power transmission mechanism includes
    a gear configured to be driven by the drive source and
    a linear-motion member having a driving rack gear portion configured to be engaged with the gear.

11. The accelerator device according to claim 10, wherein the power transmission mechanism includes a reaction force adjusting biasing member provided between the linear-motion member and the pedal lever.

12. The accelerator device according to claim 11, wherein the power transmission mechanism further includes a connecting pin that is fixed to the pedal lever at one end and housed in a housing chamber formed in the linear-motion member at an other end, so that the other end is movable according to driving of the pedal lever.

13. The accelerator device according to claim 10, wherein the locking mechanism includes a locking member configured to fit to an engagement hole portion formed in the linear-motion member to regulate movement of the pedal lever.

14. The accelerator device according to claim 13, wherein the gear includes
    a first gear portion configured to be engaged with the driving rack gear portion and
    a second gear portion configured to be engaged with a locking rack gear portion formed on the locking member.

15. The accelerator device according to claim 14, wherein a range of engagement between the locking rack gear portion and the second gear portion is smaller than a range of engagement between the driving rack gear portion and the first gear portion.

16. The accelerator device according to claim 13, wherein in a locking state, at least one of a point of abutment between the linear-motion member and the pedal lever or a point of abutment between the linear-motion member and the locking member is elastically deformable in an unlocking operation.

17. The accelerator device according to claim 10, wherein the power transmission mechanism includes
    a case member configured to be driven integrally with the pedal lever,
    a holder configured to be moved by the linear-motion member in the case member, and
    a reaction force adjusting biasing member hooked to the case member at one end and hooked to the holder at an other end.

18. The accelerator device according to claim 17, wherein the locking mechanism includes a locking member configured to move in a direction different from a direction of movement of the case member and
hook to a lock hooking portion formed on the linear-motion member to regulate movement of the pedal lever.

19. The accelerator device according to claim 1, wherein the power transmission mechanism includes
a cam configured to be rotated by the drive source, and
a link connected to the pedal lever at one end and engaged with the cam at an other end.

20. The accelerator device according to claim 19, wherein the cam is a drive source-side cam,
the power transmission mechanism includes
a link-side cam provided on a side of the link relative to the drive source-side cam and having a hole portion, and
a connecting pin inserted in the hole portion and movable in the hole portion, and
the connecting pin is connected to the link at one end and configured to abut against the drive source-side cam and the link-side cam on an other end side.

21. The accelerator device according to claim 20, wherein the locking mechanism includes the link-side cam, and
the link-side cam and a locking portion, which is provided in a housing, are configured to abut against each other to regulate movement of the pedal lever.

22. The accelerator device according to claim 21, wherein in the hole portion,
the connecting pin is abutted against a lock-side wall portion when the pedal lever is locked, and
a regulating wall is formed to regulate movement of the connecting pin in a direction in which the connecting pin is brought away from the lock-side wall portion.

23. The accelerator device according to claim 22, wherein the power transmission mechanism includes a tension holding mechanism configured to pull the connecting pin in a direction in which the connecting pin is brought away from the lock- side wall portion, and
the drive source-side cam has an unlocking slope configured to push up the connecting pin from an opposite side of the regulating wall.

24. The accelerator device according to claim 21, wherein the locking portion is a lock stopper housed in a housing recessed portion in the housing, and
when predetermined force or larger is exerted to the pedal lever, the lock stopper is configured to be housed in the housing recessed portion against biasing force of a stopper biasing member, which biases the lock stopper toward the link-side cam, to perform an unlocking operation.

25. The accelerator device according to claim 1, wherein the power transmission mechanism includes a cam configured to be driven by the drive source and connected to the pedal lever.

26. The accelerator device according to claim 25, further comprising:
a gear constituting a speed reducing mechanism and provided between the drive source and the cam.

27. The accelerator device according to claim 26, wherein the speed reducing mechanism includes a drive source-side gear and a cam-side gear that are coaxially placed, wherein
a gear-to-gear biasing member is provided between the drive source-side gear and the cam-side gear, and
when the drive source-side gear is rotated in a reaction force exerting direction, the cam-side gear
is rotated integrally with the drive source-side gear until a set load of the gear-to-gear biasing member is reached and
is not rotated when the set load of the gear-to-gear biasing member is exceeded.

28. The accelerator device according to claim 27, wherein the locking mechanism includes:
a lock hooking portion configured to be rotated integrally with the drive source-side gear, and
a locking member configured to hook the lock hooking portion in a range within which the cam-side gear is not rotated but the drive source-side gear is rotated.

* * * * *